(12) United States Patent
Choi et al.

(10) Patent No.: US 12,281,843 B2
(45) Date of Patent: *Apr. 22, 2025

(54) REFRIGERATOR

(71) Applicant: LG Electronics Inc., Seoul (KR)

(72) Inventors: Kwanghyun Choi, Seoul (KR); Daekil Kang, Seoul (KR)

(73) Assignee: LG Electronics Inc., Seoul (KR)

(*) Notice: Subject to any disclaimer, the term of this patent is extended or adjusted under 35 U.S.C. 154(b) by 358 days.

This patent is subject to a terminal disclaimer.

(21) Appl. No.: 17/573,965

(22) Filed: Jan. 12, 2022

(65) Prior Publication Data
US 2022/0136764 A1 May 5, 2022

Related U.S. Application Data

(63) Continuation of application No. 16/230,206, filed on Dec. 21, 2018, now Pat. No. 11,243,025.

(30) Foreign Application Priority Data

Mar. 26, 2018 (KR) .......... 10-2018-0034297

(51) Int. Cl.
*F25D 25/02* (2006.01)
*F25D 23/02* (2006.01)
(Continued)

(52) U.S. Cl.
CPC ......... *F25D 25/025* (2013.01); *F25D 23/021* (2013.01); *F25D 23/028* (2013.01);
(Continued)

(58) Field of Classification Search
CPC .... F25D 25/025; F25D 23/021; F25D 23/028; A47B 2088/901; A47B 88/457; A47B 2210/175
See application file for complete search history.

(56) References Cited

U.S. PATENT DOCUMENTS 7,396,093 B2    7/2008   Jeong
8,274,251 B2    9/2012   Yoo et al.
(Continued)

FOREIGN PATENT DOCUMENTS

AU    2018282287    10/2019
CN    1288143    3/2001
(Continued)

OTHER PUBLICATIONS

Australian Office Action in Australian Application No. 2018282288, dated Oct. 3, 2019, 6 pages.
(Continued)

*Primary Examiner* — Kimberley S Wright
(74) *Attorney, Agent, or Firm* — Fish & Richardson P.C.

(57) ABSTRACT

A refrigerator includes: a cabinet; a drawer door assembly including a front panel door part and a drawer part that defines an accommodation space; a rail that movably configured to connect the drawer door assembly to the cabinet and enable the drawer door assembly to insert into and withdraw from the cabinet; a driving device located at the front panel door part and configured to provide power; and an elevation device located in the drawer part and configured to be coupled to the driving device and elevate a portion of the drawer part relative to the front panel door part. The driving device includes: a motor assembly configured to provide driving force; a screw assembly configured to perform an elevation operation based on the driving force; and a lever that connects the screw assembly to the elevation device and that is configured to rotate based on the elevation operation.

18 Claims, 36 Drawing Sheets

(51) Int. Cl.
    *A47B 88/457*    (2017.01)
    *A47B 88/90*     (2017.01)
    *E05F 15/638*    (2015.01)
    *F16H 25/24*     (2006.01)
    *F25D 25/00*     (2006.01)
    *F25D 25/04*     (2006.01)

(52) U.S. Cl.
    CPC ....... *A47B 88/457* (2017.01); *A47B 2088/901* (2017.01); *A47B 2210/175* (2013.01); *E05F 15/638* (2015.01); *E05Y 2201/422* (2013.01); *E05Y 2201/70* (2013.01); *E05Y 2201/702* (2013.01); *E05Y 2201/718* (2013.01); *E05Y 2201/722* (2013.01); *E05Y 2900/31* (2013.01); *F16H 25/2409* (2013.01); *F25D 25/005* (2013.01); *F25D 25/04* (2013.01)

(56) References Cited

U.S. PATENT DOCUMENTS

| | | |
|---|---|---|
| 9,377,238 B2 | 6/2016 | Hall et al. |
| 10,465,970 B1 | 11/2019 | Kang et al. |
| 10,598,426 B2 | 3/2020 | Kang |
| 10,921,052 B2 | 2/2021 | Choi |
| 11,105,551 B2 | 8/2021 | Kim |
| 2005/0073225 A1 | 4/2005 | Kwon et al. |
| 2006/0042305 A1 | 3/2006 | Oh et al. |
| 2006/0207283 A1 | 9/2006 | Kim |
| 2008/0018215 A1 | 1/2008 | Carden et al. |
| 2008/0203041 A1 | 8/2008 | Lim et al. |
| 2009/0160297 A1 | 6/2009 | Anikhindi et al. |
| 2014/0021847 A1 | 1/2014 | Wehner et al. |
| 2014/0265797 A1 | 9/2014 | Scheuring et al. |
| 2014/0265806 A1 | 9/2014 | Hall et al. |

FOREIGN PATENT DOCUMENTS

| | | |
|---|---|---|
| CN | 1727829 | 2/2006 |
| CN | 101981398 | 2/2011 |
| CN | 102155840 | 8/2011 |
| KR | 2006-0011221 | 2/2006 |
| KR | 101362377 | 2/2014 |
| KR | 2017-0052409 | 5/2017 |
| WO | WO 2014/159370 | 10/2014 |
| WO | WO20140159370 | 10/2014 |
| WO | WO2018088802 | 5/2018 |

OTHER PUBLICATIONS

Australian Office Action in Australian Application No. 2018282288, dated Oct. 4, 2019, 7 pages.
Extended European Search Report in European Appln. No. 18215362.7, dated Jul. 1, 2019, 9 pages.
Office Action in Chinese Appln. No. 201910092172.9, dated Sep. 22, 2020, 15 pages (with English translation).
Office Action in Korean Appln. No. 10-2022-0158740, mailed on Jan. 18, 2023, 13 pages (with English translation).
Office Action in Indian Appln. No. 201814049770, mailed on Nov. 13, 2023, 2 pages.
Office Action in Korean Application No. 10-2018-0034297, dated May 24, 2022, 12 pages (with English translation).

REFRIGERATOR

CROSS-REFERENCE TO RELATED APPLICATIONS

The present application is a continuation of U.S. application Ser. No. 16/230,206, filed on Dec. 21, 2018, which claims priority under 35 U.S.C. 119 and 35 U.S.C. 365 to Korean Patent Application No. 10-2018-0034297, filed on Mar. 26, 2018, the disclosures of which are hereby incorporated by reference in their entirety.

BACKGROUND

The present disclosure relates to a refrigerator.

In general, refrigerators are home appliances for storing foods at a low temperature in a storage space that is covered by a door. For this, refrigerators cool the inside of the storage space by using cool air generated by being heat-exchanged with a refrigerant circulated through a refrigeration cycle to store foods in an optimum state.

In recent years, refrigerators have become increasingly multi-functional with changes of dietary lives and gentrification of products, and refrigerators having various structures and convenience devices for convenience of users and for efficient use of internal spaces have been released.

The storage space of the refrigerator may be opened/closed by the door. Also, refrigerators may be classified into various types according to an arranged configuration of the storage space and a structure of the door for opening and closing the storage space.

The refrigerator door may be classified into a rotation-type door that opens and closes a storage space through rotation thereof and a drawer-type door that is inserted and withdrawn in a drawer type.

Also, the drawer-type door is often disposed in a lower region of the refrigerator. Thus, when the drawer-type door is disposed in the lower region of the refrigerator, a user has to turn its back to take out a basket or foods in the drawer-type door. If the basket or the foods are heavy, the user may feel inconvenient to use the basket or may be injured.

In order to solve such a limitation, various structures are being developed in which the drawer-type door is capable of being elevated.

Representatively, a refrigerator in which a lifting mechanism for elevation a bin provided in a refrigerating compartment is disclosed in U.S. Pat. No. 9,377,238.

However, this technique according to related art may have a structure in which the lifting mechanism for the elevation is disposed and exposed outside the bin to cause a serious safety problem. Also, there is a limitation that an outer appearance is poor due to the structure of the lifting mechanism exposed to the outside.

Also, since a driving part is exposed to the outside, noise during operation of the driving part may be transmitted to the outside as it is, which may cause the user's dissatisfaction.

Also, since the lifting mechanism is disposed inside the refrigerator, storage capacity within the refrigerator may be significantly reduced. This may cause a limitation that storage efficiency of the refrigerator is greatly reduced due to the loss in storage capacity of the whole refrigerator.

Also, the lifting mechanism is provided inside the refrigerator. Thus, separation of the door and separation of the lifting mechanism are required for service of the lifting mechanism to deteriorate serviceability.

Also, a driving part of the lifting mechanism has a structure for elevating the bin by pushing one end of the support assembly. Therefore, when a large heavy structure or a heavy object is disposed inside the bin, sufficient force for the elevation may not be provided. Of course, although a motor of the driving part increases in size to solve this limitation, there are limitations that an internal volume loss and noise become larger, and the manufacturing cost increases.

Also, the lifting mechanism supports one side of the entire bottom surface of the bin due to the arrangement position of the driving part. Therefore, in the state where the bin is filled with a stored product, an eccentric load may occur. Here, a serious problem may arise in stability due to the eccentric load acting in a state in which the door is withdrawn, there is a limitation that the elevation operation is not performed smoothly.

Also, the lifting mechanism has a structure in which the entire bin is elevated. In order to elevate the bin, the bin has to be completely withdrawn from the storage space of the refrigerator. Also, when the bin is elevated, the bin has to be withdrawn up to a position at which the bin does not interfere with the upper door and the refrigerator body. However, in this structure, when the door is completely withdrawn, a loss of cold air within the refrigerator may cause a limitation in stability, and there is a possibility that stability is deteriorated by an occurrence of deflection due to the load of the lifting mechanism. Thus, it is necessary to supplement the draw-out structure, and there is a limitation in that it is difficult to be applied to the structure of the bin or door which is substantially large in size.

SUMMARY

Embodiments provide a refrigerator in which an electric device for elevation is provided inside a front panel door part, and a mechanical device for the elevating the drawer part is provided in a drawer outside the door.

Embodiments also provide a refrigerator which improves an outer appearance by preventing exposure of constituents for elevating a drawer part and improves safety.

Embodiments also provide a refrigerator which is capable of preventing deflection from occurring by an eccentric load when the drawer part is elevated to ensure a stable elevation operation.

Embodiments also provide a refrigerator which is capable of being separating an electric device and the mechanism for elevating a drawer part together when the front panel door part and the drawer part are separated.

Embodiments also provide a refrigerator which is improved in assembly workability, cleanability, and serviceability of a drawer door that is capable of being inserted and withdrawn.

Embodiments provide a refrigerator which is capable of providing a withdrawable structure in a state in which a loss of storage capacity is minimized.

Embodiments also provide a refrigerator that is capable of minimizing an occurrence of noise when a drawer part is elevated.

According to one aspect of the subject matter described in this application, a refrigerator includes: a cabinet that defines a storage space; a drawer door assembly including (i) a front panel door part that is configured to open and close at least a portion of the storage space and (ii) a drawer part that defines an accommodation space; a rail that is configured to movably connect the drawer door assembly to the cabinet and enable the drawer door assembly to insert into and withdraw from the storage space; a driving device located at the front panel door part and configured to provide power; and an elevation device located in the drawer part and configured to be coupled to the driving device, the elevation device being configured to elevate a portion of the drawer part relative to the front panel door part. The driving device includes: a motor assembly configured to provide a driving force; a screw assembly configured to perform an elevation operation based on the driving force from the motor assembly; and a lever that connects the screw assembly to the elevation device and that is configured to rotate based on the elevation operation of the screw assembly.

Implementations according to this aspect may include one or more of the following features. For example, the driving device may further includes a power transmission member that connects the motor assembly to the screw assembly and that is spaced apart from the motor assembly. In some implementations, the screw assembly includes: a housing; a screw that is located inside the housing, that is gear-coupled to an end of the power transmission member, and that is configured to rotate relative to the housing based on power received from the power transmission member; and a screw holder penetrated by the screw and configured to move longitudinally along the screw based on rotation of the screw.

In some implementations, the elevation device includes: a lower frame fixed to the drawer part; an upper frame disposed vertically above the lower frame and configured to support one or more food items or one or more containers in the accommodation space; and a scissors assembly including a plurality of rods that connect the upper frame to the lower frame, that are coupled to each other, and that are configured to rotate about an axis to elevate the upper frame relative to the lower frame. In some examples, the lever is configured to connect the screw holder to a rotation shaft of each of the plurality of rods, where each of the plurality of rods is configured to rotate about the rotation shaft based on movement of the screw holder longitudinally along the screw.

In some implementations, the refrigerator further includes: a first connection part configured to connect a rotation shaft of the lever to a rotation shaft of each of the plurality of rods; and a second connection part spaced apart from the first connection part and configured to connect the lever to each of the plurality of rods at a position offset from the rotation shaft of each of the plurality of rods. The lever may be configured to rotate together with each of the plurality of rods in a state in which the lever is connected to the first connection part and to the second connection part.

In some examples, each of the front panel door part and the drawer part defines an opening corresponding to a rotation path of each of the first connection part and the second connection part.

In some implementations, the screw assembly includes a first screw assembly disposed at a first side of the motor assembly and a second screw assembly disposed at a second side of the motor assembly. The refrigerator may further include a power transmission member that passes through the motor assembly and that is configured to connect to the first screw assembly and to the second screw assembly, the power transmission member having a first end extending to the first screw assembly and a second end extending to the second screw assembly.

In some examples, the power transmission member includes: a shaft driving gear that is gear-coupled to the motor assembly and that is configured to be rotated by the motor assembly; and a screw gear that is disposed at each of the first end and the second end of the power transmission member and that is connected to each of the first screw assembly and the second screw assembly. In some examples, each of the first screw assembly and the second screw assembly extends upward, where a distance between an upper end of the first screw assembly and an upper end of the second screw assembly is greater than a distance between a lower end of the first screw assembly and a lower end the second screw assembly.

In some implementations, the scissors assembly includes a pair of scissors assemblies arranged in parallel to each other, where the driving device is connected to the pair of scissors assembles and configured to provide power to each of the pair of scissors assemblies.

In some implementations, the refrigerator further includes a connection assembly that is disposed between the front panel door part and the drawer part, that is configured to selectively couple the driving device to the elevation device, and that is configured to transmit power from the driving device to the elevation device. In some examples, the front panel door part defines a front panel door opening at a rear surface of the front panel door part, where the connection assembly is exposed through the front panel door opening. In some examples, the front panel door part and the drawer part are configured to be separated from each other based on the connection assembly being decoupled from the elevation device.

In some implementations, the connection assembly includes: a first connection part configured to couple to a rotation shaft of the lever; a second connection part spaced apart from the first connection part and configured to couple to a side of the lever offset from the rotation shaft of the lever; and a connection portion that is connected to the first connection part and to the second connection part. The elevation device may be configured to receive rotation force from both of the first connection part and the second connection part.

In some implementations, the connection assembly includes: a case; a connection member disposed in the case and configured to be connected to the elevation device and to transmit power from the driving device to the elevation device; an elastic member disposed in the case and configured to support the connection member; a cover that is configured to couple to the case and that defines an opening configured to allow a user to manipulate the connection assembly; a push member that is coupled to the connection member, that is exposed through the opening, and that is configured to be manipulated by the user. The push member may be configured to, based on the user's manipulation, move together with the connection member to decouple the connection assembly from the elevation device.

In some examples, the connection member defines a hollow portion configured to receive a rotation shaft of the elevation device, where the connection member is configured to couple to the rotation shaft of the elevation device based on a pressure of the elastic member.

In some implementations, the connection assembly further includes: a lever fixing member located within the case and coupled to the lever, the lever fixing member being configured to rotate together with the lever based on rotation of the lever about a rotation shaft of the lever; and a fixing shaft that extends in an axial direction through the lever fixing member and through the connection member, the fixing shaft being configured to fix the lever fixing member to the connection member to allow the lever fixing member to rotate together with the connection member. The connection member may be configured to move in the axial direction of the fixing shaft to compress the elastic member.

In some examples, the lever includes a lever protrusion that protrudes from a side of the lever, that is spaced apart from the rotation shaft of the lever, and that is configured to couple to the connection member. In some examples, the push member is exposed between the front panel door part and the drawer part. In some examples, the driving device is covered by a front surface of the drawer part in a state in which the front panel door part and the drawer part are coupled to each other.

The details of one or more embodiments are set forth in the accompanying drawings and the description below. Other features will be apparent from the description and drawings, and from the claims.

DETAILED DESCRIPTION OF THE EMBODIMENTS

Hereinafter, detailed embodiments of the present disclosure will be described in detail with reference to the accompanying drawings. However, the scope of the present disclosure is not limited to proposed embodiments, and other regressive inventions or other embodiments included in the scope of the spirits of the present disclosure may be easily proposed through addition, change, deletion, and the like of other elements.

Figure 1:
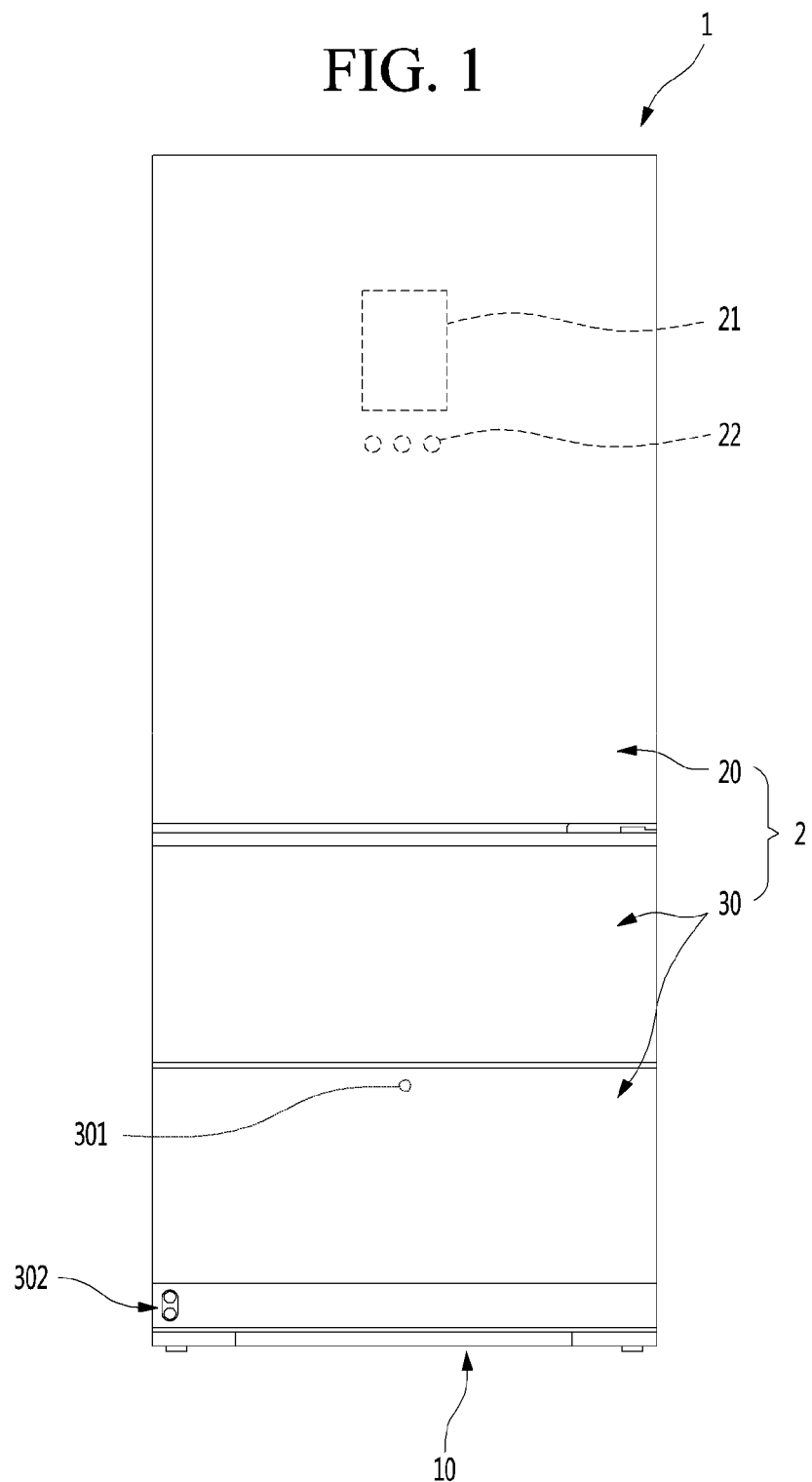
FIG. 1 is a front view of a refrigerator according to an embodiment.
Figure 2:
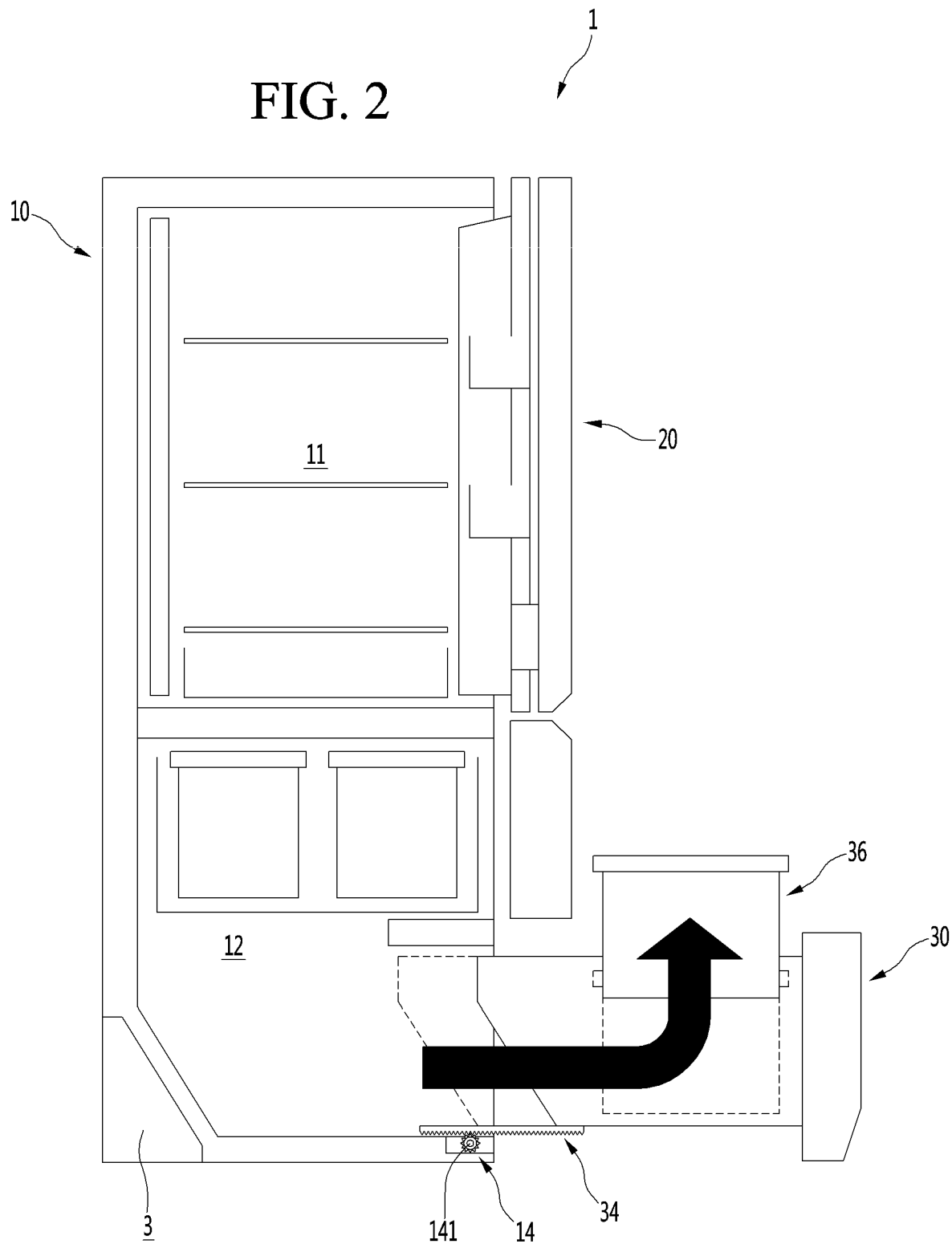
FIG. 2 is a schematic view illustrating a state in which a drawer door of the refrigerator is elevated.

FIG. 1 is a front view of a refrigerator according to an embodiment. Also, FIG. 2 is a schematic view illustrating a state in which a drawer door of the refrigerator is elevated.

As illustrated in the drawing, the refrigerator 1 may have an outer appearance that is defined by a cabinet 10 defining a storage space and a door 2 covering an opened front surface of the cabinet 10.

The storage space of the cabinet 10 may be divided into a plurality of spaces. For example, an upper space 11 of the cabinet 10 may be provided as a refrigerating compartment, and a lower space 12 may be provided as a freezing compartment. Each of the upper space and the lower space may be provided as an independent space that is maintained at a different temperature, except for the refrigerating compartment and the freezing compartment. The upper space and the lower space may be called an upper space and a lower space.

The door 2 may be constituted by a rotation door 20 opening and closing the upper space through rotation thereof and a drawer door 30 opening and closing the lower space by being inserted or withdrawn in a drawer type. The lower space may be vertically divided again. The drawer door 30 may be constituted by an upper drawer door 30 and a lower drawer door 30. Also, an outer appearance of each of the rotation door 20 and the drawer door 30 may be made of a metal material and be exposed to the front side.

Although the refrigerator in which all of the rotation door 20 and the drawer door 30 are provided is described, the present disclosure is not limited thereto. For example, the present disclosure may be applied to all refrigerators including a door that is inserted and withdrawn in the drawer type. Also, the rotation door 20 may be provided at an upper portion and thus called an upper door, and the drawer door 30 may be provided at a lower portion and thus called a lower door.

A display 21 may be disposed on one side of a front surface of the rotation door 20. The display 21 may have a liquid crystal display structure or a 88 segment structure. Also, when the outer appearance of the door 2 is made of the metal material, a plurality of fine holes are punched in the display 21 to display information by using light passing therethrough.

Also, a manipulation part 22 that is capable of manipulating automatic rotation or withdrawal of the upper door 2 or the lower door 2 may be provided on one side of the rotation door 20. The manipulation part 22 may be integrated with the display 21 and may operate in a touch manner or a button manner. The manipulation part 22 may input an overall operation of the refrigerator 1 and manipulate an insertion and withdrawal of the drawer door 30 or an elevation within the drawer door.

A manipulation part 301 may also be provided on the drawer door 30. The manipulation part 301 may be disposed on one side of the drawer door 30 that is disposed at the lowermost portion of the drawer door 30. The manipulation part 301 may operate in a touch or button manner. The manipulation part 301 may be provided as a sensor detecting proximity or movement of a user or provided as an input unit that operates by a user's motion or voice.

As illustrated in the drawing, a manipulation device 302 may be disposed on a lower end of the lower drawer door 30 to illuminate an image on a bottom surface and thereby to output a virtual switch and to input an operation in such a manner that the user approaches a corresponding area.

The lower drawer door 30 may be automatically inserted and withdrawn according to the manipulation of the manipulation part 301. Also, a food or container within the lower drawer door 30 may be elevated in a state in which the drawer door 30 is withdrawn by the manipulation of the manipulation part 301.

That is, the automatic insertion and withdrawal and/or automatic elevation of the lower drawer door 30 may be performed by at least one of a plurality of manipulation devices 22, 301, 302, and 303. As necessary, only one of the plurality of manipulation devices 22, 301, 302, and 303 may be provided.

Particularly, an inclined part 311a may be disposed on a lower portion of a front surface of the lower drawer door 30, and a manipulation device 302 may be mounted on the inclined part 311a. The manipulation device 302 may include a projector light capable of outputting an image and a proximity sensor and may project a virtual switch on the floor in the form of an image to detect the image by the proximity sensor. Of course, the manipulation device 302 may be constituted simply by only a proximity sensor. An automatic insertion and withdrawal and/or elevation of the lower drawer door 30 may be manipulated by the manipulation device.

Also, the manipulation device 303 may be provided on a top surface of the lower drawer door 30. When the manipulation device 303 is provided on the upper surface of the lower drawer door 30, the lower drawer door 30 may not be manipulated because the lower drawer door 30 is not exposed in the closed state. Thus, the manipulation device 303 may be used for elevating the lower drawer door 30.

The manipulation devices 22, 301, 302, and 303 may be used to insert/withdraw and elevate the lower drawer door 30. Also, the insertion/withdrawal and the elevation may be performed by a combination or sequential operation of the plurality of manipulation devices 22, 301, 302, and 303.

The lower drawer door 30 may be a storage space defined in a lower side of the refrigerator 1 and may withdraw the lower drawer door 30 forward to accommodate a food stored in the lower drawer door 30, and then, the container 36 inside the drawer door 30 may be manipulated to be elevated.

The container 36 may have a predetermined height. Since the container 36 is seated on the elevation device 80, the height of the container 36 may increase by the height of the elevation device 80 when the elevation device 80 is elevated. Thus, when the elevation device 80 ascends, the container 36 may be disposed at a point at which the user is easily accessed to the container 36 and also easily lift the container 36.

Thus, the container 326 may be completely accommodated in the accommodation part when the door 30 is inserted and withdrawn. When the elevation device ascends, the container 36 may be disposed at a higher position than the lower storage space 12.

Although the shape of the container 36 is not limited, the container 36 may have a shape corresponding to the size of the front space S1 and may have a predetermined height to prevent the stored food from being separated when the elevation device 80 ascends.

The food or container 36 inside the lower drawer door 30 disposed at the lowest position may be more easily lifted and used through the above-described manipulation.

The lower drawer door 30 may be automatically inserted and withdrawn forward and backward by the draw-out motor 14, the pinion 141 provided in the cabinet 10, and the draw-out rack 34 provided on the bottom surface of the lower drawer door 30.

Also, the container inside the lower drawer door 30 may be elevated by the driving device 40 and the elevation device 80 provided in the lower drawer door 30.

Hereinafter, the lower drawer door 30 and an operation of the lower drawer door 30 will be described in more detail, and also, the lower drawer door 30 will be called a drawer door or a door unless otherwise specified.

The embodiments are not limited to the number and shape of the drawer doors and may be applied to all refrigerators having a door that is inserted and withdrawn in a drawer type into/from the lower storage space.

Figure 3:
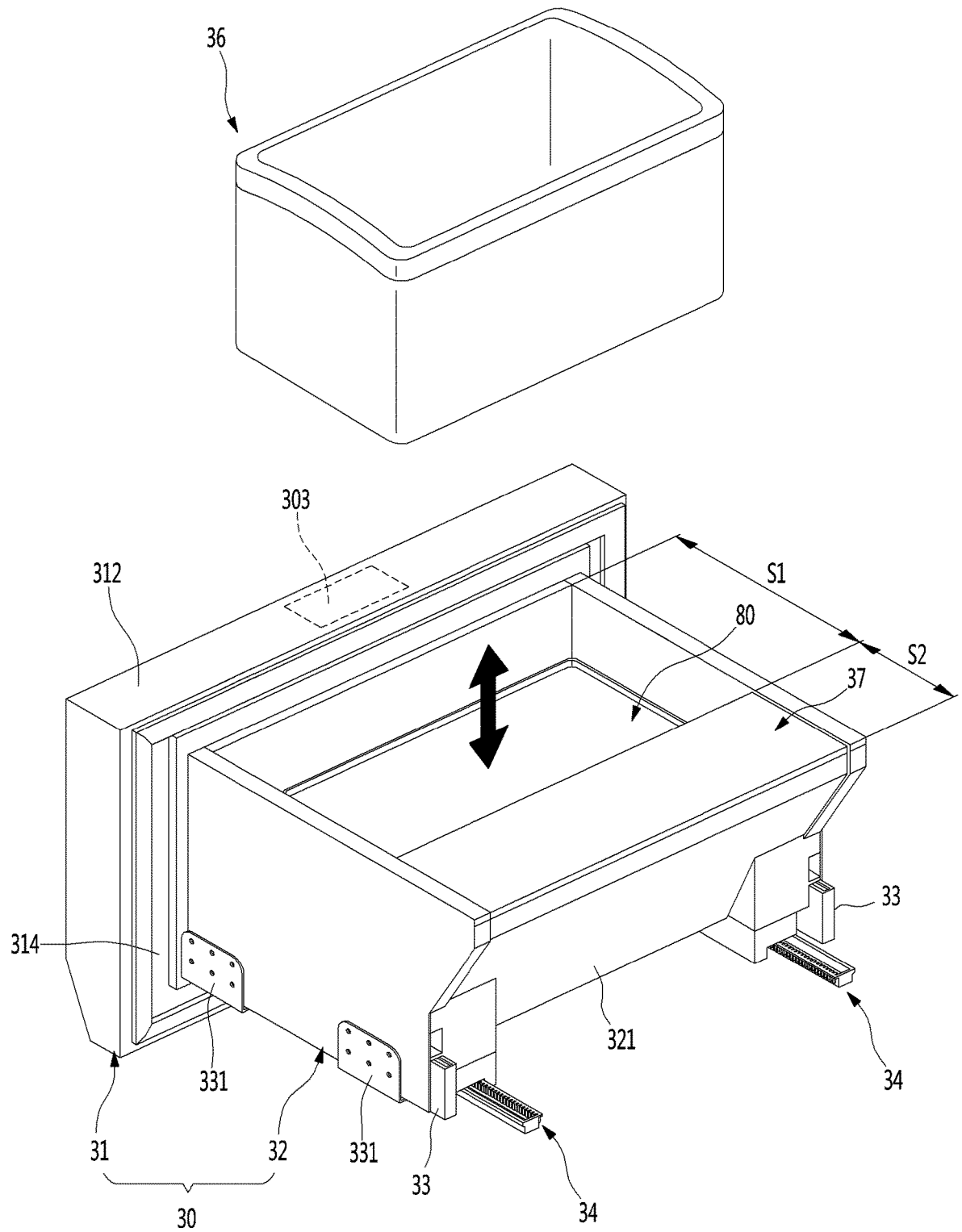
FIG. 3 is a perspective view illustrating a state in which a container of the drawer door is separated.
Figure 4:
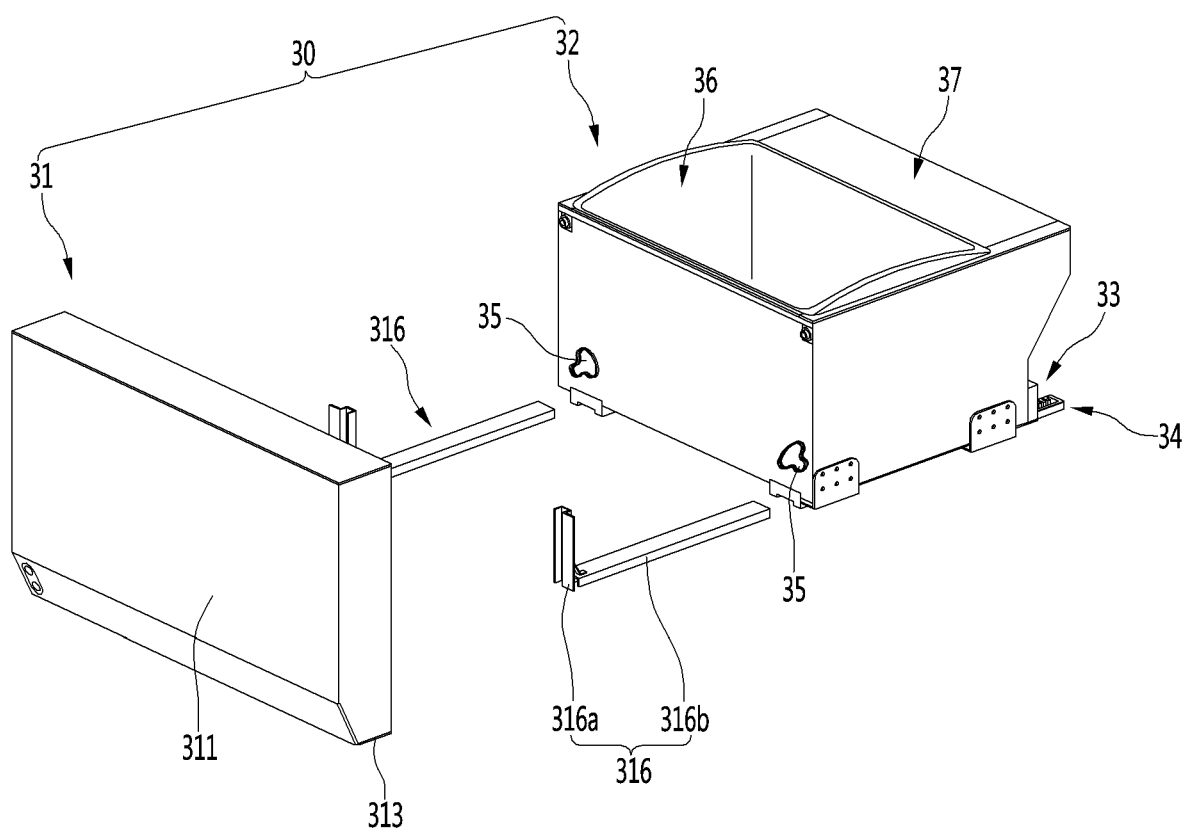
FIG. 4 is an exploded perspective view illustrating a state in which a drawer part of a drawer door and a front panel door part are separated from each other when viewed from a front side.

FIG. 3 is a perspective view illustrating a state in which a container of the drawer door is separated. Also, FIG. 4 is an exploded perspective view illustrating a state in which the drawer part of the drawer door and the front panel door part are separated from each other when viewed from a front side.

As illustrated in the drawings, the door 30 may include a front panel door part 31 opening and closing the storage space and a drawer part 32 coupled to a rear surface of the front panel door part 31 and inserted and withdrawn together with the front panel door part 31.

The front panel door part 31 may be exposed to the outside of the cabinet 10 to define an outer appearance of the refrigerator 1, and the drawer part 32 may be disposed inside the cabinet 10 to define an storage space. Also, the front panel door part 31 and the drawer part 32 may be coupled to each other and inserted and withdrawn forward and backward together with each other.

The drawer part 32 may be disposed on the rear surface of the front panel door part 31 to define a space in which the food or container to be stored is accommodated. The inside of the drawer part 32 may provide an upwardly opened storage space, and an outer appearance of the drawer part 32 may be defined by a plurality of plates (see reference numerals 391, 392, and 395 in FIG. 19). Each of the plurality of plates 391, 392, and 395 may be made of a metal material and provided inside and outside the drawer part 32 so that the entire drawer part 32 is made of stainless steel or a material having a texture such as stainless steel.

In the state in which the door 30 is inserted, a machine room 3 in which a compressor and a condenser constituting a refrigeration cycle are provided may be disposed behind the door 30. Thus, a rear end of the drawer part 32 may have a shape of which an upper end further protrudes from a lower end, and an inclined surface 321 may be provided on a rear surface of the drawer part 32.

Also, a draw-out rail 33 guiding the insertion and withdrawal of the door 30 may be provided on each of both side surfaces of the drawer part 32. The door 30 may be mounted to be inserted into or withdrawn from the cabinet 10 by the draw-out rail 33. The draw-out rail 33 may be covered by an outer side plate 391 and thus may not be exposed to the outside. The draw-out rail 33 may have a rail structure that is capable of extending in multistage.

A rail bracket 331 may be provided in the draw-out rail 33, and the rail bracket 331 may extend from one side of the draw-out rail 33 to both sides of the drawer part 32. Also, the rail bracket 331 may be fixedly coupled to a sidewall surface inside the refrigerator. Thus, the drawer part 32, that is, the door 30, may be mounted to the cabinet 10 by the draw-out rails 33.

Also, the draw-out rail 33 may be provided on a lower end of each of both the side surfaces of the drawer part 32. Thus, it may be understood that the draw-out rail 33 is disposed on the bottom surface of the drawer part 32. Thus, the draw-out rail 33 may be provided at a lower ends of each of both sides of the drawer part 32 and may be called an under rail.

A draw-out rack 34 may be disposed on the bottom surface of the drawer part 32. The draw-out rack 34 may be disposed on each of both sides and be interlocked with an operation of a draw-out motor 14 mounted on the cabinet 10 to automatically insert and withdraw the door 30. That is, when an operation is inputted into the manipulation parts 22 and 301, the draw-out motor 14 may be driven to insert and withdraw the door 30 according to movement of the draw-out rack 34. Here, the door 30 may be stably inserted and withdrawn by the draw-out rail 33.

The draw-out rack 34 may not be provided on the drawer part 32. Here, the user may hold a side of the front panel door part 31 to push and pull the front panel door part 31 so that the door 30 is directly inserted and withdrawn.

The inside of the drawer part 32 may be divided into a front space S1 and a rear space S2. The elevation member 80 that is vertically elevated and a container seated on the elevation member 80 to be elevated together with the elevation member 80 may be disposed in the front space S1.

Although the container 36 is illustrated in the form of a basket having an opened upper portion, the container 36 may have a closed box structure such as a kimchi box. Also, a plurality of containers 36 may be stacked or arranged in parallel to each other.

Also, when the door 30 is withdrawn, the entire drawer part 32 may not be withdrawn to the outside of the storage space due to a limitation in draw-out distance of the door 30. That is, at least the front space S1 is withdrawn to the outside of the storage space, and the whole or a portion of the rear space S2 is disposed inside the storage space within the cabinet 10.

In such a structure, a draw-out distance of the door 30 may be limited by the draw-out rack 34 or the draw-out rail 33. As the draw-out distance becomes longer, the moment applied to the door 30 may become larger in the draw-out state, and thus it is difficult to maintain a stable state, and the deformation or damage of the draw-out rail 33 or the draw-out rack 34 may occur.

The elevation device 80 and the container 36 may be accommodated in the front space S1. While the elevation device is elevated, the food or container 36 seated on the elevation device 80 may be elevated together. Also, the elevation device 80 may be provided below the container 36, and the elevation device 80 may be covered by the container 36 when the container 36 is mounted. Thus, any constituent of the elevation device 80 will not be exposed to the outside.

A separate drawer cover 37 may be provided in the rear space S2. The front space S1 and the rear space S2 may be partitioned by the drawer cover 37. In a state in which the drawer cover 37 is mounted, a space in which front and top surfaces of the rear space S2 are covered and not be used may be not be exposed to the outside.

However, when the drawer cover 37 is separated, the user may be accessible to the rear space S2, and thus, foods may be easily accommodated in the rear space S2. To utilize the rear space S2, a separate pocket or a container corresponding to the shape of the rear space may be disposed in the rear space S2.

Also, the elevation device 80 inside the drawer part 32 may be simply separated and mounted to utilize the entire space inside the drawer part 32, and the elevation device 80 and the drawer cover 37 may be separated from each other to utilize the entire space of the drawer part 32.

The outer appearance of each of the inner and outer surfaces of the drawer part 32 may be defined by the separate plates 391, 392 and 395, which cover the components mounted on the drawer part 32, and thus, the outer and inner appearances may be seen to be neat. The plates 391, 392, and 395 may be constituted by a plurality of plates and may be made of stainless steel to provide a more luxurious and clean appearance.

As illustrated in the drawings, the front panel door part 31 and the drawer part 32 constituting the door 30 may be coupled to be separated from each other. Thus, assembling workability and serviceability may be improved through the separable structure of the front panel door part 31 and the drawer part 32.

A rear surface of the front panel door part 31 and a front surface of the drawer part 32 may be coupled to each other. When the front panel door part 31 and the drawer part 32 are coupled to each other, power for the elevation of the elevation device 80 may be provided. The driving device 40 for elevating the elevating device 80 may be disposed on the front panel door part 31, and the front panel door part 31 and the drawer part 32 may be selectively connected to each other.

Particularly, the driving device 40 provided in the front panel door part 31 may be configured to receive power from the power source and to transmit the power to the elevation part 80. Thus, it is possible to remove the front panel door part 31 when the service of the driving device 40 is necessary and to take measures simply by replacing only the front panel door part 31.

The front panel door part 31 and the drawer part 32 may be coupled by a pair of door frames 316 provided on both sides. The door frame 316 includes a door coupling part 316*a* extending upward and downward to be coupled to the front panel door part 31 and a drawer coupling part 316*b* extending backward from a lower end of the door coupling portion 316*a*. The door coupling part 316*a* may be coupled to the front panel door part 31 by a separate coupling member and may be coupled to one side of the front panel door part 31 by a simple coupling structure. Also, the drawer coupling part 316*b* may be disposed on both sides of the drawer part 32 and adjacent to the draw-out rail 33.

The drawer coupling part 316*b* may be inserted into the drawer part 32 to support the drawer part 32 in a state in which the door coupling part 316*a* is coupled to the front panel door part 31. Also, the drawer coupling part 316*b* may be coupled to the drawer part 32 by a separate coupling member or may be coupled by a structure that mutually match the drawer coupling part 316*b*.

Also, a connection assembly 70 may be provided on the rear surface of the door 30 so that the driving device 40 and the elevation are 80 are connected to each other when the front panel door part 31 and the drawer part 32 are coupled. A drawer opening 35 through which a part of the elevation device 80 is exposed may be defined in a position corresponding to the connection assembly 70 on the front surface of the drawer part 32.

The front panel door part 31 may be configured to substantially open and close the storage space of the cabinet 10 and to define the front surface of the refrigerator 1.

The front panel door part 31 may have an outer appearance that is defined by an outer case 311 defining a front surface and a portion of a circumferential surface, a door liner 314 defining a rear surface, and an upper deco 312 and a lower deco 313 which respectively define top and bottom surfaces. Also, an insulation material 300 may be filled in the inside of the front panel door part 31 between an outer case 311 and a door liner 314.

Hereinafter, the front panel door part 31 and the driving assembly constituting the door 30 will be described in more detail with reference to the drawings.

Figure 5:
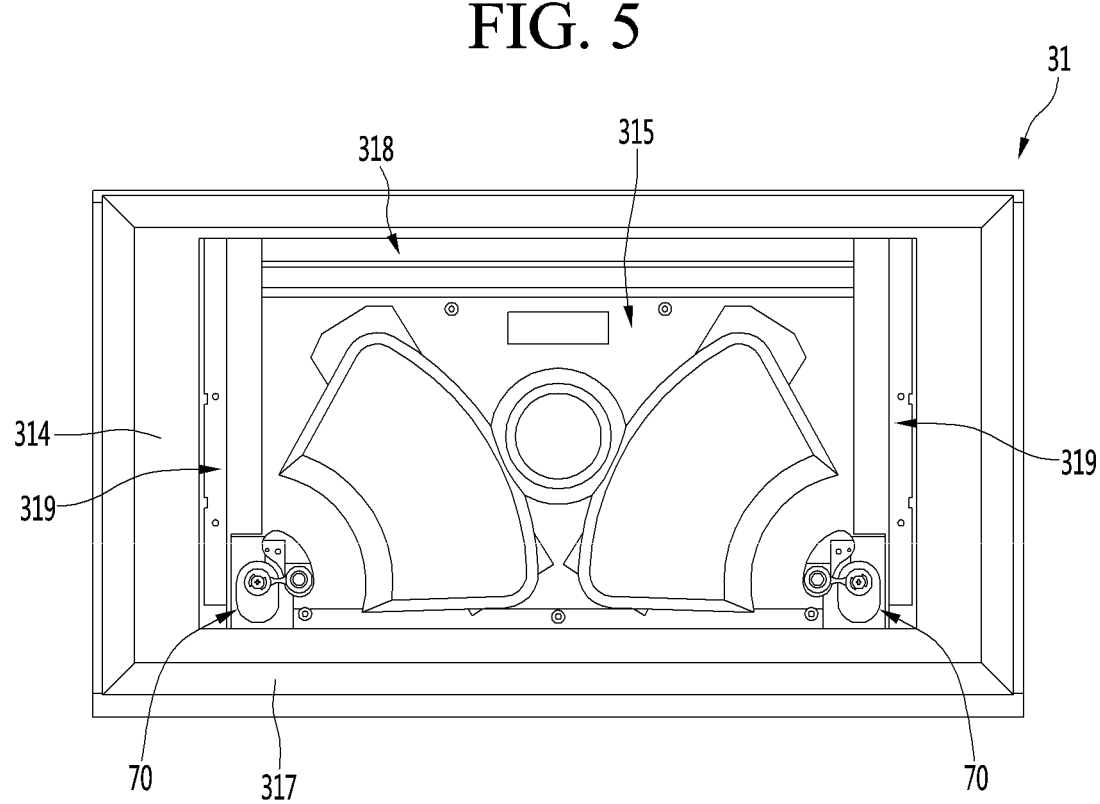
FIG. 5 is a rear view of the front panel door part.
Figure 6:
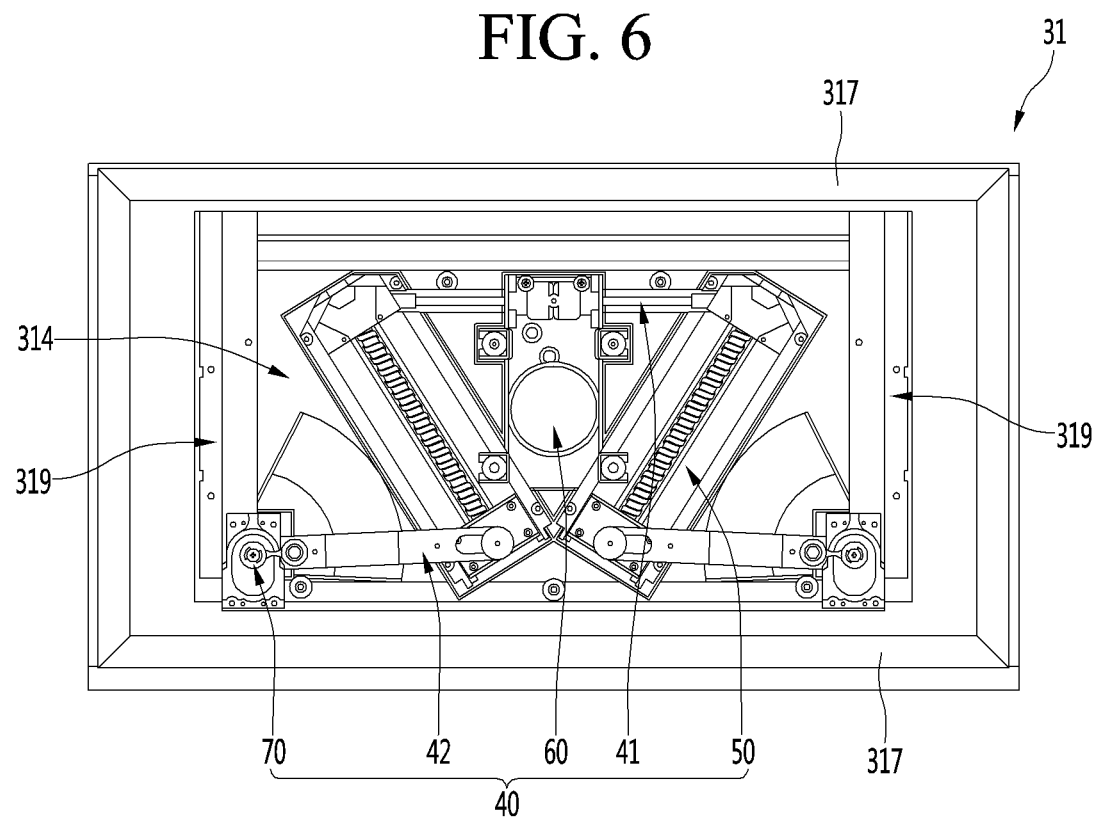
FIG. 6 is a rear view illustrating a state in which a door cover of the front panel door part is removed.
Figure 7:
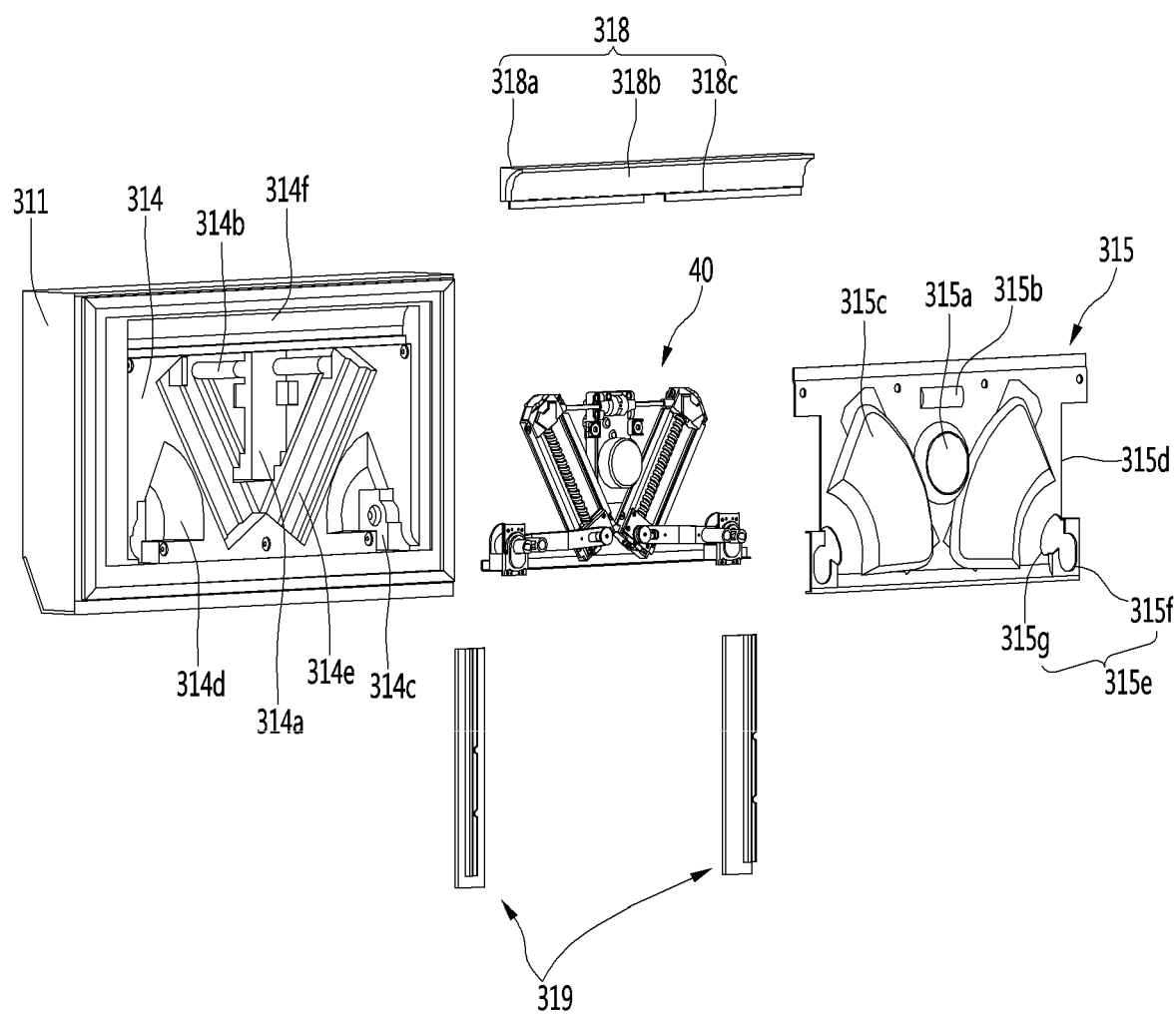
FIG. 7 is an exploded perspective view of the front panel door part.

FIG. 5 is a rear view of the front panel door part. Also, FIG. 6 is a rear view illustrating a state in which a door cover of the front panel door part is removed. Also, FIG. 7 is an exploded perspective view of the front panel door part.

A front surface of the front panel door part 31 may be defined by the out plate 311, and a rear surface may be defined by the door liner 314. Also, a driving device 40 for operating the elevation device 80 may be provided inside the front panel door part 31. Although the driving device 40 may be disposed inside the front panel door part 31, the driving device 40 but is not embedded in the insulation material 300 but is disposed inside the space defined by the door liner 314. Then, the driving device 40 may be covered by the door cover 315 and thus may not be exposed to the outside.

In detail, the insulating material 300 may be filled between the outer plate 311 and the door liner 314 to insulate the inside of the storage space 12. Also, the door liner 314 may have a plurality of door recess parts that are recessed inward. The door recess parts may be defined in a shape corresponding to the shape of the elevation device 80 and may be recessed inside the door 30.

The door recess parts may include a motor recess part 314*a*, a shaft recess part 314*b*, a connector recess part 314*c*, a lever recess part 314*d*, and a screw recess part 314*e*. Thus, the door recess parts may have shapes respectively corresponding to the constituents of the elevation device 80 so that the entire elevation device 80 is inserted into the inner space of the door 30. Particularly, the lever recess part 314*d* may include a rotation region of the lever 42 so that the lever 42 smoothly rotates during the operation of the driving device 40.

Also, the door recess part may include a light recess part 314*f*. The light recess part 314*f* may be recessed in an upper end of the rear surface of the door 30. A door light 318 may be provided in the light recess part 314*f*, and the inside of the door 30 may be illuminated by the door light 318.

In detail, the door light 318 may be defined to be long in the lateral direction from the left side to the right side of the rear surface of the door 30 and may be disposed at the uppermost position of the inner side regions of a gaskets 317 disposed along the rear surface of the door 30.

The door light 318 may include a plurality of LEDs 138*c* and a light guide 318*a* for guiding light emitted from the LEDs 138*c* to the inside of the door 30, i.e., the inside of the drawer part 32.

A plurality of the LEDs 138*c* are disposed along the lower ends of the light guide 318*a* and may be arranged to face the upper surface of the door 30 so that light is irradiated to the inner surfaces of the light guide 318*a*.

The light guide 318*a* may have a shape corresponding to the light recess part 314*f* and may have a curved surface. The light irradiated from the lower LEDs 138*c* may be irradiated backward and downward to illuminate the inside of the drawer part 32. The curved surface may be coated or surface-treated to reflect light and may be called a reflection surface.

A light cover 318*b* spaced apart from the front of the light guide 318*a* may be disposed on the door light 318. The light cover 318*b* may also have a curved shape. Also, the light cover 318*b* may be made of a transparent material capable of transmitting light. Thus, the light reflected from the light guide 318*a* may be directed toward the inside of the drawer part 32. Also, the light guide 318*a* may guide an inflow of cool air to the inside of a space in which the driving device 40 is disposed to cool the driving device 40.

For this, the light cover 318*b* may be exposed to the rear surface of the door 30, and the lower surface of the curved surface of the light cover 318*b* may be separated from the door cover 315 to define a space through which the cool air flows. Also, the air that cools the driving device 40 may be discharged through a front panel door opening 315*e* at a lower end of the door cover 315. Thus, the cooling device may circulates the cool air circulating on the rear surface of the front panel door part 31 to cool the driving device 40 and assist the cooling circulation in the area around the drawer part 32. Thus, the lower storage space 12 may be uniformly cooled.

The door cover 315 may be configured to define an outer appearance of the rear surface of the front panel door part 31 and may be configured to cover the driving device 40 mounted on the front panel door part 31. The door cover 315 may have a plate shape to cover the driving device 40 so that the door cover 315 is not exposed in the driving device 40 is mounted.

The door cover 315 may have the cover recess part at a corresponding position to cover the driving device 40 from the rear side. The cover recess part may be recessed from the front surface of the door cover 315, i.e., the driving device 40, and the rear surface of the door cover 315 may protrude toward the inside of the storage space. The cover recess part may include a motor recess part 315a, a shaft recess part 315b, and a lever recess part 315c. Particularly, the lever recess part 315c may include a rotation region of the lever 42 so that the lever 42 smoothly rotates during the operation of the driving device 40.

An upper end of the door cover 315 may be spaced apart from an upper end of the rear surface of the front panel door part 31, and thus, the door light 318 may be exposed. Thus, a space for irradiating light to the inside of the drawer part 32 may be secured, and a space for supplying the cold air to the driving device 40 may be provided.

Also, a side cutout part 315d may be defined in the left and right ends of the door cover 315. The side cutout part 315d may be a portion that exposes the supporter 319 to be coupled with the door frame 316 and may be defined inward in a shape corresponding to the supporter 319.

Also, a front panel door opening 315e may be defined in each of lower left and right sides of the door cover 315. The front panel door opening 315e may be defined so that a portion of the connection assembly 70 passes through the door opening 315e to protrude from the rear surface of the front panel door part 31. Also, the front panel door opening 315e may have a corresponding shape at a position facing the drawer opening 35. Thus, a portion of the connection assembly 70 exposed through the front panel door opening 315e when the front panel door part 31 and the drawer part 32 are coupled may be coupled to the elevation device 80 to transmit the power.

The supporter 319 may be made of a metal material and fixedly mounted on the rear surface of the front panel door part 31. Also, the supporter 319 may be exposed to both sides of the rear surface of the front panel door part 31 and may be firmly coupled to the door coupling part 316a of the door frame 316 to maintain the state in which the front panel door part 31 is fixed and mounted on the drawer part 32.

The front panel door opening 315e may include a through-part 315g and a guide part 315f, and the through-part 315g may be opened to allow the connecting assembly 70 to be manipulated. The guide part 315f may be opened along an operation path of the connection assembly 70 operating when the driving device 40 operates. Also, the front panel door opening 315e may be defined in a position facing the drawer opening 35 and may have the same shape as that of the drawer opening 35.

In detail, the through-part 315g may be defined in a shape corresponding to the push part 741 of at least the connection assembly 70. Thus, the user may manipulate the push part 741 exposed through the through-portion 315g to selectively separate the connection assembly 70 and the elevation device 80 from each other.

Also, the guide part 315f may be opened to correspond to the rotation path of the connection member 73 rotating together with the rotation of the lever 42 rotated when the driving device 40 is driven. Thus, when the lever 42 and the connection member 73 rotate, the lever 42 and the connection member 73 may rotate without interfering with the door cover 315.

The front panel door opening 315e may pass through the rear portion of the front panel door part 31 to expose the connection assembly 70. However, when the front panel door opening 315e is engaged with the drawer part 32, the exposed portion may be covered.

However, the front panel door opening 315e may be defined in a position farther forward than the cover recess part. Thus, when the push part 741 and the drawer part 32 are coupled to each other, the push part 741 and the front surface of the drawer part 32 may be slightly spaced apart from each other. Thus, the user may manipulate the push part 741 by inserting the hand into the space between the front panel door part 31 and the drawer part 32 in a state in which the front panel door part 31 and the drawer part 32 are coupled to each other.

The door gasket 317 may be provided along the rear surface of the front panel door part 31. When the door 30 is closed, the door gasket 317 may airtightly contact the front surface of the cabinet 10 in the state in which the door 30 is closed.

The driving device 40 may be disposed inside the front panel door part 31 by being covered by the door cover 315. The driving device 40 may transmit the power to the elevation device 80 by the connecting assembly 70 and also transmit the power to both sides of the elevation device 80 through the connecting assemblies 70 disposed on both sides at the same time. Thus, the elevation device 80 may ascend and descend in the horizontal state at both left and right sides without being tilted or biased to one side under any situation.

Hereinafter, the constituents of the driving device 40 will now be described in more detail with reference to the accompanying drawings.

Figure 8:
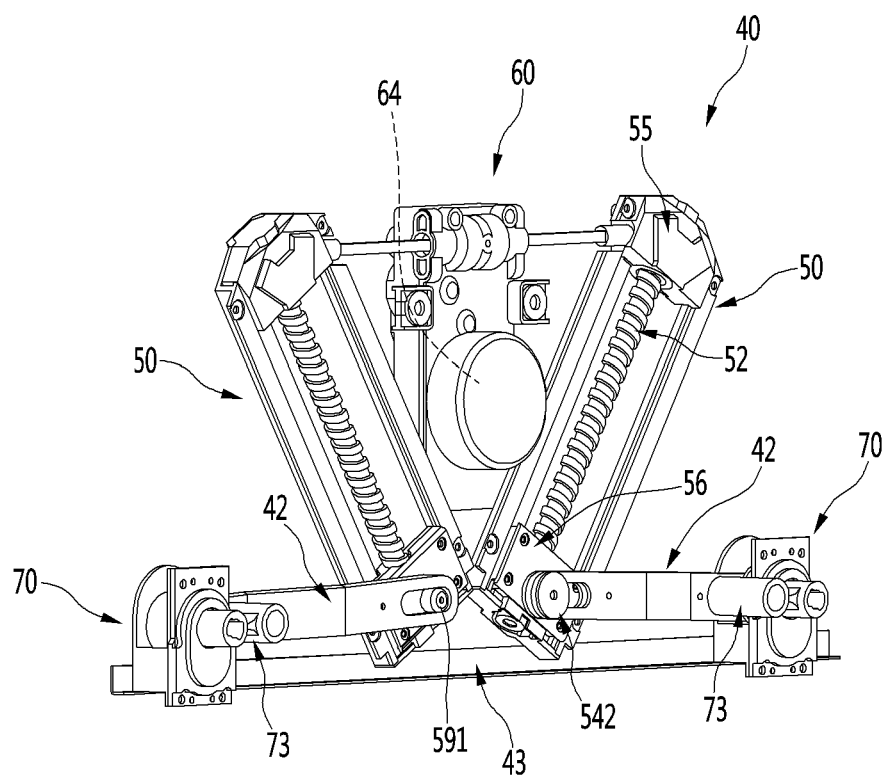
FIG. 8 is a perspective view of a driving device according to an embodiment.
Figure 9:
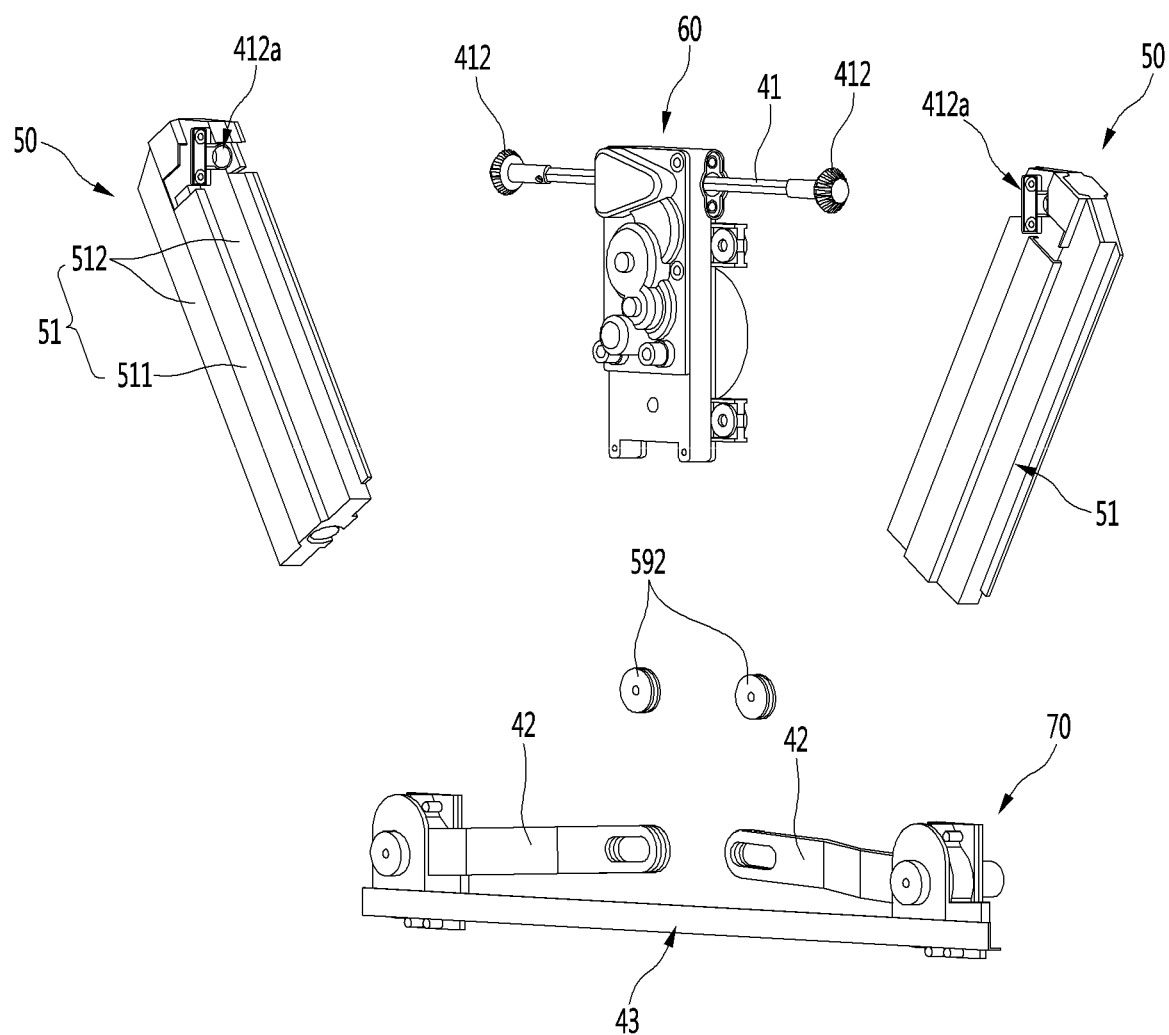
FIG. 9 is an exploded perspective view of the driving device.

FIG. 8 is a perspective view of the driving device according to an embodiment. Also, FIG. 9 is an exploded perspective view of the driving device.

As illustrated in the drawings, the driving device 40 may include a motor assembly 60, a screw assembly 50 disposed on each of both sides of the motor assembly 60 and connected by a shaft 41, a lever 42 connected to the screw assembly 50, and the connecting assembly 70.

In detail, the motor assembly 60 may be disposed at a center of each of the left and right sides of the front panel door part 31. Also, the driving device 40 may provide the power for elevating the elevating device 80. The driving device 40 may allow both the screw assemblies 50 and the lever 42 to operate by the motor assembly including one driving motor 64.

Particularly, the motor assembly 60 may adjust magnitude of the decelerated and transmitted force through a combination of the plurality of gears. Also, a shaft 41 passing through the motor assembly 60 from the left to the right, i.e., in a horizontal direction may be disposed on an upper end of the motor assembly 60, and the plurality of gears may be combined in the motor assembly 60 for rotation of the shaft 41.

Also, the motor assembly 60 may have a structure in which the driving motor 64 and the gears are arranged vertically to minimize a space recessed when the motor assembly 60 is mounted on the front panel door part 31, in particular, a width in the left and right direction is widened, and a thickness in the front and rear direction is minimized. Also, the driving motor 64 constituting the motor assembly 60 may protrude toward the drawer part 32 to minimize a depth of the front panel door part 31 to secure insulation performance.

The shaft 41 may pass through the motor assembly 60 in the transverse direction and be coupled to the screw assembly 50 disposed at both sides of the motor assembly 60 so that the power of the motor assembly 60 is simultaneously to the screw assembly (50). Thus, the shaft 41 may be called a power transmission member.

For this, the shaft 41 may have a length such that both ends of the shaft 41 pass through the motor assembly 60 and are inserted into the screw assembly 50. Also, a shaft driving gear 411 may be provided at a center of the shaft 41. The shaft driving gear 411 may be coupled to the gears in the motor assembly 60 to rotate. Also, a shaft gear 412 may be disposed on each of both ends of the shaft 41. The shaft gear 412 may have a structure that is coupled to the screw assembly 50. The shaft gears 412 may have the same structure so that the same rotation force is applied to the shaft gears 412. The screw assembly 50 may be transferred to the screw assembly 50 so that the screw assembly 50 operates simultaneously.

The screw assemblies 50 may be disposed on both sides of the motor assembly 60. The upper end of the screw assembly 50 may be connected to the shaft 41. The shaft gear 412 is gear-coupled to transmit the power so that the screw 52 rotates, and a screw holder 56 moves along the screw 52. Also, the lever 42 may be coupled to the screw holder 56 to allow the lever 42 to rotate according to the movement of the screw holder 56.

For this, the upper end of the screw assembly 50 may be oriented outward, and the lower end of the screw assembly 50 may be inclined inward. Here, the screw assemblies 50 on both sides may be symmetrical to each other with respect to the motor assembly 60. Thus, the motor assembly 60 may be disposed between the screw assemblies 50 located on both sides of the screw assembly 50. The screw assembly 50 disposed on both sides of the motor assembly 60 may be provided so that a distance between the screw assemblies 50 gradually increases from the upper end to the lower end.

The screws 52 provided in the screw assembly 50 may be arranged in the same direction as the screw assembly 50, and extension lines of the screws 52 on both the left and right sides may cross each other. Also, the screw holder 56 may move along the screw 52 according to the rotation of the screw 52, and the lever 42 connected to the screw holder 56 may rotate along the connection assembly 70. The screw assembly 50, the lever 42, and the connection assembly 70 may be symmetrical to each other so that the lever 42 simultaneously rotates at the same angle as the screw assembly 50 is driven.

The lever 42 may connect the screw holder 56 to the connecting assembly 70. Thus, both ends of the lever 42 may be rotatably coupled to the screw holder 56 and the connecting assembly 70, respectively. Thus, when the screw holder 56 linearly moves, the lever 42 may be rotatable about the connecting assembly 70.

The connection assemblies 70 disposed on both the left and right sides may be connected to each other by a connector bracket 43, and the connection assembly 70 may be firmly supported on the front panel door part 31 to effectively transmit the rotation force to the elevation device 80.

Hereinafter, each constituent provided in the driving device 40 having the above-described structure will be described in more detail with reference to the drawings.

Figure 10:
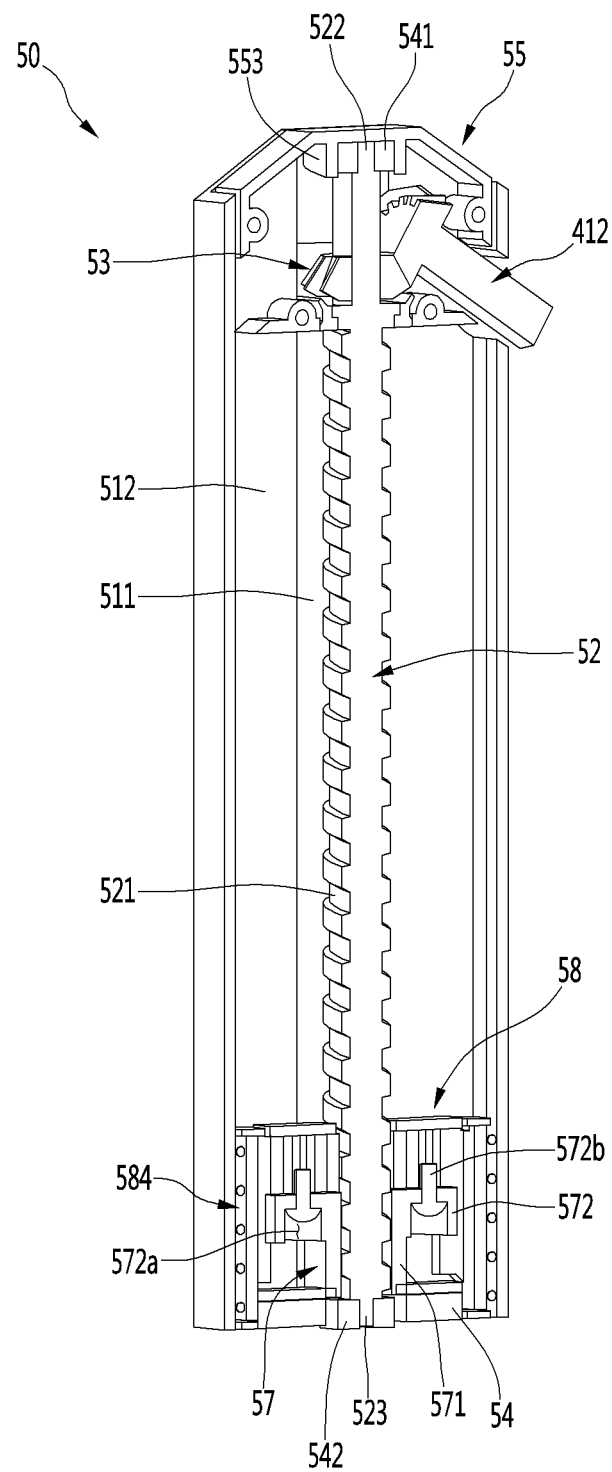
FIG. 10 is a cross-sectional view of a screw assembly that is one component of the driving device.
Figure 11:
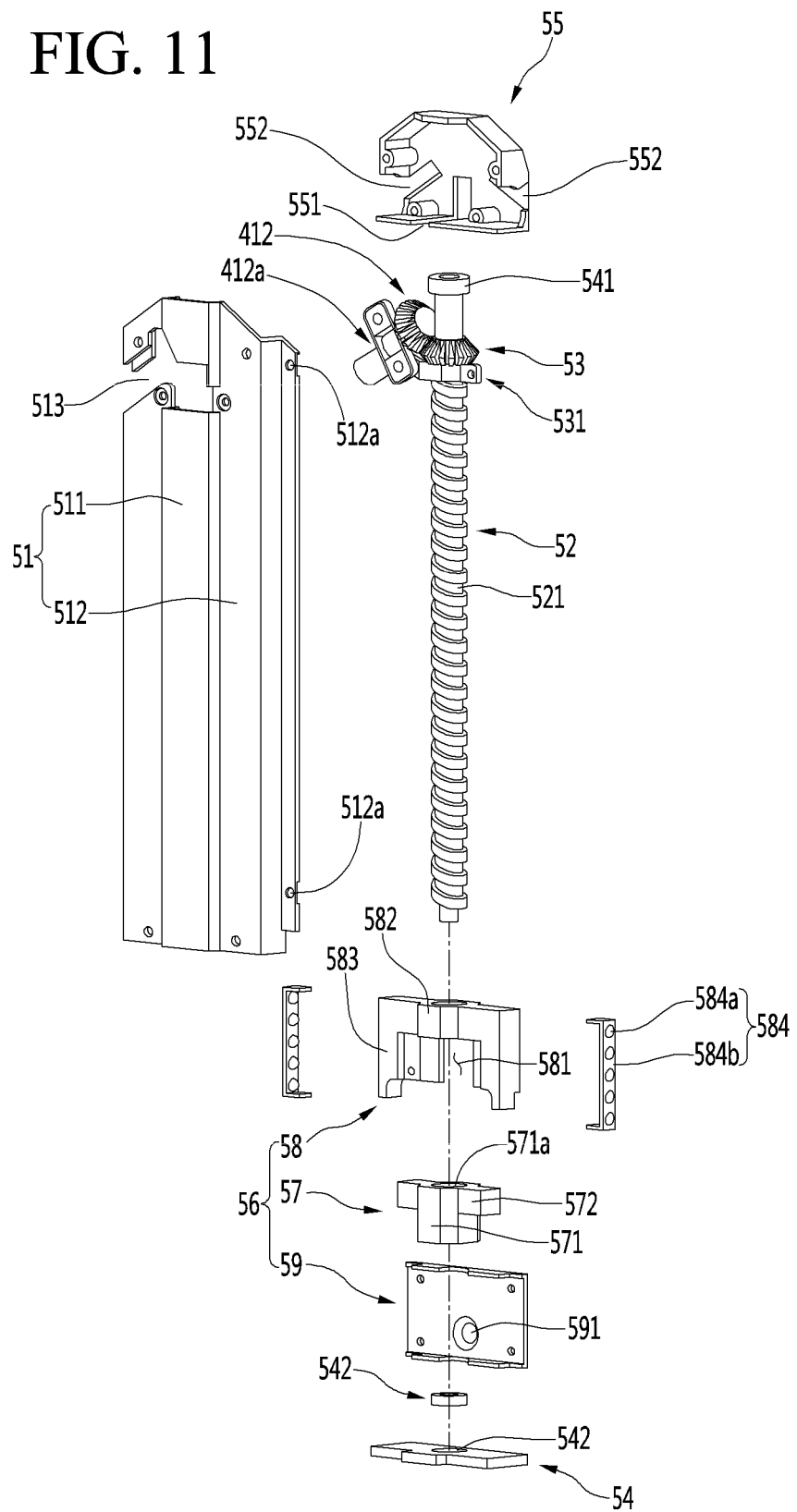
FIG. 11 is an exploded perspective view of the screw assembly.

FIG. 10 is a cross-sectional view of the screw assembly that is one component of the driving device. Also, FIG. 11 is an exploded perspective view of the screw assembly.

The screw assembly 50 may be disposed on each of both left and right sides of the inside of the front panel door part 31. Since the structure and the shape of the screw assembly 50 are different from each other only in the mounted position, only the screw assembly 50 will now be described.

As illustrated in the drawings, the screw assembly 50 may include a housing 51, a housing cover 55 for covering an opened upper surface of the housing 51, a screw 52 provided inside the housing 51, and a screw holder 56 which moves along the screw holder 56.

The housing 51 may define an outer appearance of the screw assembly 50 and provide a space in which a screw 52 and a screw holder 56 are accommodated. The opened upper surface of the housing cover 55 may be covered by the housing cover 55.

The housing 51 may be made of by bending a plate-shaped metal material, or may be made of a plastic material. The housing 51 may include the central portion 511 and the side portion 512. Also, a central portion 511 may be disposed at a position corresponding to the screw 52, and at least a portion of the screw 52 may be accommodated in the central portion 511. The central portion 511 may have a space in which the screw holder 56 coupled to the screw 52 moves vertically.

The side part 512 may extend to be stepped at both sides of the central portion 511 and also extend from both side ends to both sides of the central portion 511 and be vertically bent to define both the side surfaces of the housing 51 and then be bent again inward from an end of both the side surfaces of the housing 51.

Thus, a space in which the screw 52 and the screw holder 56 are accommodated may be defined in the housing 51 by the side portion 512. Also, both side ends of the side portion 512 may be bent outward, and a hole 512*a* into which the coupling member is coupled may be defined in a state of being seated in the door recess part so that the housing 51 is fixed and mounted on the door liner 314.

The shape of the screw recess part 314*e* disposed in the door liner 314 may have a stepped structure like the shape of the outer surface of the housing 51. Thus, the door recess part and the outer surface of the housing 51 may be mutually coupled to each other so that the screw assembly 50 is firmly fixed without moving or being separated during the operation.

A housing cutout 513 may be disposed on the upper portion of the housing 51. The housing cutout part 513 may be defined in a position corresponding to the position of the shaft gear 412 and the screw gear 53 disposed inside the housing 51. The housing cutout part 513 may be defined by cutting the shaft gear 412. That is, the housing cutout part 513 may be cut so that the shaft gear 412 and the screw gear 53 do not interfere with each other when the shaft gear 412 and the screw gear 53 are coupled to each other.

The screw 52 may be accommodated in the housing 51 and disposed at the central portion 511. Also, the screw 52 may be disposed on an outer circumferential surface of the screw 52. Thus, the screw holder 56 may move vertically along the screw 52 when the screw 52 rotates.

A lower spacer 542 on which the screw 52 is rotatably supported may be disposed at a lower end the screw 52. A lower protrusion 523 protruding downward may be inserted into the screw 52. The lower spacer may have the same structure as the bearing. Thus, the screw 52 may rotate in the state of being supported on the lower spacer 542.

The lower spacer 542 may be fixed and mounted on the lower cap 54. The lower cap 54 may be mounted to cover the opened bottom surface of the housing 51 and define the bottom surface of the screw assembly 50.

The screw 52 may extend up to the upper end of the housing 51, and the screw gear 53 and an upper spacer 541 may be mounted on the screw 52.

The screw gear 53 may be disposed on an upper end of the screw thread 521 and be integrally coupled to the screw 52 to rotate together with the screw 52. Also, the screw gear 53 may be gear-coupled to the shaft 41 in the state of crossing the shaft gear 412 mounted on the shaft 41. Thus, the screw gear 53 and the shaft gear 412 may have the same shape as a bevel gear and provide a structure capable of transmitting the power in a crossing state.

An upper protrusion 522 extending upward may be disposed on the upper end of the screw 52. Also, the upper spacer 541 may be mounted to pass through the upper protrusion 522. Also, the upper spacer 541 may be fixed to the inside of the housing cover 55 to rotatably support the upper end of the screw 52.

As described above, the upper and lower ends of the screw 52 may be rotatably supported by the upper spacer 541 and the lower spacer 542. Also, the screw 52 may rotate by the power transmitted to the screw gear 53 by the shaft gear 412, and the screw holder 56 may be elevated by the power.

The screw holder 56 may include a lift block 57, a holder body 58, and a holder cover 59.

The elevation block 57 may include a block body 571 having a block through-hole 571a through which the screw 52 passes and a body coupling part 572 extending from the block body 571 in both lateral directions. The block body 571 may have a cylindrical shape, and the block through-hole 567a may vertically pass through a center of the block body 571. A screw corresponding to the screw thread 521 may be disposed on an inner circumferential surface of the block through-hole 571a. Thus, when the screw 52 rotates, the elevation shaft 57 may move along the screw thread 521 to allow the elevation block 57 to vertically move.

Also, a coupling hole 572a may be defined in the body coupling part 572. The coupling hole 572a is defined in each of both sides of the block through-hole 571a, and the screw may be coupled to allow the elevation block 57 to be coupled to the holder body 58 so that the elevation block 57 move together with the holder body 58.

The holder body 58 may be coupled to the elevation block 57 so as to be elevated together inside the housing 51. The holder cover 59 may be coupled to one surface of the housing 51 exposed to the outside of the housing 51.

The holder body 58 may be hollow to provide a space. In particular, a block accommodation part 581 into the elevation block 57 is accommodated may be provided in a lower portion of the holder body 58. The block accommodation part 581 may be opened backward and downward to communicate with the hollow. Thus, the elevation block 57 may be inserted and mounted from a lower side to an upper side of the holder body 58 and be disposed inside the block accommodation part 581.

A through-part 582 penetrated in the vertical direction may be defined above the block accommodation part 581. The screw 52 may pass through the through-part 582 and may not contact a screw thread 521 of the screw 52.

A holder coupling part 583 to which the coupling member 572b is coupled to couple the elevation block 57 to the holder body 58 may be disposed on each of both sides of an outer surface of the through-part 582. The holder coupling part 583 may be disposed at a position corresponding to the body coupling part 572 and be integrally coupled to the coupling member 572 such as a screw at a position corresponding to each other when the elevation block 57 and the holder body 58 are coupled to each other.

A side surface part of the holder body 58 may extend to both sides of the housing 51. Also, a bearing unit 584 may be provided between each of both side surfaces of the holder body 58 and the inner surface of the housing 51. The bearing unit 584 may include a bearing 584a, which are vertically provided in plurality, and a retainer 584b to which the bearing 584a is rotatably mounted.

Thus, the plurality of bearings 584a may be mounted rotatably by the retainer 584b and contact the side surface part of the holder body 58 and the inner surface of the housing 51 so as to be rolled. Of course, the bearing unit 584 is not limited to the above-described structure, and another structure capable of being rolled between the holder body 58 and the housing 51 may be also possible.

The bearing unit 584 may be provided on each of both sides of the holder body 58. Thus, the holder body 58 may smoothly ascend inside the housing 51. Particularly, since the bearing units 584 on both sides are maintained in contact with the inner surface of the housing 51 during the elevation processes, the holder body 58 may be stably and smoothly elevated without moving. Also, the inner surface of the side part 512 contacting the bearing 584a and both side surfaces of the holder body 58 may be recessed at positions corresponding to the bearing unit 584 to realize more stable rolling of the bearing 584a.

Although not shown, the screw assembly 50 may be provided with a shaft (not shown) for guiding the screws 52 on each of both sides of the screw 52 without the bearing unit 584, and the screw holder 56 may move along the screw 52 without moving of the screw holder 56 through a structure in which the shaft extends from an upper end to a lower end of the housing 51 to pass through both sides of the screw holder 56.

The holder cover 59 may be coupled to one surface of the holder body 58. The holder cover 59 may be coupled to the rear surface of the holder body 58 and be exposed to the outside through the opening of the housing 51. Also, a holder protrusion 591 may protrude backward from the holder cover 59. The holder protrusion 591 may pass through one end of the lever 42 and may have a circular cross-section so that the lever 42 rotate while passing through the lever 42.

Also, a protrusion fixing member 592 may be coupled to the end of the holder protrusion 591 passing through the lever. The protrusion restriction member 592 may be larger than the opening of the lever 42 through which the holder protrusion 591 passes. Also, the holder protrusion 591 may be inserted to pass through the lever 42, and then, the protrusion restriction member 592 may be coupled to the end of the holder protrusion 591 by using a separate coupling member.

In this embodiment, the screw holder 56 may have a structure in which the elevation block 57, the holder body 58, and the holder cover 59 are molded and coupled to each other. Here, the holder body 58 to which a load is directly applied may be made of a metal material. The elevation block 57 having a relatively complicated internal structure and the holder cover 59 to which the load is not applied may be formed by injection molding a plastic material.

That is, since the elevation block 57 has to have a screw to move along the screw 57, the structure may be complicated, and also, it may be difficult to mold the elevation block 567 having abrasion resistance and lubrication performance through engineering plastic injection molding. Also, the elevation block 58 to which a load is applied substantially when the elevation device 80 moves may have to have high strength. Thus, the holder body 58 may have a structure that is capable of being molded by using a metal material through the extrusion. Also, the holder cover 59, which is coupled to the lever 42 to generate friction during rotation of the lever 42, may also be injection-molded using a plastic material. As described above, the elevation block 57, the holder body 58, and the holder cover 59, which are made of different materials, may be coupled to each other and may be integrally elevated inside the housing 51 to match the respective structure and environment.

Of course, the screw holder 56 may have a single structure, and a portion of the elevation block 57, the holder body 58, and the holder cover 59 may be integrally formed with each other.

A housing cover 55 may be disposed on the upper end of the housing 51. The housing cover 55 may have a structure that covers the top surface of the housing 51 and covers the screw gear 53 and the shaft gear 412 in the housing 51.

A bottom opening 551 through which the screw 52 passes may be defined in a bottom surface of the housing cover 55. The upper portion of the screw 52 may be inserted into the housing cover 55 through the bottom opening 551, and at least the screw gear 53 may be disposed inside the housing cover 55. Also, the screw 52 may be fixed to the housing 51 and the housing cover 55 by the screw fixing member 531, and the screw gear 53 may be fixed to always maintain the correct position.

Also, an upper spacer mounting part 553 may be disposed on an inner top surface of the housing cover 55 to have a corresponding shape so that the upper spacer 541 is mounted. Thus, the housing cover 55 may be capable of rotatably supporting the upper end of the screw 52.

Also, a side opening 552 through which the shaft 41 is inserted may be defined in a side surface of the housing cover 55. The side opening 552 may be opened so that the shaft gear 412 is disposed inside the housing cover 55. Also, the shaft 41 may be fixed to the inside of the housing cover 55 by the shaft fixing member 612, and the shaft gear 412 may be maintained in the state of being coupled to the screw gear 53 while being maintained at the correct position.

Thus, the end of the shaft 41 and the screw 52 may be covered, and the shaft gear 412 and the shaft gear 412 may be covered when the housing cover 55 is mounted. Also, each of the shaft gear 412 and the screw gear 53 may be always disposed in a proper position to secure the power transmission through the shaft 41.

Figure 12:
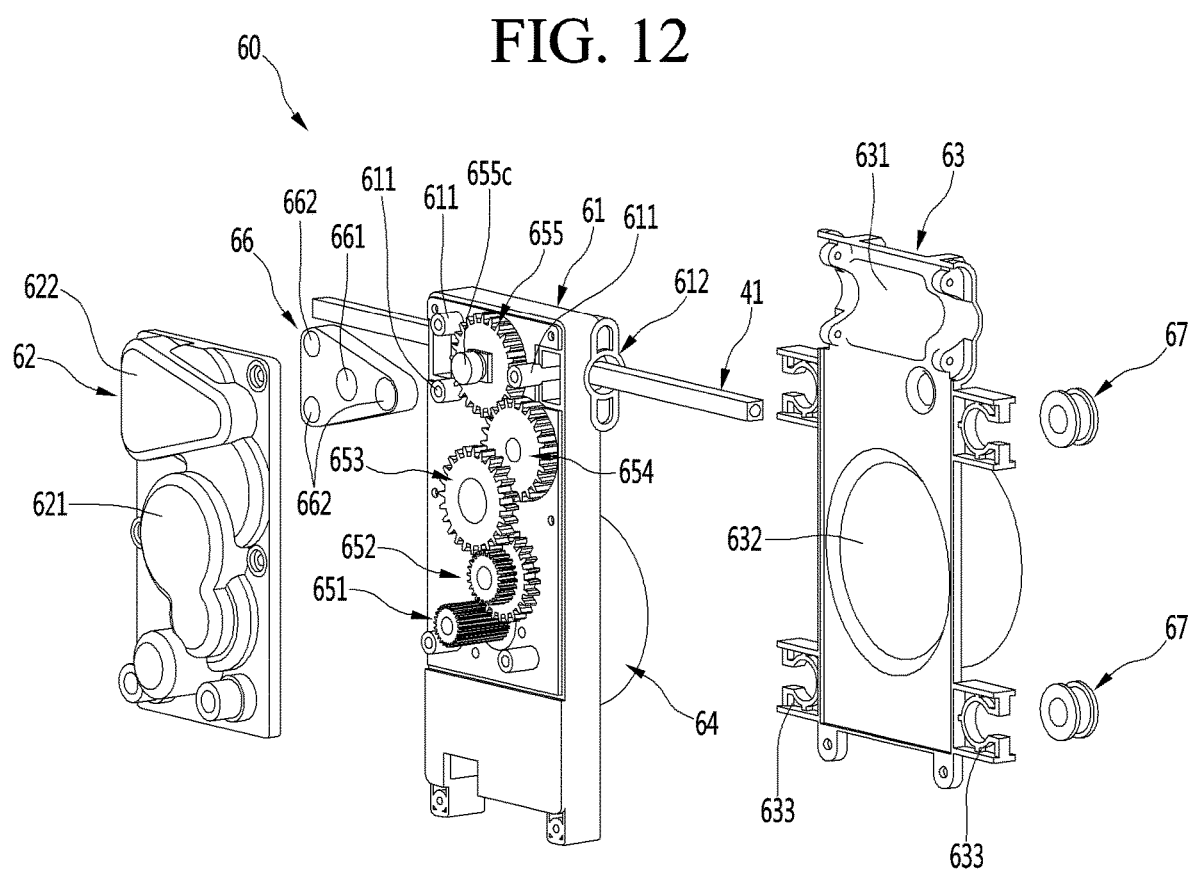
FIG. 12 is an exploded perspective view of a motor assembly that is one component of the driving part.
Figure 13:
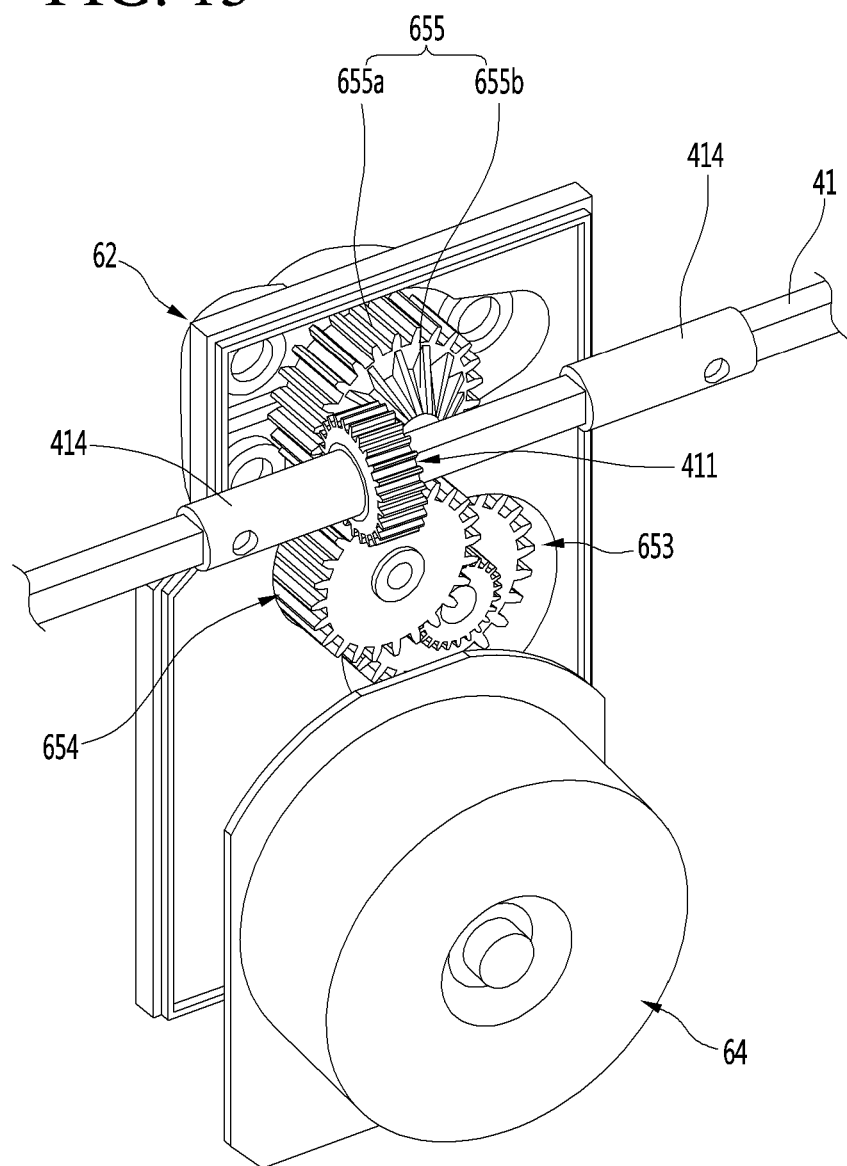
FIG. 13 is a view illustrating a coupling structure of the motor assembly and a driving shaft.

FIG. 12 is an exploded perspective view of the motor assembly that is one component of the driving device. Also, FIG. 13 is a view illustrating a coupling structure of the motor assembly and the driving shaft.

As illustrated in the drawings, the motor assembly 60 may include a plurality of gears, a motor case 61, and motor covers 62 and 63.

In detail, the driving motor 64 may provide power for elevating the elevation device 80 and may rotate forwardly and reversely. Thus, when an elevation signal of the elevation device 80 is inputted, the elevation device 80 may rotate forwardly and reversely to provide the power for elevating the elevating device 51. Also, an input of a stop signal due to the load of the driving motor or the detection of the sensor may be stopped.

The driving motor 64 may be fixed and mounted on a lower portion of the motor case 61, and the rotation shaft of the driving motor 64 may pass through the motor case 61 to protrude to an opposite side. Also, the rotation shaft of the driving motor 64 may be provided with a first gear 651 to rotate when the driving motor 64 is driven.

The driving motor 64 and the shaft 41 may be disposed on one side of the motor case 61. A plurality of gears 651, 652, 653, 654, and 655 may be disposed on the opposite side of the motor case 61. A second gear 652 engaged with the first gear 651 for transmitting and decelerating the power of the driving motor 64, a third gear 652 engaged with the second gear 652, a fourth gear engaged with third gear 653, and a fifth gear 655 engaged with the fourth gear 654 may be disposed on one surface of the motor case 61. Of course, the plurality of gears 651, 652, 653, 654, and 655 may be variously combined according to the reduction ratio and the magnitude of the transmitted force. The plurality of gears 651, 652, 653, 654, and 655 may include at least a first gear coupled to the rotation shaft of the driving motor 64 and a fifth gear coupled to the shaft 41.

The fifth gear 655 may include a power transmission part 655*a* and a power conversion part 655*b*. The power transmission part 655*a* is configured so as to be engaged with the fourth gear 654 in the form of a spur gear. Also, the power conversion part 655*b* may be configured to be gear-coupled to the shaft driving gear 411 mounted on the shaft 41.

The shaft 41 may pass through the motor assembly 60 in a lateral direction and may extend in a direction perpendicular to the rotation axis of the driving motor 64 and the rotation axis of the fifth gear 655. Also, the shaft driving gear 411 is disposed inside the motor assembly 60 and may be gear-coupled perpendicularly to the power conversion part 655*b*. Thus, the power conversion part 655*b* may have the same shape as a bevel gear so that power transmission to the shaft 41 is performed. The power conversion part 655*b* and the shaft driving gear 411 may have other gear structures capable of transmitting the power.

The motor case 61 may be provided with shaft fixing members 612 through which the shaft 41 passes. The shaft 41 passing through the shaft fixing member 612 may be provided with a shaft sleeve 414. The shaft sleeve 414 may pass through the shaft fixing member 612, and the shaft fixing member 612 may support the shaft sleeve 414. Thus, the power conversion part 655*b* and the shaft driving gear 411 may operate stably while being maintained in the engaged state therebetween without the movement of the shaft 41.

A rotation shaft 655*c* may protrude from the rotation center of the fifth gear 655. A plurality of guide protrusions 611 may protrude from the motor case 61 adjacent to the fifth gear 655. Also, a gear restriction member 66 into which the rotation shaft 655*c* and the guide protrusion 611 are inserted may be provided. The gear restriction member 66 may allow the fifth gear 655 to be maintained in the restricted state and include a rotation shaft hole 661 through which the rotation shaft 655*c* passes. A guide hole 662 may be defined in a position corresponding to the guide protrusion 611. Thus, in the state in which the gear restriction member 66 is mounted, separation and movement of the fifth gear 655 may be completely prevented to maintain the engaged and rotating state of the fifth gear 655 and the shaft gear 412, thereby securing the power transmission to the shaft 41.

The motor covers 62 and 63 may include a front cover 62 and a rear cover 63 that respectively cover the front and rear surfaces of the motor case 61. The front surface of the motor case 61 may face the door liner 314, and the rear surface of the motor case 61 may face the door cover 315.

The front cover 62 may be coupled to the front surface of the motor case 61 and may cover the plurality of gears 651, 652, 653, 654, and 655 mounted on the front surface of the motor case 61. The front cover 62 may be provided with a gear recess part 621. Thus, the plurality of gears 651, 652, 653, 654, and 655 may be accommodated inside the gear recess part 621, and the rotation axis may fixed to realize the stable rotation. Also, the front cover 62 may further include a restriction member recess part 622 in which the gear restriction member 66 is accommodated.

The rear cover 63 may be coupled to a rear surface of the motor case 61 and be configured to cover the driving motor 64 and a portion of the shaft 41 mounted on the rear surface of the motor case 61.

Thus, a shaft accommodation part 631 for covering the shaft driving gear 411 and the power conversion part 655b of the fifth gear 655, which are coupled to each other, may be provided in the rear surface of the motor case 61. Also, a motor accommodation part 632 in which the driving motor 64 is accommodated may be provided. Also, the shaft fixing member 612 may be fixedly mounted on both left and right ends.

A plurality of fixing parts 633 may protrude from both sides of the rear cover 63. A plurality of vibration prevention members 67 may be press-fitted into the fixing portion 633, and the coupling member passing through the vibration prevention member 67 may be coupled to the door liner 314 to fix and mount the motor assembly 60. The vibration prevention member 67 may be made of rubber or urethane to reduce vibration noise that is generated when the motor assembly 60 is driven.

Figure 14:
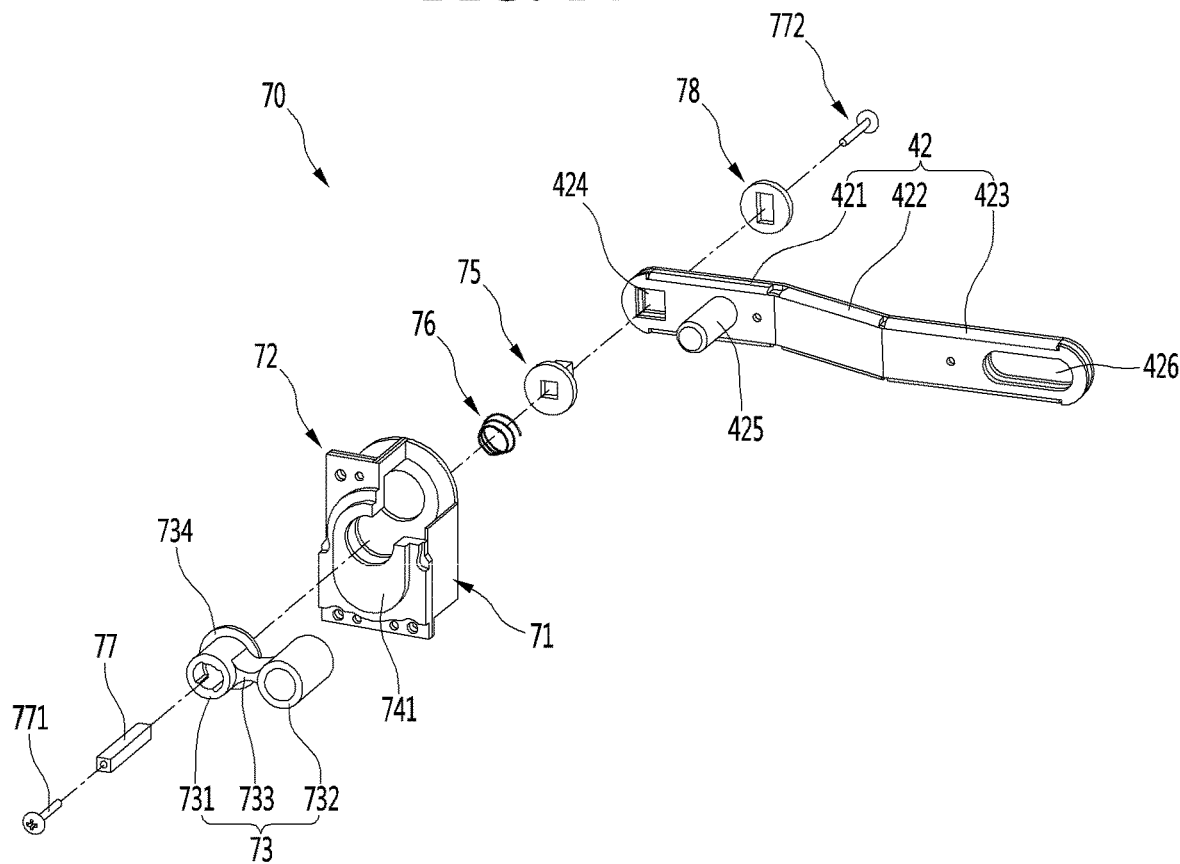
FIG. 14 is an exploded perspective view illustrating a coupling structure of a connecting assembly, which is one component of the driving device, and a lever.

FIG. 14 is an exploded perspective illustrating a coupling structure of a connecting assembly, which is one component of the driving device, and a lever.

As illustrated in the drawing, the lever 42 may be configured to connect the screw assembly 50 to the connecting assembly 70.

In details of the structure of the lever 42, the lever 42 may be provided in a rod or bar shape having a predetermined width and may extend from the rotation axis of the connecting assembly 70 to the holder protrusion 591 of the screw assembly 50.

In detail, the lever 42 may include a first extension part 421 connected to the connecting assembly, a second extension part 423 connected to the screw holder 56, and an intermediate portion 422 connecting the first extension part 421 to the second extension part 423.

The first extension part 421 and the second extension part 423 may be disposed parallel to each other, and the intermediate portion 422 may have an inclination. Also, the first extension part 421 may be further backward than the second extension part 423 by the inclination of the intermediate part 422.

The lever 42 may not be deformed or damaged even if a large amount of force is applied to the lever 42 due to the structure and shape of the bent lever 42. Also, the lever 42 may be made of a metal material to realize the stable power transmission even when the elevation device 80 on which a heavy food is seated is elevated.

Also, the inclination of the intermediate portion 422 may allow the lever 42 to be connected between the connection assembly 70 disposed relatively backward and the screw holder 56 disposed relatively forward.

A first lever hole 424 may be defined in the first extension part 421 to be connected to the lever fixing member 75 of the connecting assembly 70. The first lever hole 424 may be formed in a polygonal shape corresponding to one side of the lever fixing member 75 and may be opened in a rectangular shape as illustrated in the drawing. The lever fixing member 75 may also rotate together when the lever 42 rotates.

Also, the lever protrusion 425 may be disposed on the first extension part 421. The lever protrusion 425 may be spaced apart from the first lever hole 424 and disposed toward the intermediate part 422. The lever protrusion 425 may be configured to be coupled to the connection member 73 of the connecting assembly 70. That is, the rotation force of the lever 42 may be transmitted to the connecting assembly 70 by the lever protrusion 425 together with the first lever hole 424. Furthermore, the rotation force may be transmitted to the elevation device 80 to elevate the elevation device 80.

Also, a second lever hole 426 through which the holder protrusion 591 of the screw holder 56 is inserted may be defined in the second extension part 423. The second lever hole 426 may have a size corresponding to the holder protrusion 591 and also may have a long hole shape in the extension direction of the second extension part 423 so that the holder protrusion 591 move as the screw holder 56 move vertically. Thus, the holder protrusion 591 may be disposed on the left end of the second lever hole 426 in a state in which the screw holder 56 is disposed at the lowest position, and as the screw holder 56 move upward, the protrusion 591 moves to the right side of the second lever hole 426 so that the lever 42 rotates.

The connecting assembly 70 may be provided at one end of the lever 42, i.e., at a position corresponding to the first extension part 421. A connection member 73 for connecting the lever 42 to the elevation device 80 may be rotatably mounted on the inside of the connecting assembly 70.

The connection member 73 may be coupled to the lever fixing member 75 by the fixing shaft 77 and thus may rotate together with the rotation of the lever 42. Also, the connection member 73 may be connected to the lever protrusion 425 and the scissors protrusion 841b to transmit greater force to the elevation device 80, and thus, the elevation device 80 may be more effectively lifted. Thus, the elevation device 80 in the state in which the food is seated sufficiently while using only one of the driving motors 64 may be elevated, and a compact configuration may be realized.

The connecting assembly 70 may have an outer appearance defined by the connection case 71 and the connection cover 72, and the lever fixing member 75 and the connection member 73 may be mounted on the connection case 71.

Hereinafter a structure of the connecting assembly 70 will be described in more detail.

Figure 15:
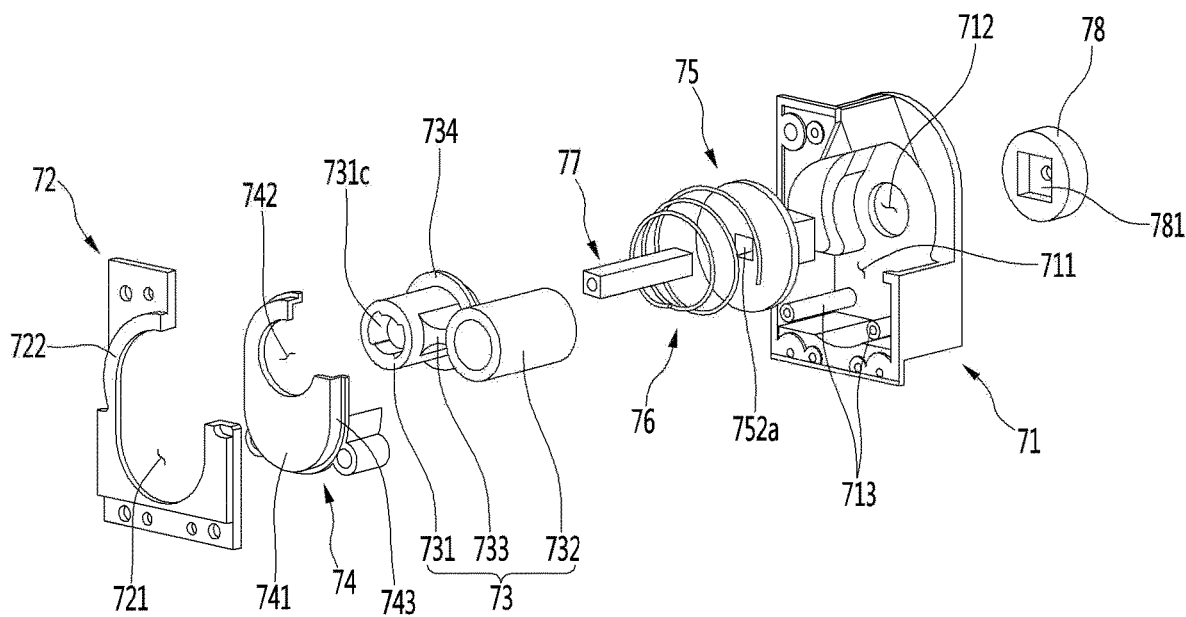
FIG. 15 is an exploded perspective view of the connecting assembly when viewed in one direction.
Figure 16:
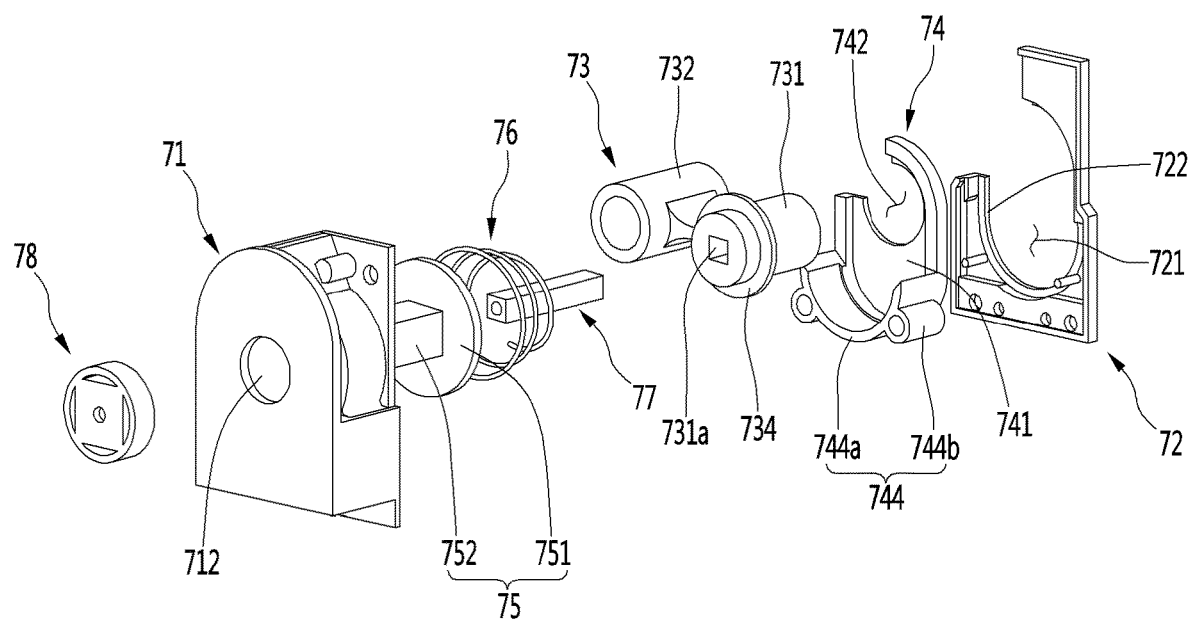
FIG. 16 is an exploded perspective view of the connecting assembly when viewed in the other direction.
Figure 17:
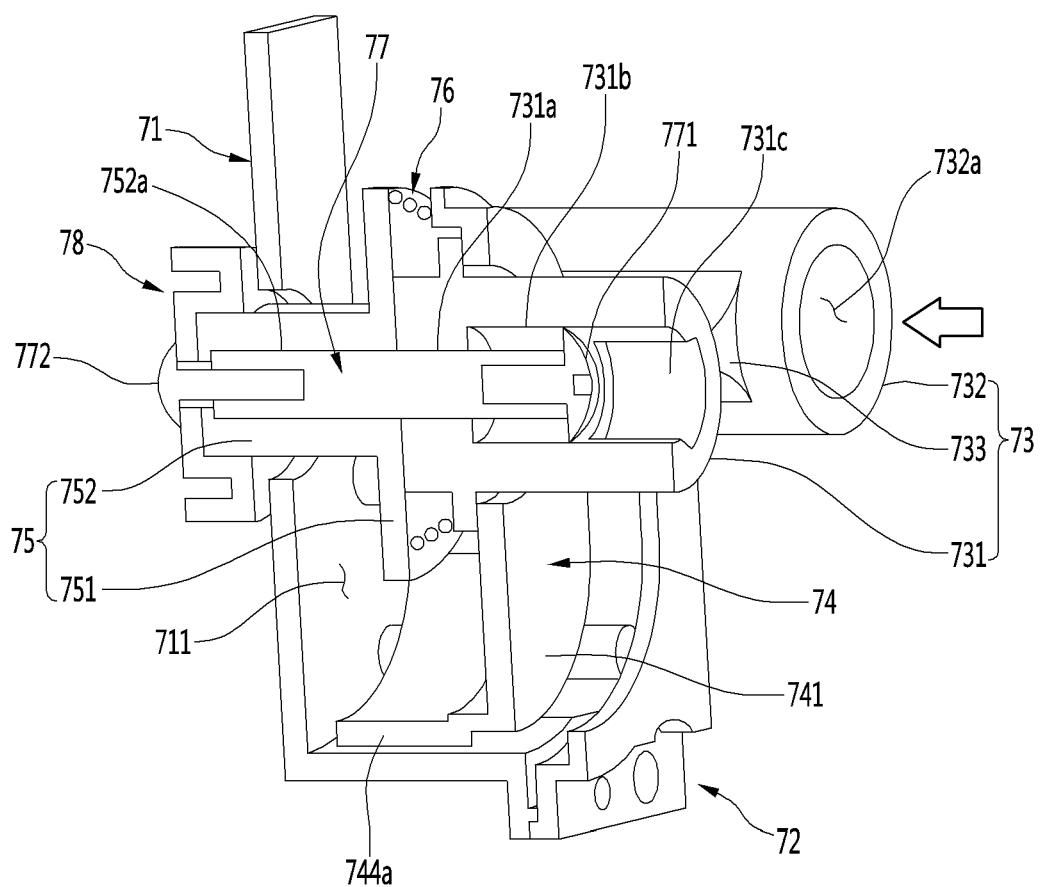
FIGS. 17 and 18 are views illustrating an operation state of the connecting assembly.
Figure 18:
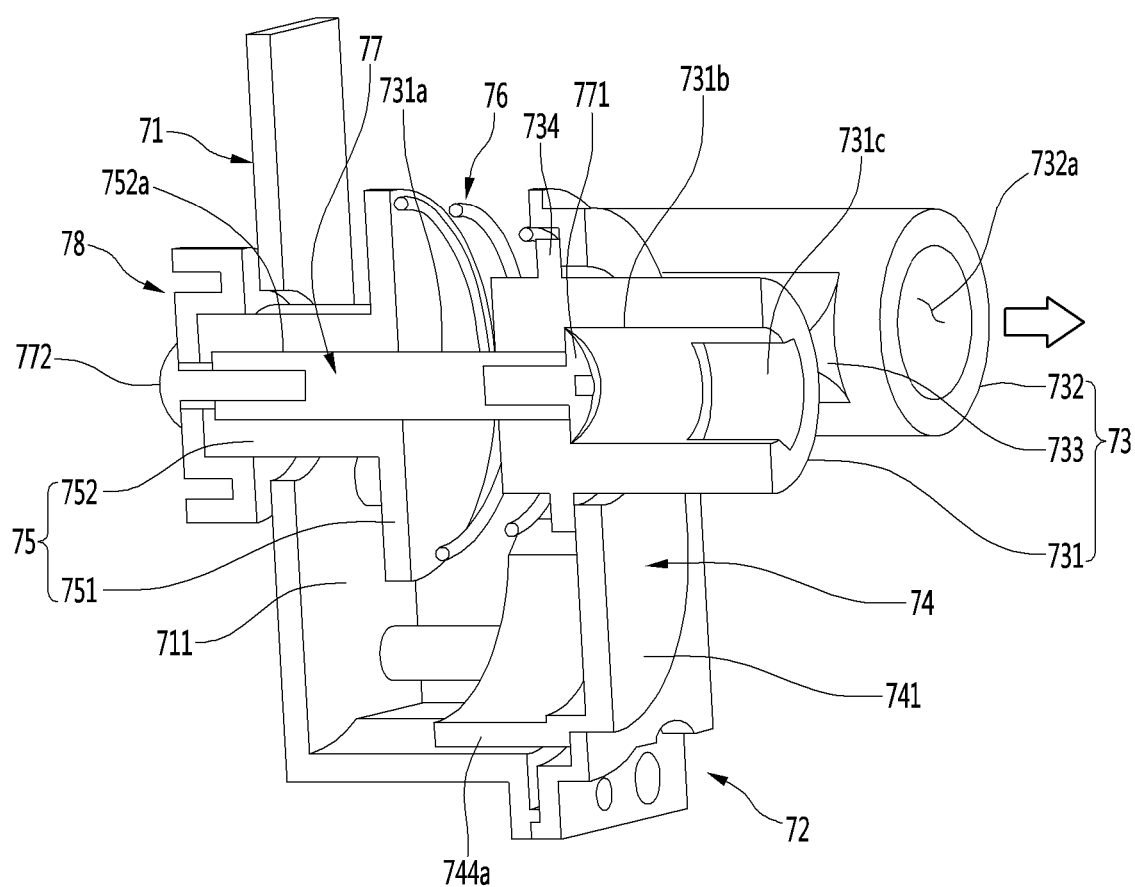

FIG. 15 is an exploded perspective view of the connecting assembly when viewed in one direction. Also, FIG. 16 is an exploded perspective view of the connecting assembly when viewed in the other direction. Also, FIGS. 17 and 18 are views illustrating an operation state of the connecting assembly.

Referring to the drawings, the connecting assembly 70 may include the connection case 71, the connection cover 72, and the connection member 73, the push part 74, the lever fixing member 75, and the elastic member 76.

In detail, the connection case 71 may be opened on one side and includes a space 711 for accommodating the lever fixing member 75, the connection member 73, the push part 74, and a portion of the lever 42. Also, a through-hole 712 may be defined in the space 711. An external fixing member 78 may be provided on the outer surface of the connection case 71 corresponding to the through-hole 712.

The lever fixing member 75 may include an elastic support part 751 and a through-protrusion 752. The elastic support part 751 may be accommodated in the space inside the connection case 71 and define a surface capable of supporting one end of the elastic member 76. Also, the through-protrusion 752 may be disposed on a center of the elastic support part 751 and extend to sequentially pass through the first lever hole 424 and the through-hole 712 of the lever. The through-protrusion 752 may have a rectangular cross-sectional shape. The through-protrusion 752 may be inserted into a fixing groove defined in the external fixing member 78.

A shaft insertion part 752a into which the fixing shaft 77 is inserted may be provided inside the through-protrusion 752. The fixing shaft 77 and the shaft insertion part 752a may have corresponding shapes and may have a rectangular cross-section like the through-protrusions 752. Thus, slippage may not occur during the rotation of the lever 42, stable rotation force may be transmitted to the lever fixing member 75.

The fixing shaft 77 may be inserted into the shaft insertion part 752a of the through-protrusion 752 after passing through the first connection part 731 of the connection member 73. Also, the fixing shaft 77 may be inserted into the shaft insertion part 752a. Also, the coupling member 771 and 772 may be coupled to both ends of the fixing shaft 77. The lever fixing member 75, the external fixing member 78, and the connection member 73 may be coupled to the fixing shaft 77 through the coupling of the coupling members 771 and 772. Thus, when the lever fixing member 75 rotates by the rotation of the lever 42, the connection member 73 connected by the fixing shaft 77 may also rotate together.

The elastic member 76 may be provided between the connection member 73 and the lever fixing member 75. The elastic member 76 may be compressed when the connection member 73 moves. In detail, the elastic member 76 may have a coil spring structure and have one end supported by the elastic support part 751 and the other end supported by the connection support part 734 of the connection member 73.

The connection member 73 may move in the front-rear direction within the space of the connection case 71. Here, the connection member 73 may have a structure that is inserted into or protrudes to the space by the guide of the fixing shaft 77.

In details of the structure of the connection member 73, the connection member 73 may include a first connection part 731 which passes through the fixing shaft 77 and is concentric with the rotation axis of the lever 42, a second connection part 731 which is spaced from the first connection part 731 and into which the lever protrusion 425 is inserted, and a connection portion 733 connecting the first connection part 731 to the second connection part 732.

The first connection part 731 may have a hollow cylindrical shape. The first connection part 731 may have a first hollow part 731a into which the fixing shaft 77 is inserted, a second hollow part 731b which has a diameter greater than that of the first hollow part 731a and to which the coupling member 771 coupled to the fixing shaft 77 is disposed, and a third hollow part 731c which has a diameter greater than that of the second hollow part 731b and into which the rotation shaft 841a of the elevation device 80 is inserted.

Figure 21:
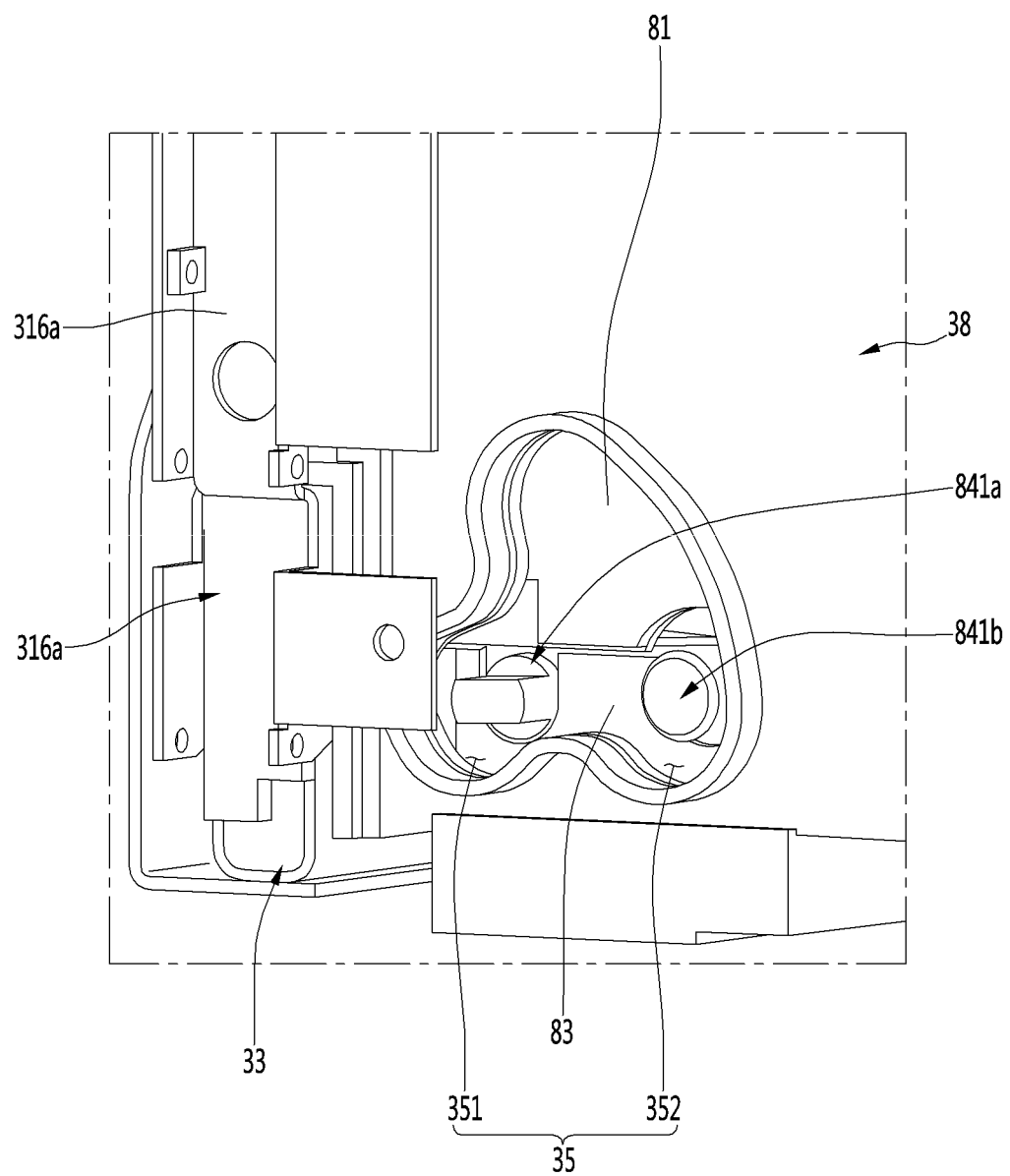
FIG. 21 is an enlarged view illustrating a portion A of FIG. 20.

The first hollow part 731a may have a rectangular cross-section like the fixing shaft 77, and the second hollow part 731b may have a circular cross-section. Also, at least a portion of the third hollow part 731c may have a groove shape corresponding to a rotation trajectory of an end of the rotation shaft 841a so that the rotation shaft 841a of the elevation device 80 is inserted, and when the elevation device 80 rotates, the rotation shaft 841a is hooked after rotating at a predetermined angle. As illustrated in FIG. 21, the rotation shaft 841a may have a planar shape on both sides thereof and be hooked with an stepped inner portion of the third hollow part 731 so that the rotation shaft 841a is hooked inside the third hollow part 731c.

Also, a connection support part 734 protruding outward by a predetermined width may be disposed on one side of the first connection part 731. The end of the elastic member 76 may contact the connection support part 734, and the end of the first connection part 731 may contact the connection support part 734. The connection support part 734 may protrude outward to support one end of the elastic member 76, and one end of the first connection part 731 may be inserted into the elastic member 76 to prevent the elastic member 76 from being separated.

The connection support part 734 may be larger than the size of the through-hole 742 defined in the push part 74 to maintain the state in which the connection support part 734 is in close contact with the rear surface of the push part 74. Thus, the connection support part 734 and the push part 74 may move together when the push part 74 is pressed or when the elastic member 76 returns to the initial position.

The second connection part 732 may be disposed at a position spaced apart from the first connection part 731 by the connection member 73. The second connection part 732 may have a cylindrical shape having a hollow 732a penetrated in the front and rear direction. The lever protrusion 425 may be inserted into one side of the second connection part 732, and the scissors protrusion 841b may be inserted into the other side of the second connection part 732. Here, the lever protrusion 425 and the scissors protrusion 841b may have the same outer diameter and correspond to the inner diameter of the second connection part 732.

The connection portion 733 may be disposed so that the rotation shaft 841a and the scissors protrusion 841b of the elevation device 80 are respectively inserted into the first connection part 731 and the second connection part 732. As the second connection part 732 move farther away from the first connection part 731, the elevation device 80 may be easily elevated. However, when the first connection part 731 and the second connection part 732 are spaced a set distance or more from each other, the moving trajectory of the lever protrusion 425 and the scissors protrusion 841b, which are inserted into the second connection part 732, may extend up to a high height on the rear surface of the front panel door part 31 and the front surface of the drawer part. Thus, the opened trajectory may be exposed to deteriorate the outer appearance. Thus, the position of the second connection part 732 may be determined by the length of the connection portion 733. Also, the second connection part 732 may be disposed at a height at which the rotation trajectory is not exposed, i.e., a position higher than the upper end of the elevation device 80.

The push part 74 may be provided inside the connection device case 71 and may be exposed through the opening 721 of the connecting cover 72 so that the push part 68 is pressed by the user. The push part 74 may include a push part 741 exposed through an opening 721 of the connecting cover 72 and a push guide part 744 extending along a portion of the circumference of the push part 741.

A through-hole 742 through which the first connection part 731 passes may be defined in the push part 741. The through-hole 742 may be larger than the outer diameter of the first connection part 731 and slightly smaller than the outer diameter of the connection support part 734. Thus, when the push part 741 may be pushed to move the push part 74, the first connection member 73 contacting the push part 74 may also move together to selectively connect the connection member 73 to the elevation device 80.

Also, the circumference of the push part 741 may extend toward the connecting case 71 and then be bent outward to provide a push flange 743. Thus, the push flange 743 may interfere with the opening 721 of the connecting cover 72 so that the push part 74 is restricted by the connecting cover 72 without being separated. For this, the opening of the connecting cover 72 may have a stepped part 722, and the push flange 743 may be accommodated into the rear surface of the stepped part 722.

The push guide part 744 may be disposed on one side of a circumference of the push part 741. The push guide part 744 includes a guide surface 744a extending along the circumference of the push part 741 and contacting an inner surface of the connecting case 71 and a guide boss disposed on each of both sides of a guide surface 744b. Also, the guide boss 744b may be penetrated by a guide post 713 extending from the recessed bottom surface of the connecting case 71.

Thus, when the push part 74 move forward and backward, the guide surface 744a may maintains the contact with the inner surface of the connecting case 71, and the guide boss 744b may move along the guide post 713 on each of both sides. Thus, the push part 74 may move forward and backward in the stable state without moving.

The connecting cover 72 may be mounted on the opened front side of the connecting case 71, and an opening 721 may be defined to expose the push part 741. The connecting cover 72 may be firmly fixed to the connecting case 71 by the coupling member. Thus, the configuration of the connecting case 71 may be maintained in the mounted state.

The connecting case 71, the push part 74, and a portion of the connecting cover 72 may be opened by cutting the connection member 73 by a rotational trajectory. Thus, the connection member 73 may be prevented from interfering with the connecting case 71, the push part 74, and the connecting cover 72 when the connection member 73 rotates.

In this structure, the user may manipulate the push part 74 of the connecting assembly 70 to selectively couple and separate the connecting assembly 70 to and from the elevation device 80.

Hereinafter, a structure of the drawer part 32 coupled to the front panel door part 31 will now be described in more detail with reference to the accompanying drawings.

Figure 19:
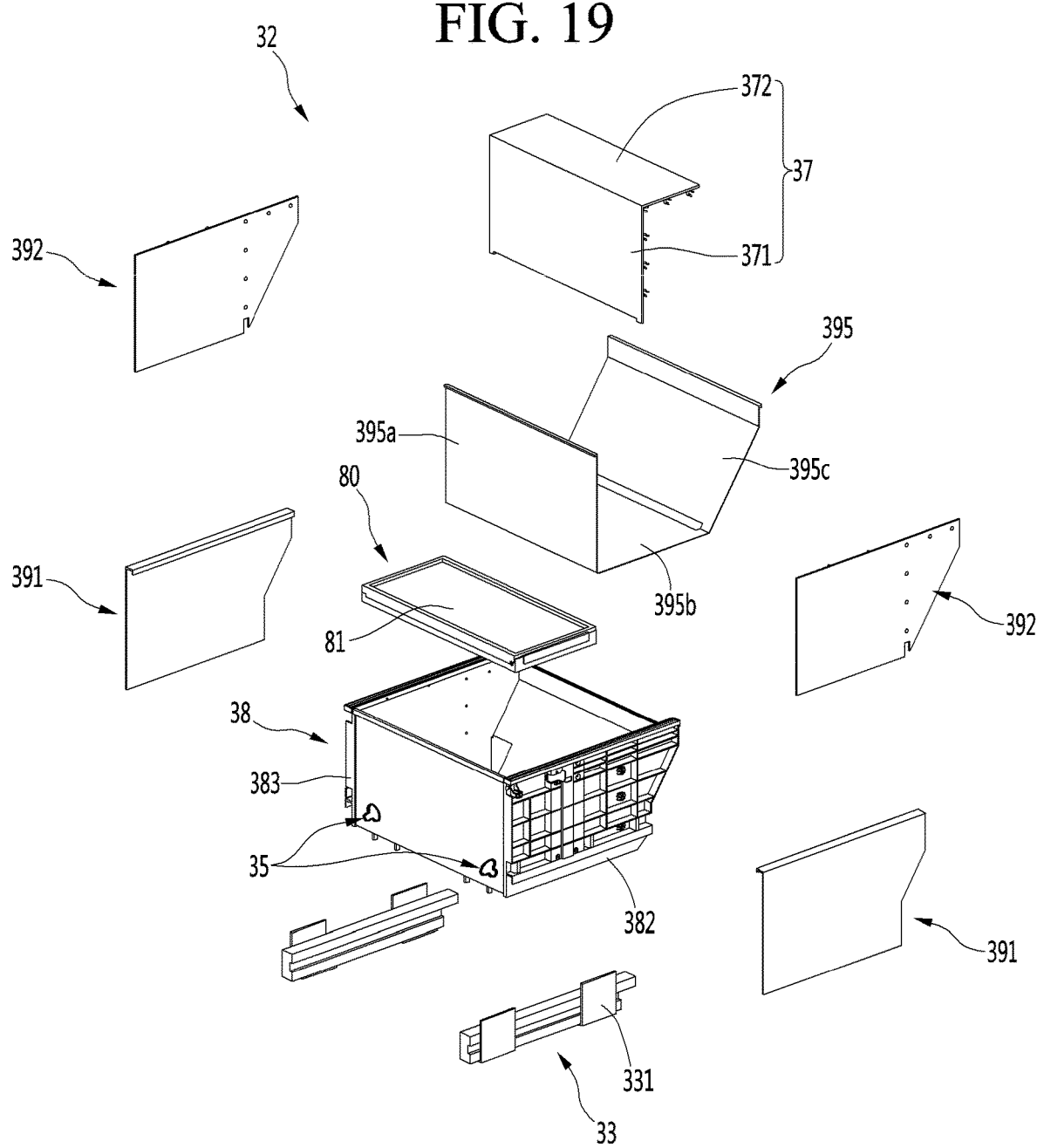
FIG. 19 is an exploded perspective view of the drawer part.

FIG. 19 is an exploded perspective view of the drawer part.

As illustrated in the drawings, the drawer part 32 may include a drawer body 38 defining an entire shape of the drawer part 32, an elevation device 80 provided in the drawer body 38 to elevate the container and food, and a plurality of plates 391, 392, and 393 defining an outer appearance of the drawer part 32.

In more detail, the drawer body 38 may be injection-molded by using a plastic material and define an entire shape of the drawer part 32. The drawer body 38 may have a basket shape having an opened top surface to define a food storage space therein. An inclined surface 321 may be disposed on a rear surface of the drawer body 38. Thus, an interference with the machine room 3 may not occur.

The door frames 316 may be mounted on both sides of the drawer part 32. The door frame 316 may be coupled to the lower frame of each of both sides of the bottom surface or both left and right surfaces of the drawer part 32. In the state in which the door frame 316 and the drawer part 32 are coupled to each other, the drawer part 32 and the front panel door part 31 may be integrally coupled to be inserted and withdrawn.

The door frame 316 may be separated from the drawer part 32, and then the connecting assembly 70 may operate to separate the front panel door part 31 from the drawer part 32 in order to separate the front panel door part 31 from the drawer part 32. The door frame 316 and the drawer part 32 may be coupled to each other by a separate coupling member or a coupling structure between the door frame 316 and the drawer part 32.

The draw-out rack 34 may be disposed on each of both the sides of the bottom surface of the drawer part 32. The drawer part 32 may be inserted and withdrawn forward and backward by the draw-out rack 34. In detail, in the state in which the drawer part 32 is mounted on the cabinet 10, at least a portion is disposed in the storage space. Also, the draw-out rack 34 may be coupled to a pinion gear 141 disposed on the bottom surface of the storage space. Thus, when the draw-out motor 14 is driven, the pinion gear 141 may rotate to allow the draw-out rack 34 to move, and the door 30 may be inserted and withdrawn.

The door 30 may not be automatically inserted and withdrawn. That is, the user may push or pull the door 30 to be inserted and withdrawn. Here, the draw-out rack 34 may be omitted, and thus, the insertion and withdrawal may be performed through only the draw-out rail 33.

A rail mounting part 382 on which the draw-out rail 33 for guiding the insertion and withdrawal of the drawer body 38 is mounted may be disposed on a lower portion of each of both the side surfaces of the drawer body 38. The rail mounting part 382 may extend from a front end to a rear end and provide a space in which the draw-out rail 33 is accommodated. The draw-out rail 33 may be a rail that extends in multistage. The draw-out rail 33 may have one end fixed to the storage space inside the cabinet 10 and the other end fixed to the rail mounting part 382 to more stably realize insertion and the withdrawal of the door 30.

Also, the plurality of plates 391, 392, and 393 made of a plate-shaped metal material such as stainless steel to define at least portions of the inside and outside of the drawer body 38 may be provided on the drawer body 38.

In detail, the outer side plate 391 may be disposed on each of both left and right surfaces of the outside of the drawer body 38. The outer side plate 391 may be mounted on each of both the left and right surfaces of the drawer body 38 to define an outer appearance of each of both the side surfaces. Particularly, the constituents such as the door frame 316 and the draw-out rail 33, which are mounted on both the sides of the drawer body 38 may not be exposed to the outside.

A plurality of reinforcement ribs 384 may cross each other in vertical and horizontal directions on both outer surfaces of the drawer body 38. The reinforcement ribs 384 may reinforce the strength of the drawer body 38 itself so that the drawer body 38 is more rigidly shaped relative to the weight of the door. Also, the reinforcement ribs 384 may support the outer side plates 391 mounted on both side surfaces, and thus the outer appearance of the drawer part 32 may be firmly maintained.

An inner side plate 392 may be disposed on each of both left and right surfaces of the inside of the drawer body 38. The inner side plate 392 may be mounted on each of both the side surfaces of the drawer body 38 to define both the left and right surfaces of the inside thereof.

The inner plate 395 may be constituted by a front surface part 395a, a bottom surface part 395b, and a rear surface part 395c, which have sizes correspond to the front surface, the bottom surface, and the rear surface of the inside of the drawer body 38. The inner plate 395 may be provided by bending the plate-shaped stainless material so that the inner plate 395 defines the inner surface of the remaining portion except for both the left and right surfaces of the drawer body 38. Also, both left and right ends of the inner plate 395 may contact the inner side plate 392. The front surface part 395a, the bottom surface part 395b, and the rear surface part 395c constituting the inner plate 395 may be separately provided and then coupled to or contact each other.

The entire inner surfaces of the drawer body 38 may be defined by the inner side plate 392 and the inner plate 395, and the inner surface of the drawer body 38 may provide texture of the metal. Thus, the storage space within the drawer part 32 may have a metal texture on the whole, and the foods accommodated in the drawer part 32 may be more uniformly cooled and thus stored at a low temperature in the more uniform region. In addition, visually excellent cooling performance and storage performance may be provided to the user.

The drawer cover 37 may include a cover front part 371 that partitions the inside of the drawer body 38 into a front space S1 and a rear space S2 and a cover top surface part 372 bent from an upper end of the cover front surface part 371 to cover a top surface of the rear space S2.

That is, when the drawer cover 37 is mounted, only the front space S1, in which the elevation device 80 is disposed, may be exposed in the drawer body 38, and the rear space S2 may be covered by the drawer cover 37.

The elevation 80 may be disposed in the drawer body 38. The elevation device 80 may be connected to the connecting assembly 70 and may be vertically movable. The left and right sides of the elevation device 80 may be elevated uniformly.

A drawer opening 35 may be defined in the lower part of the front surface of the drawer part 32 for coupling the elevation device 80 to the connecting assembly 70. The drawer opening 35 may provide a passage through which the connection member 73 is inserted to be coupled to the elevation device. Also, the drawer opening 35 may have an opening shape along the rotation path of the connection member 73 when the connection member 73 rotates to allow the connection member 73 to rotate, and thus, the stable rotation may be achieved without the interference.

The elevation device 80 may be provided as a scissors type so that the elevation device is folded in a descending state and unfolded in an ascending state. Thus, the container or food seated on the upper surface may be elevated.

The elevation device 80 may be provided with a support plate 81, and the support plate 81 may provide a seating surface on which the container 36 or food is seated.

Hereinafter, a connection structure between the connecting assembly 70 and the elevation device will be described.

Figure 20:
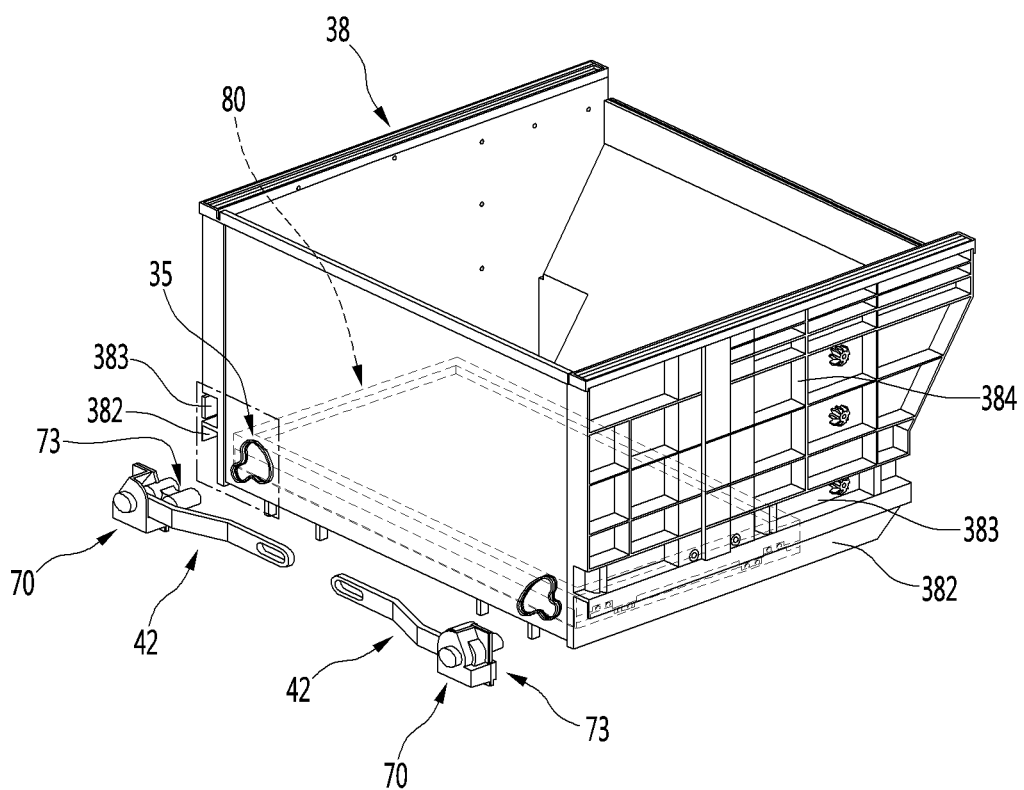
FIG. 20 is an exploded perspective view illustrating a coupling relationship between the drawer part and the connecting assembly.

FIG. 20 is an exploded perspective view illustrating a coupling relationship between the drawer part and the connecting assembly. Also, FIG. 21 is an enlarged view illustrating a portion A of FIG. 20.

As illustrated in the drawings, the drawer opening 35 may be defined in the right and left sides of the lower front of the drawer part 32. The shape of the drawer opening 35 on each of both sides of the right and left sides may be symmetrical to each other, and the rotation shaft 841a of the elevation device 80 and the scissors protrusion 841b may be exposed through the drawer opening 35. That is, the drawer opening 35 may be opened at a position corresponding to the rotation shaft 841a of the elevation device 80 and the scissors protrusion 841b.

The drawer opening 35 may include a central portion 351 and a trajectory portion 352. The central portion 351 may be disposed at a position corresponding to the rotation shaft 841a of the elevation device 80 and may have a size such that the first connection part 731 of the connection member 73 is inserted. Also, the trajectory portion 352 may be connected to the central portion 351 and may be opened in a shape corresponding to the trajectory in which the second connection part 732 of the connection member 73 move to rotate. Thus, the rotation shaft 841a of the elevation device 80 may rotate on the central portion 351 while the scissors protrusion 841b of the elevation device 80 rotates along the trajectory portion 352. That is, the scissors protrusion 841b and the second connection part 732 may be disposed inside the central portion 351 and the trajectory portion 352 when the elevation device 80 moves vertically.

The height of the drawer opening 35 may be lower than the upper end of the elevation device 80, i.e., the upper surface of the support plate 81. Thus, the drawer opening 35 may be prevented from being seen from the inside of the drawer part 32 in any state in the state in which the elevation device 80 is mounted.

The rotation shaft 841a and the scissors protrusion 841b of the elevation device 80 may be exposed through the drawer opening 35 while the elevation device 80 is mounted inside the drawer part 32. Also, in the state in which the sub door 30 is coupled, the connection member 73 of the connecting assembly 70 may be inserted through the inside of the drawer opening 35 so as to be coupled to the rotation shaft 841a of the elevation device 80 and the scissors protrusion 841b.

The connecting assembly 70 may be provided on each of both right and left sides of the drawer part 32 and may have a shape symmetrical to each other. The selective separation of the elevation device 80 and the connecting assembly 70 may be enabled through the manipulation of the push part 74.

The circumference of the support plate 81 may protrude upward so that the container 36 or food is stably mounted. Also, the circumference of the support plate 81 may extend downward. Thus, the remaining constituents of the elevation device 80 may be accommodated below the support plate 81, and the covered and clean outer appearance may be realized by the circumference of the support plate 81.

In addition, the support plate 81 may have a size and a shape corresponding to the front space to prevent foreign matters from being introduced into the elevation device 80 provided below the front space S1, and also, to fundamentally prevent safety accidents from occurring by blocking the access to the elevation device 80.

Hereinafter, constituents of the elevation device 80 will be described in more detail.

Figure 22:
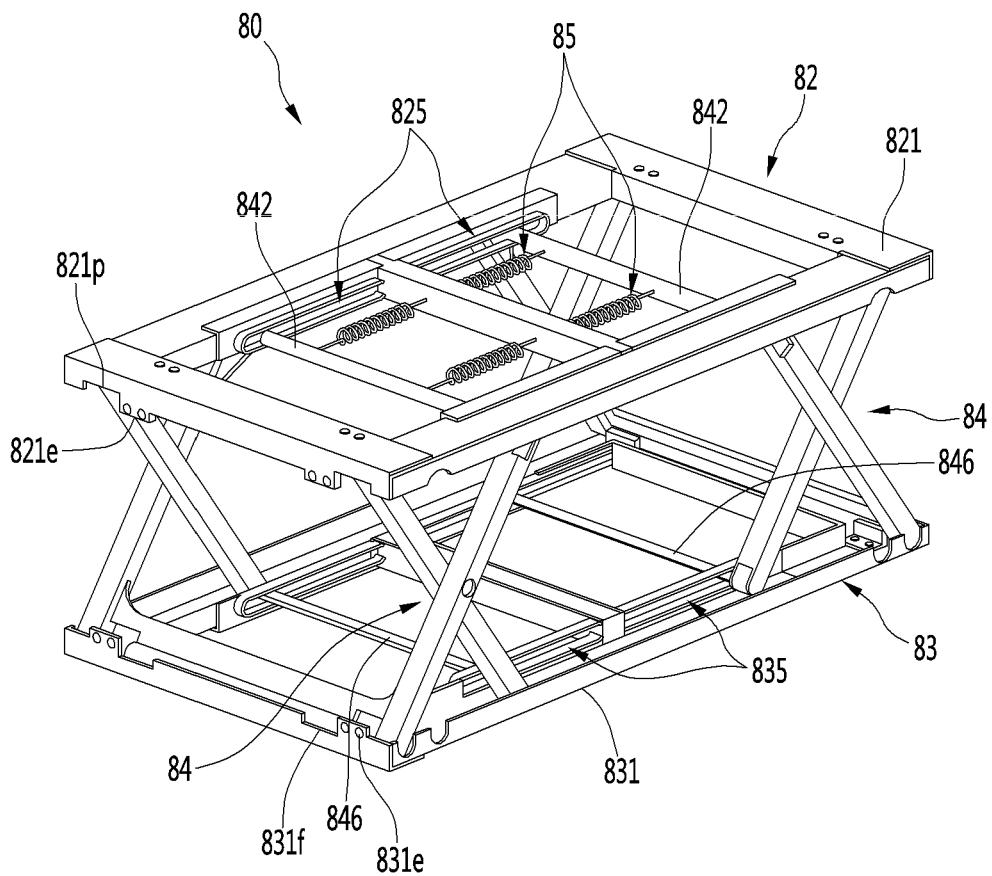
FIG. 22 is a perspective view of an elevation device according to an embodiment.
Figure 23:
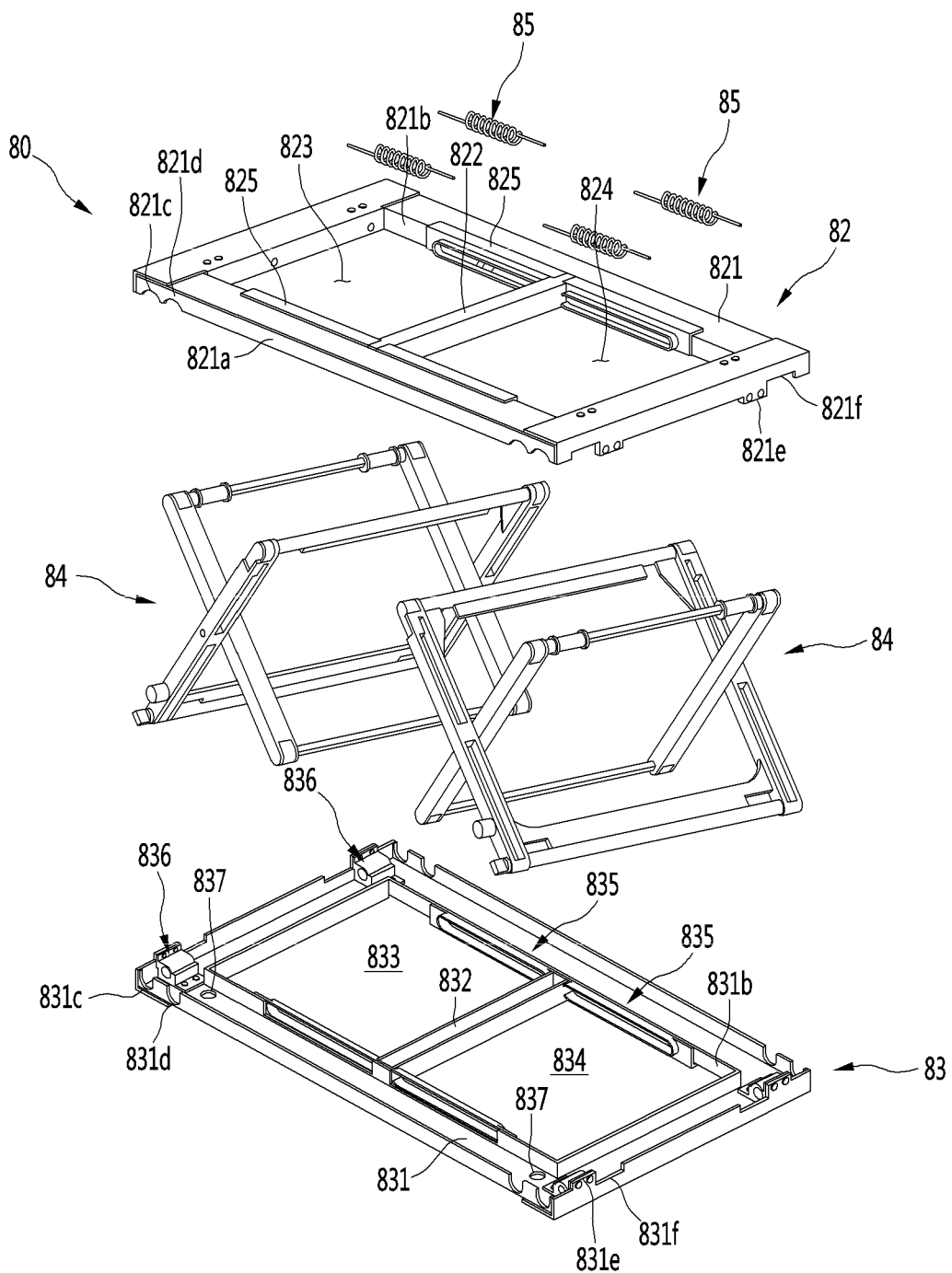
FIG. 23 is an exploded perspective view of the elevation device.
Figure 24:
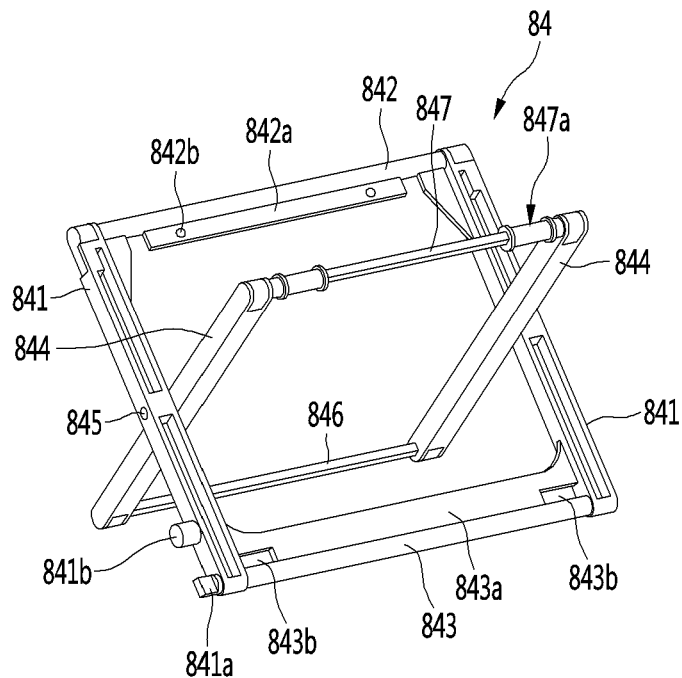
FIG. 24 is an perspective view of a scissors assembly that is one component of the elevation device.
Figure 25:
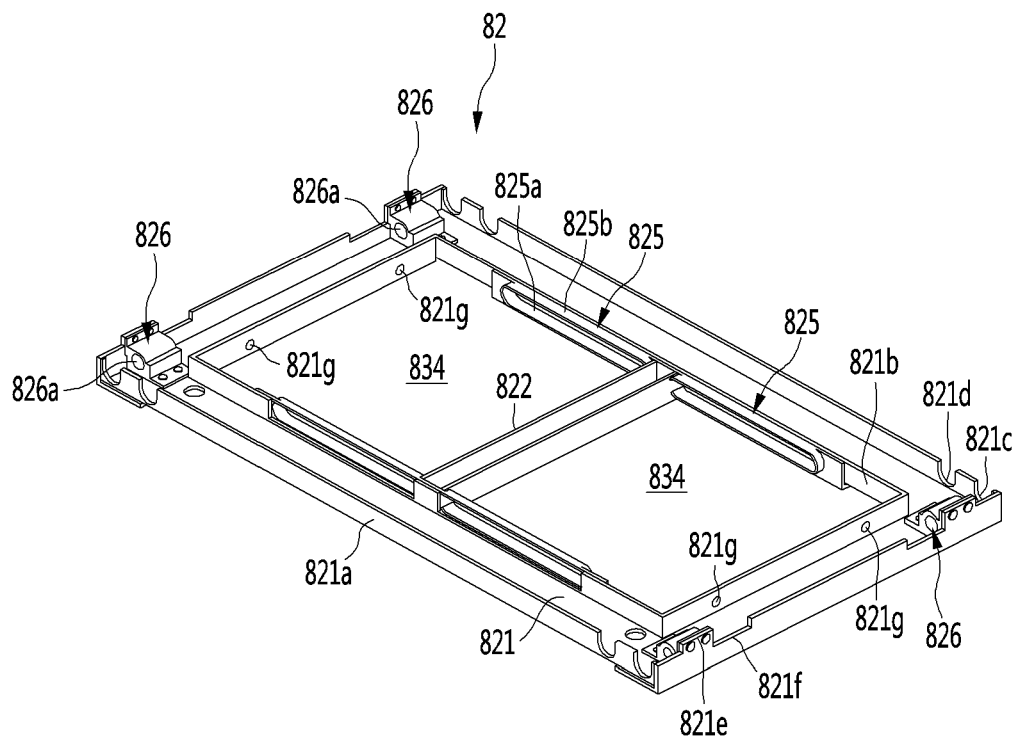
FIG. 25 is a perspective view of an upper frame that is one component of the elevation device.

FIG. 22 is a perspective view of the elevation device according to an embodiment. Also, FIG. 23 is an exploded perspective view of the elevation device. Also, FIG. 24 is an perspective view of the scissors assembly that is one component of the elevation device. Also, FIG. 25 is a perspective view of the upper frame that is one component of the elevation device.

As illustrated in the drawings, the elevation device 80 may be provided on the bottom surface of the inner side of the drawer part 32 and may be detachably installed on the inside of the drawer part 32. Also, the elevation device 80 may include an upper frame 82 and a lower frame 83 as a whole and a scissors assembly 84 disposed between the upper frame 82 and the lower frame 83.

In detail, the upper frame 82 may have a square frame shape corresponding to the size of the inner front space S1 of the drawer part 32 and may be configured to mount the support plate 81 on the top surface thereof.

The upper frame 82 of the elevating device 80 may move upward and downward and substantially supports the food or the container 36 together with the support plate 81. Also, the upper frame 82 may generally defines a frame part 821 which defines a circumferential shape of the upper frame 82 and a partition part 822 for partitioning the space inside the frame part 821 into left and right sides.

Since the frame part 821 and the partition part 822 define an outer frame and support the support plate 81, high strength may be required, and thus, the frame part 821 and the partition part 822 may be made of a metal and may have shape in which both ends are bent to increase the strength and prevent deformation.

Also, a slide guide 825 may be disposed on each of both sides of the inner side of the frame part 821 to accommodate the end of the scissors assembly 84 and guide the movement of the scissors assembly 84. The slide guides 825 may be disposed on both sides of the partition part 822. Also, the scissors assemblies 84 may be disposed in the spaces 823 and 824 on both sides partitioned by the partition part 822, respectively.

The slide guide 825 may be separately molded by using a plastic material having excellent abrasion resistance and lubrication performance and mounted on the upper frame 82. Also, a long hole 825a through which the sliding shaft 842 of the scissors assembly passes may be defined in the slide guide 825, and the sliding shaft 842 may move along the slide guide 825. Also, a sliding surface 825b having a predetermined width may be further disposed along the circumference of the long hole 825a, and the sliding shaft 842 may be supported by the sliding surface 825b so that the scissors assembly 84 is more smoothly folded or unfolded.

The frame part 821 may include vertically curved edges 821a and 821b along the circumference thereof. The edges 821a and 821b may be disposed on the inner side and the outer side of the frame part 821, respectively. Also, the slide guide 825 may be disposed on the edge 821b inside the frame part 821. Also, edge grooves 821c and 821d may be defined in the outer edge 821a of the frame part 821.

The edge grooves 821c and 821d may be defined in the edge 821a by the grooves into which the rotation shaft 841a of the elevation device 80 and the scissors protrusion 841b are accommodated while the elevation device 80 completely descends and may include a first edge groove 821c and a second edge groove 821d corresponding to the rotation shaft 841a and the scissors protrusion 841b at the end of the first edge groove 821a. When the upper frame 82 completely descends to contact the lower frame 83, the upper frame 82 may contact the edge grooves 821c and 821d defined in the lower frame 83 to provide a complete hole shape so that the rotation shaft 841a and the scissors protrusion 841b pass therethrough.

The edge grooves 821c and 821d may be defined in a number corresponding to the rotation shaft 841a when the scissors protrusion 841b is not provided but only the rotation shaft 841a is provided. The edge grooves 821c and 821d and the rotation shaft 841a and the scissors protrusion 841b may be disposed adjacent to the left and right ends of the elevation device 80 and may be exposed through the drawer opening 35.

Also, a coupling groove 821f and a coupling end 821e may be disposed on both ends of the frame part 821 corresponding to both sides of the drawer part 32. The coupling end 821e may be provided to protrude downward, and the coupling groove 821f may be defined to be recessed upward. The coupling groove 821f and the coupling end 821e may be disposed on both the upper frame 82 and the lower frame 83. When the upper frame 82 completely move downward, the upper frame 82 may be coupled to the coupling end 821e and the coupling groove 821f.

The frame part 821 may define a space of which a bottom surface is opened by the edges 821a and 821b on both sides.

Also, scissors fixing members 826 may be provided at both ends of the inner space of the frame part 821. The scissors fixing member 826 may fix the rotation shaft 847 of the scissors assembly 84, and a pair of scissors fixing members 826 may be provided at both ends. The scissors fixing member 826 may also be made of an engineering plastic material having abrasion resistance due to continuous friction with the rotation shaft 847. Also, the scissors fixing member 826 may have a through-hole 843b through which the rotation shaft 847 passes.

A plurality of scissors fixing members 826 may be provided on both ends of the frame part 821 to fix both ends of the rotation shaft 847. The scissors fixing member 826 may stably fix the rotation shaft 847 to allow the scissors assembly 84 to be smoothly folded and unfolded.

The lower frame 83 may have the same structure as that of the upper frame 85 but only in the direction. The lower frame 83 may include a frame part 831 and a partition part 832 and define spaces 833 and 834 in which the scissors assemblies 84 are respectively installed.

Also, the slide guide 825 may be provided on the inner frame 821b of the frame part 821, and the first frame groove 831c and the second frame groove 831d may be defined in the outer frame 821a. Also, a coupling end 821e and a coupling groove 821f, which are provided on the ends of the upper frame 82, respectively, may be disposed on both ends of the frame part 821. Also, the scissors fixing member 826 may be provided in the inner space of the frame part 821.

The outer frame 821a of the upper frame 82 and the outer frame 821a of the lower frame 83 may contact each other when the upper frame 82 completely move downward. Thus, the frame part 821 of the upper frame 82 and the frame part 821 of the lower frame 83 may contact each other to define a closed space therein, and the scissors assembly 84 may be accommodated in the closed space in the completely folded state. That is, the constituents of the scissors assembly 84 may be disposed inside the frame part 821 of the lower frame 82 and the upper frame 82 in the state in which the elevation device 80 descends to the lowest state.

Thus, the additional space for accommodating the scissors assembly 84 in addition to the upper frame 82 and the lower frame 83 may not be required so that the loss of storage space inside the drawer part 32 is minimized.

Furthermore, since the support plate 81 also has a structure capable of accommodating the upper frame 82 and/or the lower frame 83, a space for arranging the upper frame 82 and the lower frame 83 may not be additionally required to minimize the space loss.

That is, even if the elevation device 80 having the complicated scissors type is disposed, a space loss equivalent to the thickness of the support plate 81 may be generated to very effectively utilize the interior of the drawer part 32.

An elevation device fixing part 837 may be disposed on the bottom surface of the frame part 821 of the lower frame 83. The elevation device fixing part 837 may have an opened hole shape and have a protruding shape protruding from the bottom surface of the drawer part 32 when the elevation device 80 is mounted inside the drawer part 32 and may be combined in shape with an elevation device coupling part (not shown). That is, the elevation device 80 may be fixed to match the inside of the drawer part 32 by a simple operation that is seated inside the drawer part 32 and be maintained in the stable state even though the elevation device 80 operates. Also, the elevation device 80 may be easily lifted and separated from the drawer part 32 without any additional tool even if the elevation device 80 is not disposed in the drawer part 32.

The scissors assemblies 84 may be provided on both left and right sides of the scissors assembly 84. The scissors assemblies 84 may be connected to the connecting assembly 70 and may be independently driven by the power transmitted through the shaft 41 and the lever 42 to lift the upper frame 82. Here, the scissors assemblies 84 on both sides may not cause any misalignment or deviation in one of the driving motors 64 and the structure of the driving device 40 including the shaft 41 and the screw assembly 50 so as to provide a structure capable of being elevated by the same height.

Thus, the scissors assembly 84 may be effectively elevated by the pair of the scissors assemblies 84 which independently apply the forces to both sides even when the heavy load is supported by the scissors assembly 84. Here, the upper frame 82, i.e., the support plate 81 may be elevated in a horizontal state through the scissor assembly 84.

The scissors assembly 84 may include a pair of first rods 841 arranged in parallel to each other, a first sliding shaft 842 connecting both ends of the first rod 841, and a first rotation shaft 847.

Each of the first rod 841, the first sliding shaft 842, and the first rotation shaft 843 may have a width that is enough to be accommodated inside the frame part 821. Also, the first rod 841 may be disposed at a position corresponding to the region of the frame part 821, and the first rotation shaft 843 may also be disposed at an region corresponding to the frame part 821.

Also, the rotation shaft 841a and the scissors protrusion 841b may be disposed on one end of the first rod 841. Here, the rotation shaft 841a may be disposed on the same extension line as the first rotation shaft 843, and the first rotation shaft 843 may rotate when the rotation shaft 841a rotates.

The first rotation shaft 843 may further include a rotation enhancing part 843a. The rotation enhancing part 843a may be configured to connect a portion of the first rod 841 to the entire first rotation shaft 843. Thus, when the first rod 841 rotates, the first rotation shaft 843 may rotate together and also be enhanced to withstand the generated moment.

Also, a mounting hole 342b may be defined in each of both ends of the rotation enhancing part 843a, and the scissors fixing member 826 may be mounted to pass through the mounting hole 842b. Thus, the first rotation shaft 843 may be rotatably mounted on the scissors fixing member 826 of the lower frame 83.

Also, the first sliding shaft 842 may connect the other end of the first rod 841 and may be disposed to pass through the slide guide 825. Thus, the first sliding shaft 842 may move along the slide guide 825 of the upper frame 82 when the first rod 841 rotates.

The first sliding shaft 842 may further include an elastic member mounting part 842a. The elastic member mounting part 842a may be configured to fix a scissors elastic member 85 connecting the first sliding shaft 842 to the frame part 821. A mounting hole 842b may be formed in the elastic member mounting part 842a to fix one end of the scissors elastic member 85.

Since the frame part 821 and the first sliding shaft 842 are disposed at the farthest positions in a state in which the lifting device 80 is disposed at the lowest height, the scissors elastic member 85 may be in the maximumly tensioned state. Thus, when the upper frame 82 ascends, the restoring force of the scissors elastic member 85 may provide the additional force so that the elevation device 80 is elevated with less force. Also, the first sliding shaft 842 may be disposed closest to the frame part 821 in a state in which the elevation device 80 is disposed at the maximum height, and thus, the scissors elastic member 85 may be in the minimally tensioned state or the non-tensioned state. When the elevation device 80 descends, the scissors elastic member 85 may gradually descend while being tensioned, thereby functioning as a buffer.

Also, a pair of second rods 844 may be provided to cross the first rod 841. The first rod 841 and the second rod 844 may be connected to each other by the scissors shaft 845 so that the first rod 841 and the second rod 844 rotate in the state of crossing each other. A second sliding shaft 846 and a second rotation shaft 847 connecting both ends of the second rod 844 may be further provided.

The second rod 844, the second sliding shaft 846, and the second rotation shaft 847 may also have shapes and arrangements that are enough to be accommodated in the frame part 821. In this state, both the second rotation shafts 847 connecting the upper ends of the second rods 844 may be provided.

The second rotation shaft 847 may be rotatably mounted on the scissors fixing member 826 of the upper frame 82. Here, the second rotation shaft 847 passing through the scissors fixing member 826 may further include a rotation bush 847a. The rotation bush 847a may contact the inner surface of the scissors fixing member 826 and may be made of a plastic material having excellent lubrication performance and abrasion resistance. Thus, the operation of the scissors assembly 84 may be smoothly performed.

The lower ends of the second rods 844 disposed on both sides may be connected by the second sliding shaft 846. The second sliding shaft 846 may be mounted to pass through the slide guide 835 provided in the lower frame 83 and may move along the slide guide 835 as the elevation device 80 is elevated.

Hereinafter, the selective coupling and power connection of the elevation device 80 and the connecting assembly 70 will be described in more detail with reference to the drawings.

Figure 26:
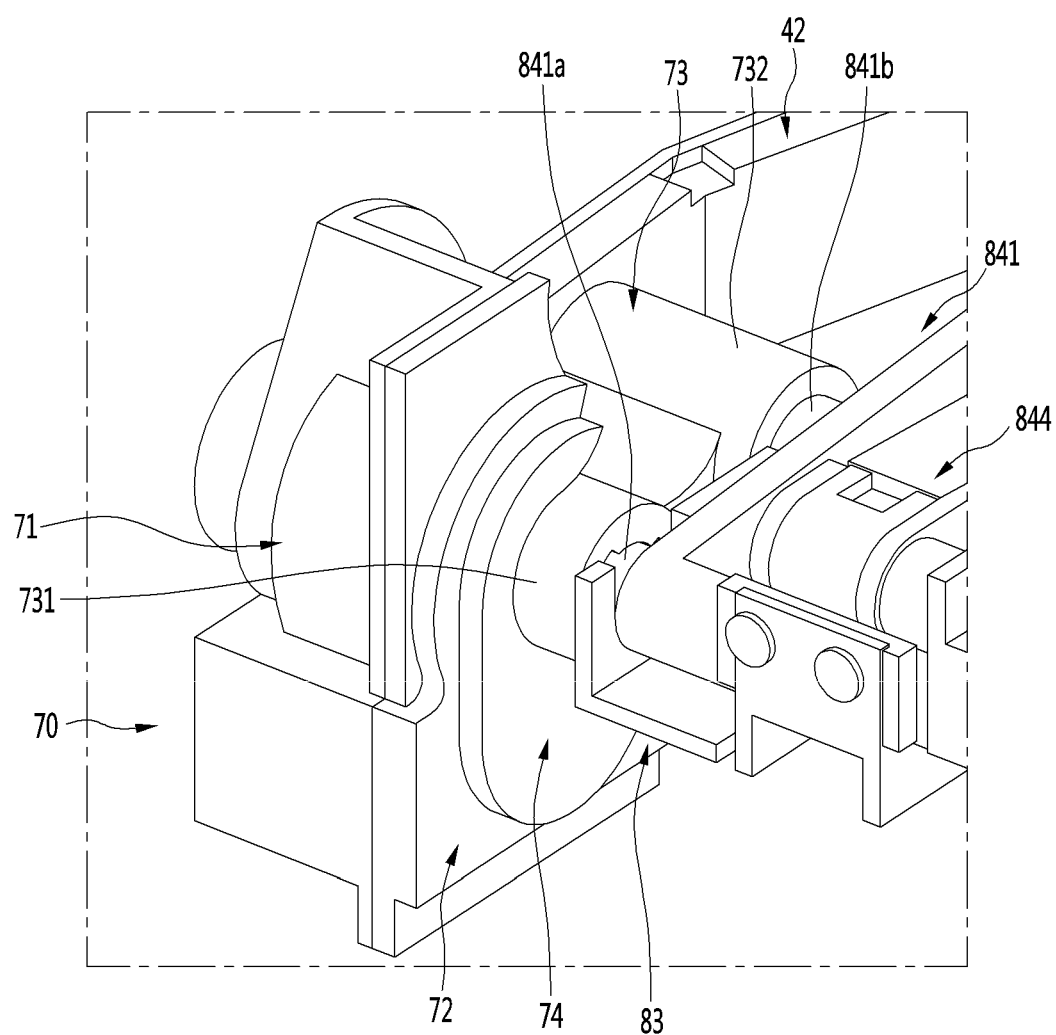
FIG. 26 is a perspective view illustrating a connection state between the connecting assembly and the elevation device.
Figure 27:
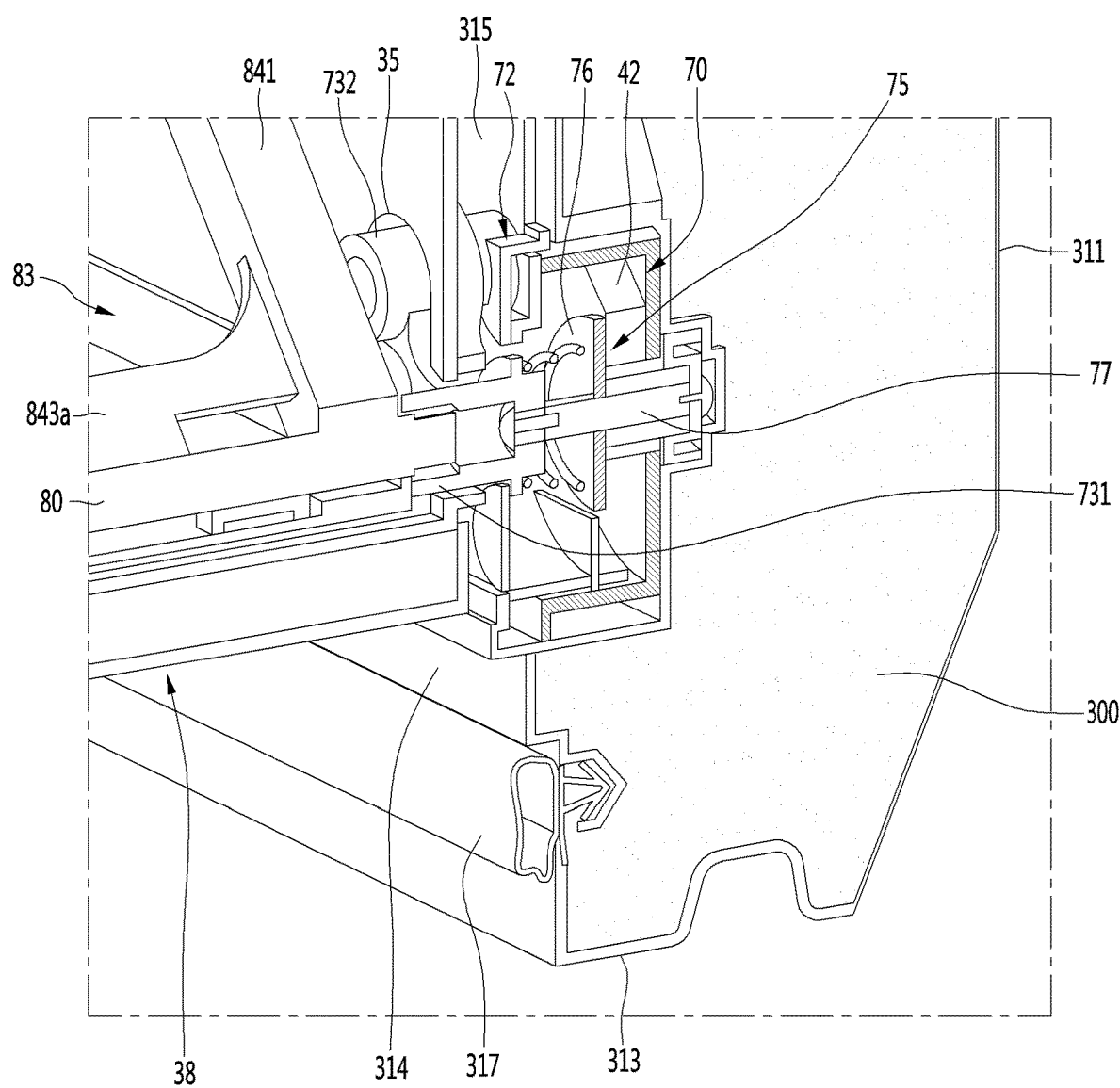
FIG. 27 is a cross-sectional view illustrating the connection state between the connecting assembly and the elevation device.
Figure 28:
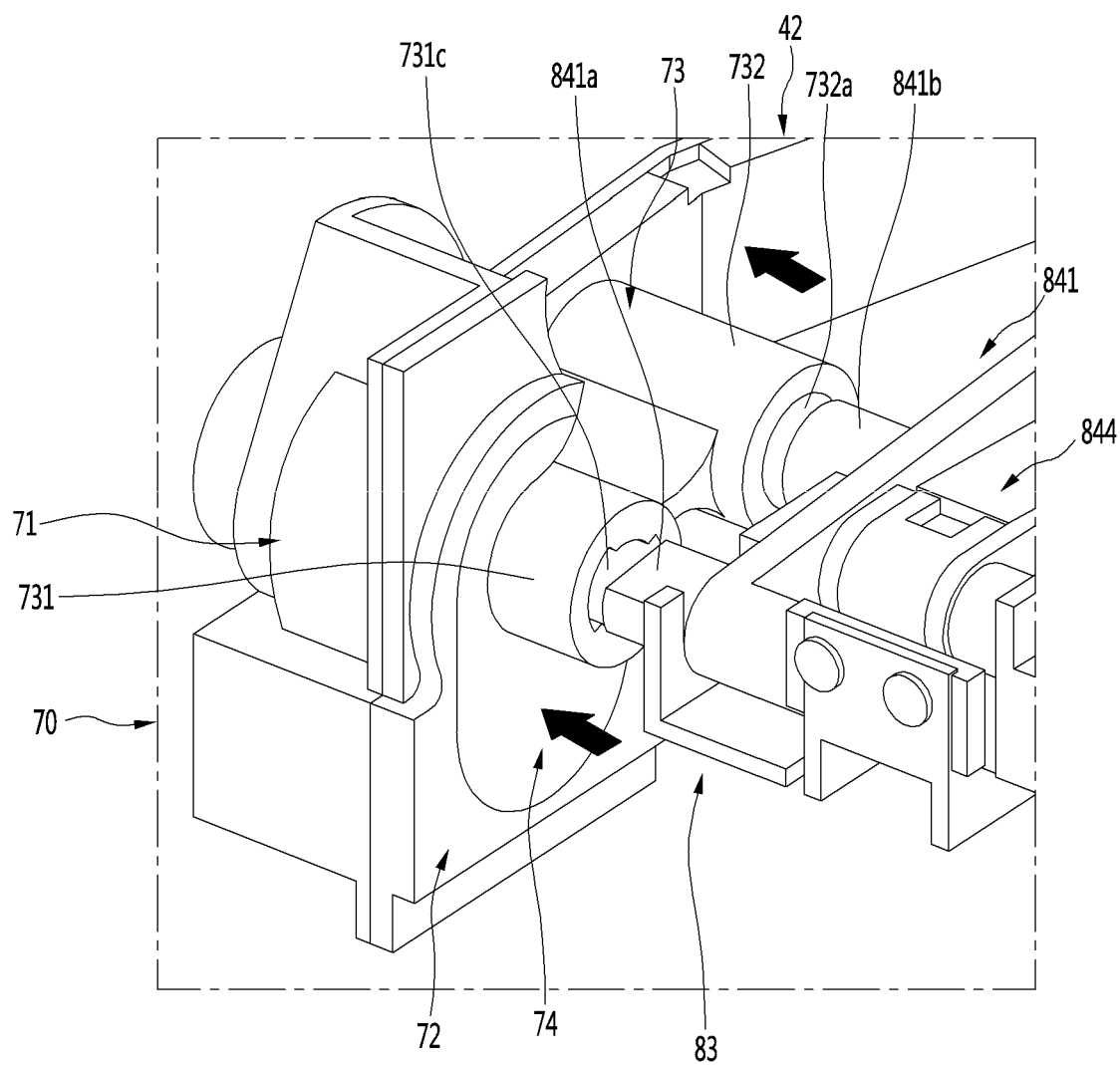
FIG. 28 is a perspective view illustrating a separation state of the connecting assembly and the elevation device.

FIG. 26 is a perspective view illustrating a connection state between the connecting assembly and the elevation device. Also, FIG. 27 is a cross-sectional view illustrating the connection state between the connecting assembly and the elevation device. Also, FIG. 28 is a perspective view illustrating a separation state of the connecting assembly and the elevation device.

As illustrated in the drawings, if the service of the driving device 40 or the elevating device 80 is necessary or if the use of the elevation device 80 is not desired, the driving device 40 and the elevation device 80 may be simply separated from and coupled to each other.

As illustrated in FIGS. 26 and 27, the front panel door part 31 and the drawer part 32 may be coupled to each other, and power transmission may be possible in the state in which the connecting assembly 70 and the elevation device 80 are connected to each other. Here, the connection member 73 may be connected to the lever 42 and the elevation device 80, and the first connection part 731 may be connected to the fixing shaft 77 and the rotation shaft 841a of the elevation device 80. The lever protrusion 425 and the scissors protrusion 841b may be inserted into the second connection part 732.

In this state, when the lever 42 rotates by the operation of the driving device 40, the rotation shaft 841a of the elevation device 80 may rotate by the first connection part 731, and the scissors assembly 84 of the elevation device 80 may rotate.

Here, since the second connection part 732 is connected to the scissors protrusion 841b of the elevation device 80, greater force may be transmitted to the elevation device 80. In detail, the second connection part 732 may be disposed at a position away from the first connection part 731, and thus when the first connection part 731 rotates around the shaft, a moment similar to a leverage may be applied to the second connection part 732. Thus, a moment greater than the moment generated at the first connection part 731 may be applied together with the second connection part 732, and thus the elevation device 80 may rotate with larger force.

Furthermore, since the pair of scissors assemblies 84 are disposed on both sides of the scissors assembly 84, the power may be transmitted to the scissors assembly 84, thereby effectively elevating the elevation device 80 with less force.

The connection member 73 may have a single shaft structure that connects the lever 42 to the rotation shaft 841*a* of the elevation device 80 when the torque by the driving device is sufficient. The scissors assembly 84 may also be configured so that the connection member 73 is connected to each of both sides of one of the scissors assemblies 84 to elevate the elevation device 80.

The user may push the push part 74 of the connection assembly 70 to push the connection member 73 in the state in which the service condition of the driving device or the elevating device 80 of the refrigerator 1 occurs. The coupling between the connection member 73 and the elevation device 80 may be released by allowing the connection member 73 to move forward.

In this state, the front panel door part 31 may be separated from the drawer part 32, and the entire driving device 40 provided in the front panel door part 31 may be completely separated from the drawer part 32 by a single operation.

The driving device 40 may be maintained in the state in which the front panel door part 31 is separated, and the front panel door part 31, which normally operates as necessary, may be replaced to be mounted. Here, the connection member 73 of the front panel door part 31 may be coupled to the rotation shaft 841*a* and the scissors protrusion 841*b* of the lifting device without separate assembly and disassembly.

The front panel door part 31 and the drawer part 32 may be rigidly coupled to each other by the door frame or other structure, and the front panel door part 31 and the drawer part 32 may be additionally separated from or coupled to each other when the front panel door part 31 and the drawer part 32 are separated from or coupled to each other.

Hereinafter, a state in which the door 30 of the refrigerator 1 is inserted and withdrawn and is elevated according to an embodiment will be described in more detail with reference to the accompanying drawings.

Figure 29:
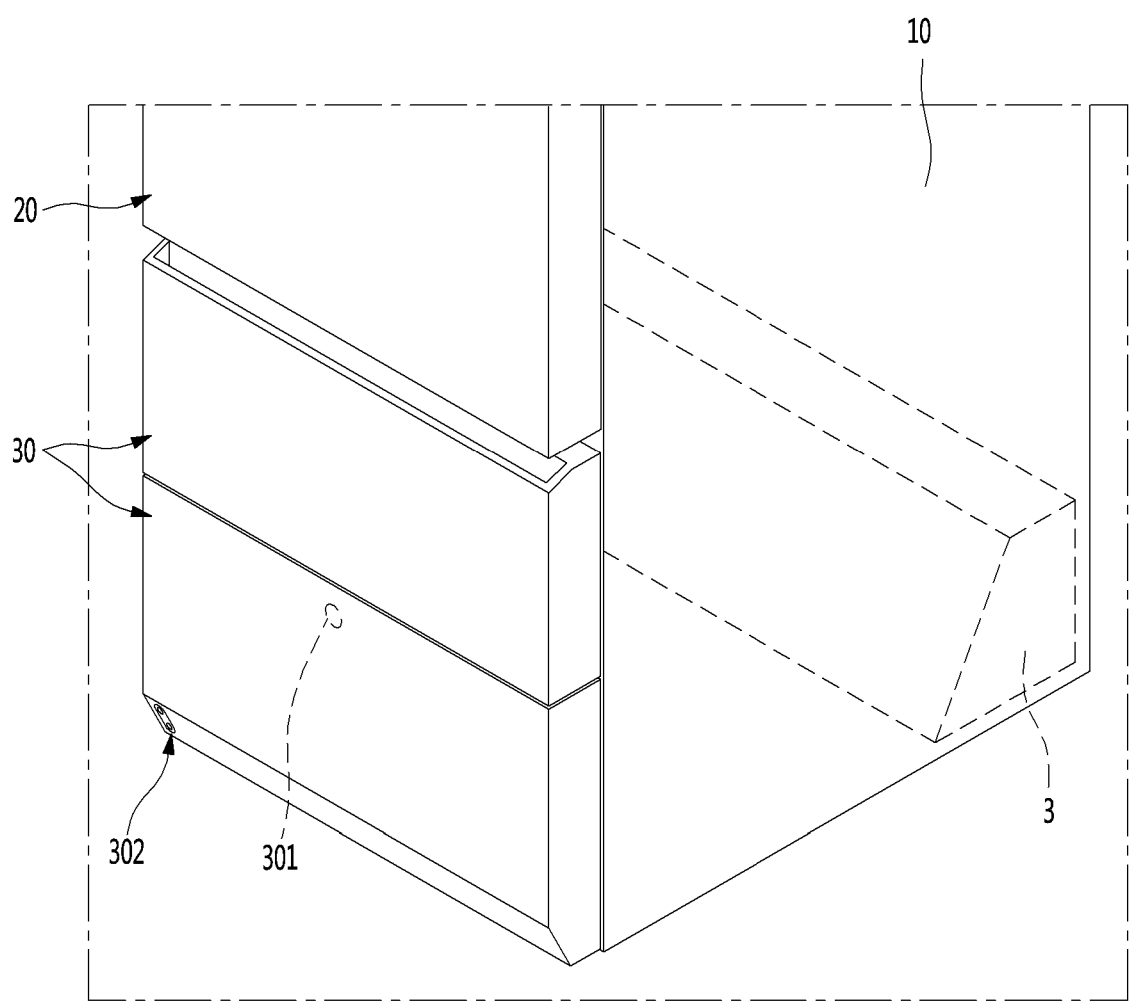
FIG. 29 is a perspective view illustrating a state in which a drawer door is closed.

FIG. 29 is a perspective view illustrating a state in which the drawer door is closed.

As illustrated in the drawing, in the state in which the food is stored, the refrigerator 1 may be maintained in a state in which all of the rotation door 20 and the door 30 are closed. In this state, the user may withdraw the door 30 to accommodate the food.

The door 30 may be provided in plurality in a vertical direction and be withdrawn to be opened by the user's manipulation. Here, the user's manipulation may be performed by touching the manipulation part 301 disposed on the front surface of the rotation door 20 or the door 30. Alternatively, an opening command may be inputted on the manipulation device 302 provided on the lower end of the door 30. Also, the manipulation part 301 and the manipulation device 302 may individually manipulate the insertion and withdrawal of the door 30 and the elevation of the elevation member 35. Alternatively, the user may hold a handle of the door 30 to open the drawer door 30.

Hereinafter, although the lowermost door 30 of the doors 30, which are disposed in the vertical direction, is opened and elevated as an example, all of the upper and lower doors 30 may be inserted and withdrawn and elevated in the same manner.

Figure 30:
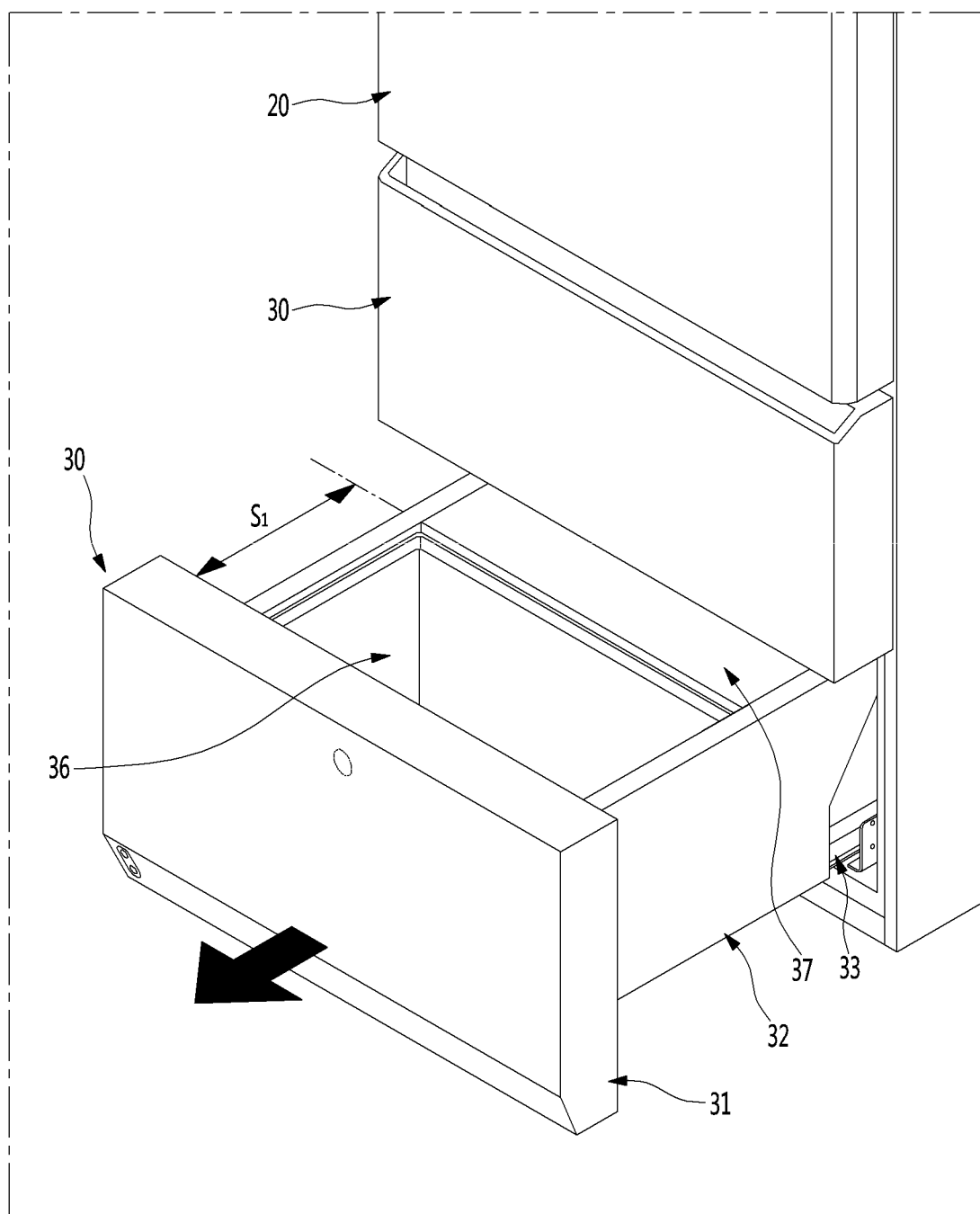
FIG. 30 is a perspective view illustrating a state in which the drawer door is completely opened.
Figure 31:
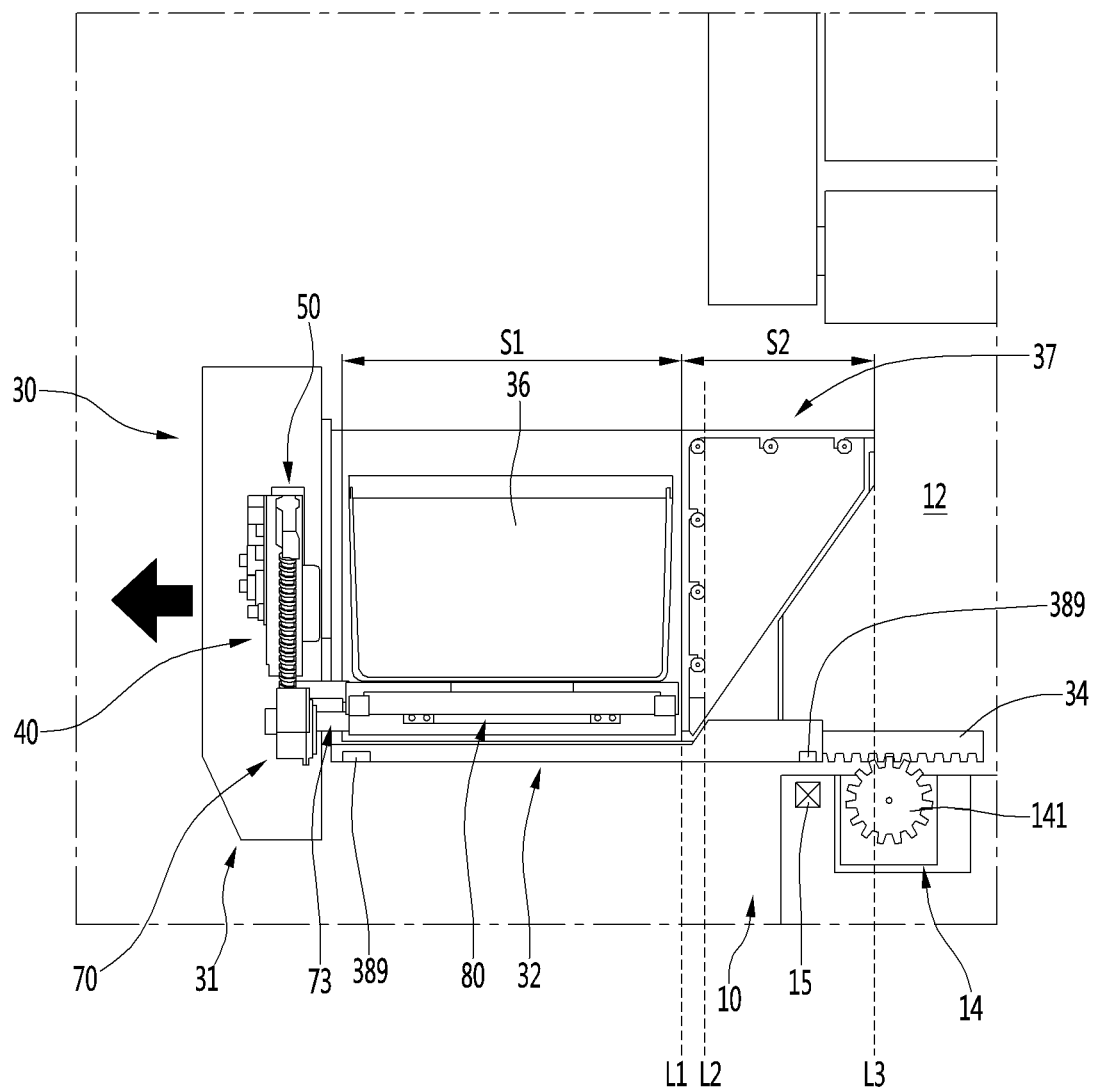
FIG. 31 is a cross-sectional view of the drawer door in a state in which a basket of the drawer door completely descends.

FIG. 30 is a perspective view illustrating a state in which the drawer door is completely opened. Also, FIG. 31 is a cross-sectional view of the drawer door in a state in which a basket of the drawer door completely descends.

As illustrated in the drawings, the user may manipulate the draw-out operation on the door 30 to withdraw the door 30 forward. The door 30 may be withdrawn while the draw-out rail 33 extends.

The door 30 may be configured to be inserted and withdrawn by the driving of the draw-out motor 14, not by a method of directly pulling the door 30 by the user. The draw-out rack 34 provided on the bottom surface of the door 30 may be coupled to the pinion gear 141 rotating when the draw-out motor 14 provided in the cabinet 10 is driven. Thus, the door 30 may be inserted and withdrawn according to the driving of the draw-out motor 14.

The draw-out distance of the door 30 may correspond to a distance at which the front space S1 within the door 30 is completely exposed to the outside. Thus, in this state, when the elevation device 80 is elevated, the container or the food may not interfere with the doors 20 and 30 or the cabinet 10 disposed thereabove.

Here, draw-out distance of the door 30 may be determined by a draw-out detection device 15 disposed on the cabinet 10 and/or the door 30. The draw-out detection device 15 may be provided as a detection sensor that detects a magnet 389 to detect a state in which the door 30 is completely withdrawn or closed.

For example, as illustrated in the drawings, the magnet 389 may be disposed on the bottom of the drawer part 32, and the detection sensor may be disposed on the cabinet 10. The draw-out detection device 15 may be disposed at a position corresponding to a position of the magnet 389 when the door 30 is closed and a position of the magnet 389 when the door 30 is completely withdrawn. Thus, the draw-out state of the door 30 may be determined by the draw-out detection device 15.

Also, as necessary, a switch may be provided at each of positions at which the door 30 is completely inserted and withdrawn detect the draw-out state of the door 30. In addition, the draw-out state of the door 30 may be detected by counting the rotation number of draw-out motor 14 or measuring a distance between the rear surface of the front panel door part 31 and the front end of the cabinet 10.

In the state in which the door 30 is completely withdrawn, the elevation motor 64 may be driven to elevate the elevation device 80. The elevation device 80 may be driven in an even situation in which the door 30 is sufficiently withdrawn to secure safe elevation of the food or container 36 seated on the elevation device 80.

That is, in the state in which the door 30 is withdrawn to completely expose the front space S1 to the outside, the elevation device 80 may ascend to prevent the container 36 or the stored food seated on the elevation device 80 from interfering with the doors 20 and 30 or the cabinet 10.

In details of the draw-out state of the door 30, the front space S1 has to be completely withdrawn to the outside of the lower storage space 12 in the state in which the door 30 is withdrawn for the elevation.

Particularly, the rear end L1 of the front space S1 has to be more withdrawn than the front end L2 of the cabinet 10 or the upper door 20. Also, the rear end L1 of the front space S1 is disposed at a further front side than the front end L2 of the cabinet 10 or the door 20 so at to prevent the elevation device 80 from interfering when the elevation device 80 is elevated.

Also, when the elevating device 80 is completely withdrawn to be driven, the entire drawer part 32 may not be completely withdrawn but withdrawn up to only a position for avoiding interference when the elevating device 80 is elevated as illustrated in FIG. 31. Here, at least a portion of the rear space S2 of the drawer part 32 may be disposed inside the lower storage space 12. That is, the rear end L3 of the drawer part 32 may be disposed at least inside the lower storage space 12.

Thus, even when the weight of the stored object is added to the weight of the door 30 itself including the driving device 40 and the elevation device 80, the deflection or damage of the draw-out rail 33 or the door 30 itself may not occur to secure the reliable draw-out operation.

The ascending of the elevation device 80 may start in a state in which the door 30 is completely withdrawn. Also, to secure the user's safety and prevent the food from being damaged, the ascending of the elevation device 80 may start after a set time elapses after the door 30 is completely withdrawn.

After the door 30 is completely withdrawn, the user may manipulate the manipulation part 301 to input the ascending of the elevation device 80. That is, the manipulation part 301 may be manipulated to withdraw the door 30, and the manipulation part 301 may be manipulated again to elevate the elevation device 80.

Also, in the state in which the door 30 is manually inserted and withdrawn, the manipulation part 301 may be manipulated to elevate the elevation device 80.

As illustrated in FIG. 31, the driving device 40 and the elevation device 80 may not operate until the door 30 is completely withdrawn, and the elevation device 80 may be maintained in the lowest state.

Figure 32:
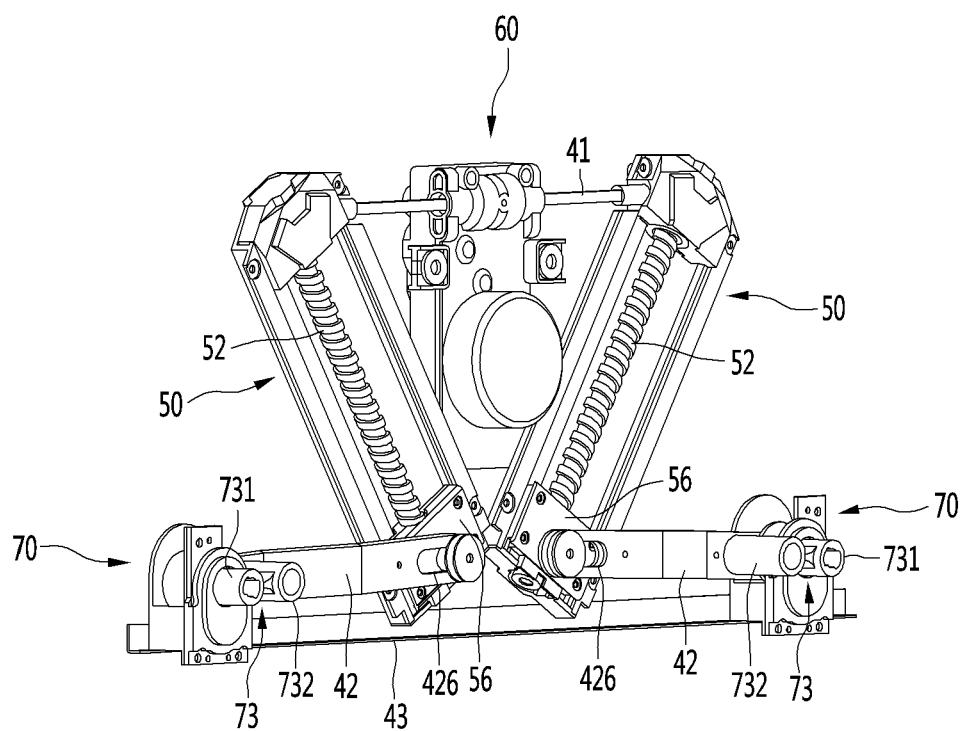
FIG. 32 is a perspective view illustrating a state of the driving device in a state in which the basket of the drawer door completely descends.

FIG. 32 is a perspective view illustrating a state of the driving device in a state in which the basket of the drawer door completely descends. Also, FIG. 33 is a perspective view illustrating a state of the driving device in the state in which the basket of the drawer door completely descends.

As illustrated in the drawings, when a signal for operating the driving device 40 is not input, the driving device 40 may not operate to maintain the elevation device 80 at the lowest state.

In this state, the driving motor 40 may not operate, and the screw holder 56 may be disposed at the lowest position of the screw 52 as illustrated in FIG. 32. Also, the lever 42 may not also rotate, and the first connection part 731 and the second connection part 732 of the connecting member 73 may be disposed on the same height.

Figure 33:
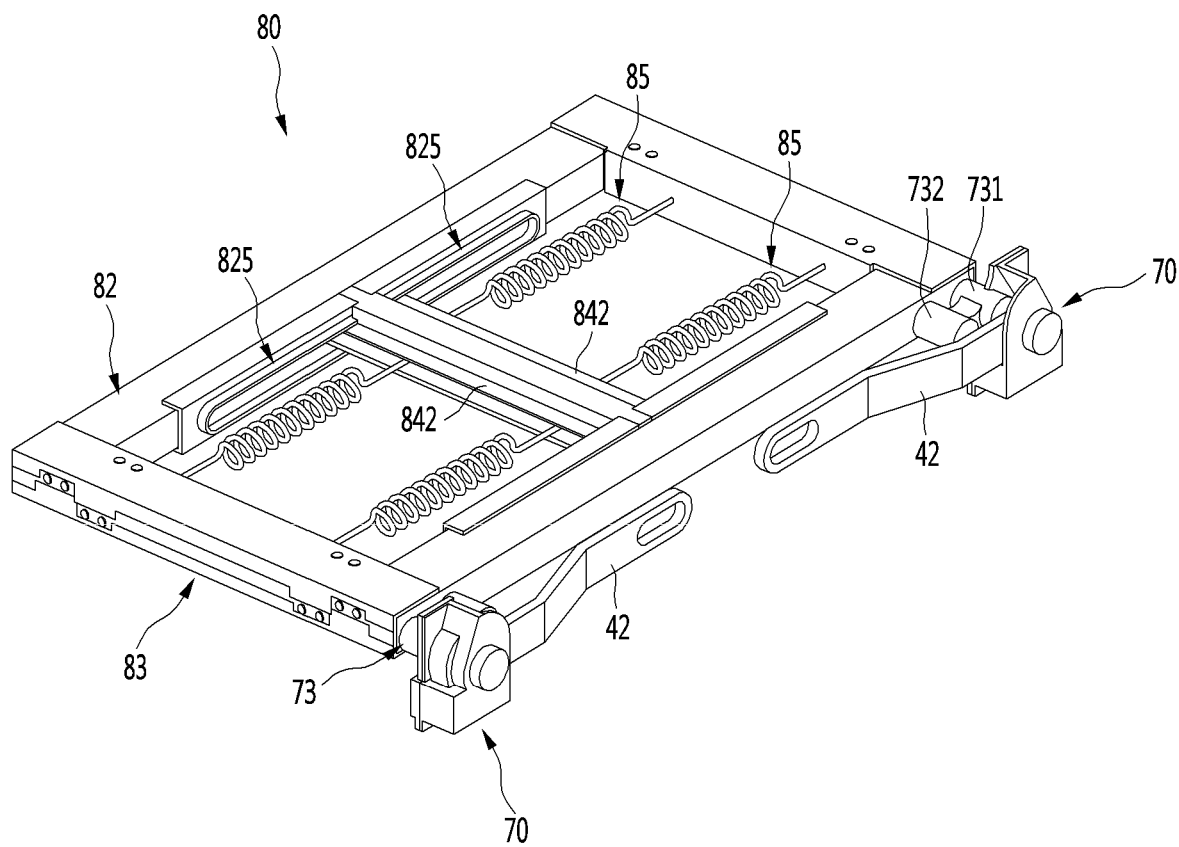
FIG. 33 is a perspective view illustrating a state of the driving device in the state in which the basket of the drawer door completely descends.

The elevation device 80 may maintain the current state as long as the upper frame 82 is in the lowest state as shown in FIG. 33, and the driving device 40 may not operate.

In this state, the upper frame 82 and the lower frame 83 may contact each other, and the scissors assembly 84 may be accommodated in the upper frame 82 and the lower frame 83.

Here, no external force may be applied to the rotation shaft 841a and the scissors protrusion 841b of the elevation device 80 connected to the connecting assembly 70 because the lever 42 does not operate.

The end of the frame part 821 and the sliding shaft 842 may be farthest away from each other, and the scissors elastic member 85 may be in the maximum tensioned state. Thus, the upper frame 82 may be elevated more effectively by the restoring force of the scissors elastic member 85 in addition to the power transmission by the driving device 40 when the driving device 40 is started to be driven.

A signal input for the elevation by the user may be waited while maintaining the above-described state, and the driving device 40 may operate when the user input the elevation manipulation.

Figure 34:
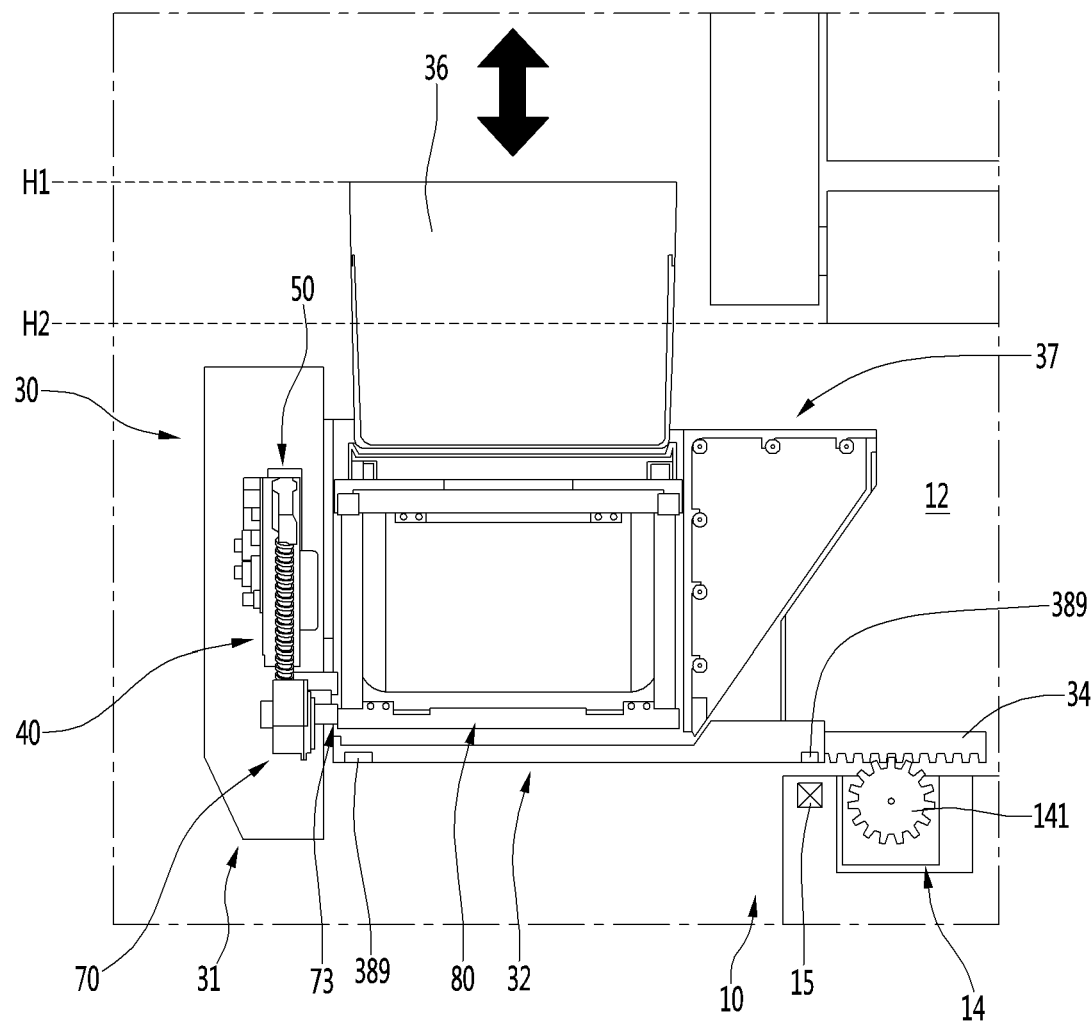
FIG. 34 is a cross-sectional view illustrating a state of the drawer door in a state in which the basket of the drawer door completely ascends.

FIG. 34 is a cross-sectional view illustrating a state of the drawer door in a state in which the basket of the drawer door completely ascends.

As illustrated in FIG. 31, in the state in which the door 30 is withdrawn, when the operation signal of the driving device is inputted, the driving device 40 may operate, and the state as illustrated in FIG. 34 may be obtained by elevating the elevation device 80.

The driving device 40 may be connected to the elevation device 80 by the connecting assembly 70 so that the power is transmitted to the elevation device 80. The power may be transmitted to the elevation device 80 by the connecting assembly 70 together with the operation of the driving device 40, and the elevation device 80 may start to ascend.

The elevation device 80 may continuously ascend and then be stopped when ascend to a sufficient height to facilitate access to the food or container 36 seated on the elevation device 80 as illustrated in FIG. 34. In this state, the user may easily lift the food or container 36 without overtaxing the waist.

When the elevation completion signal of the elevation device 80 is inputted, the driving of the driving motor 64 may be stopped. For this, a height detection device 16 capable of detecting the position of the elevation device 80 may be provided. The height detection device 16 may be provided on the front panel door part 31 and may be disposed at a position corresponding to the maximum height of the elevation device 80 and at a position corresponding to the lowest height of the elevation device 80.

The height detection device 16 may be provided as a detection sensor that detects a magnet 389. The height detection device 16 may detect the magnet 389 disposed on the elevation device 80 to determine whether the ascending of the elevation device 80 is completed. Also, the height detection device 16 may be provided as a switch structure to turn on the switch when the elevation device 80 maximally ascends. Also, the height detection device 16 may be provided on the elevation rail 44 or the screw 52 to detect the maximally ascending position of the elevation device 80. Also, whether the elevation device 80 maximally ascends may be determined according to a variation in load applied to the elevation motor 64.

The driving of the elevation motor 64 is stopped in the state in which the elevation device 80 maximally ascends. In this state, although the elevation device 80 is disposed inside the drawer part 32, the food or container 36 seated on the elevation device 80 may be disposed at a position higher than the opened top surface of the drawer part 32. Thus, the user may easily access the food or container 36. Particularly, it is not necessary to allow the waist excessively for lifting the container 36, so that it is possible to perform safer and more convenient operation.

In details of the maximally ascending state of the elevation device 80, the elevation device 80 may be elevated by driving the driving device 40 and be disposed at least at a lower position than the upper end of the drawer part 32.

In the driving device 80, when viewed with respect to the container 36 in the state in which the container 36 is seated, the upper end H1 of the container 36 may ascend to a position higher than the upper end H2 of the lower storage space 12. Here, the height of the container 36 may reach a height suitable for the user to reach the container 36 without stretching his/her waist.

That is, the driving device 40 may have a structure in which the container 36 ascends from the inside of the drawer part 32. However, when the container 36 is mounted on the elevation device 80, the container 36 may be disposed at an accessible height.

After the user's food storing operation is completed, the user may allow the elevation device 80 to descend by manipulating the manipulation part 301. The descending of the elevation device 80 may be performed by reverse rotation of the elevation motor 64 and may be gradually performed through the reverse procedure with respect to the above-described procedure.

Also, when the descending of the elevation device 80 is completed, i.e., in the state of FIG. 31, the completion of the descending of the elevation device 80 may be performed by the height detection device 16. The height detection device 16 may be further provided at a position that detects the magnet disposed on the elevation device 80 when the elevation device 80 is disposed at the lowermost descending position. Thus, when the completion of the descending of the elevation device 80 is detected, the driving of the driving motor 40 is stopped.

Also, after the driving of the elevation motor 64 is stopped, the door 30 may be inserted. Here, the door 30 may be closed by the user's manipulation or by the driving of the draw-out motor 14. When the door 30 is completely closed, a state of FIG. 29 may become.

Hereinafter, a state in which the elevation device 80 is elevated by the operation of the driving device will be described.

Figure 35:
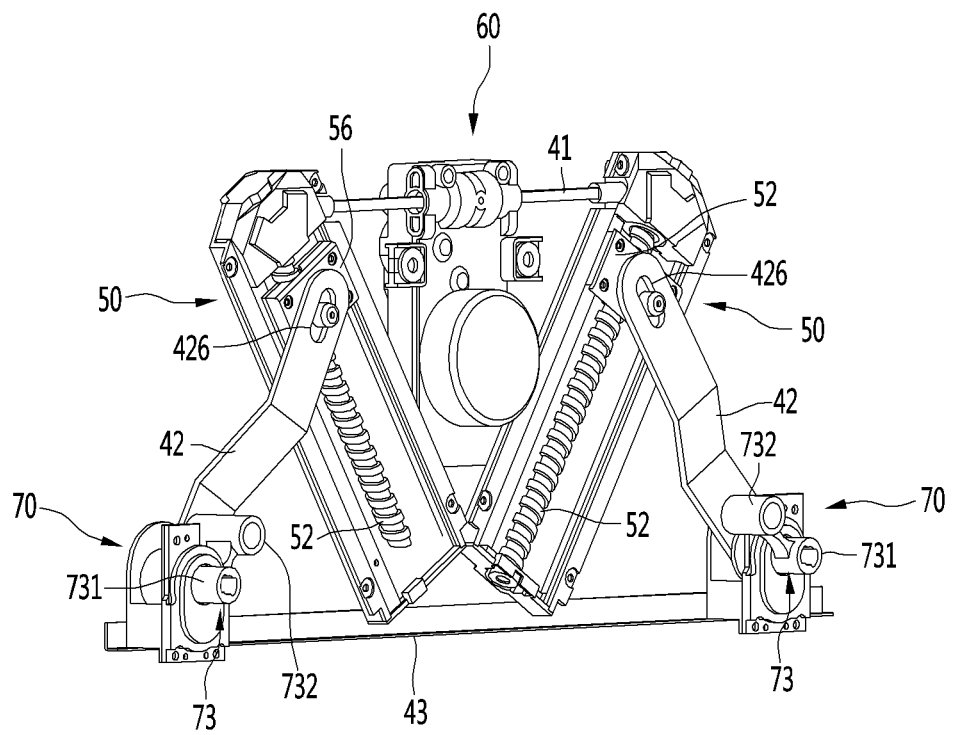
FIG. 35 is a perspective view illustrating a state of the driving device in the state in which the basket of the drawer door completely ascends.
Figure 36:
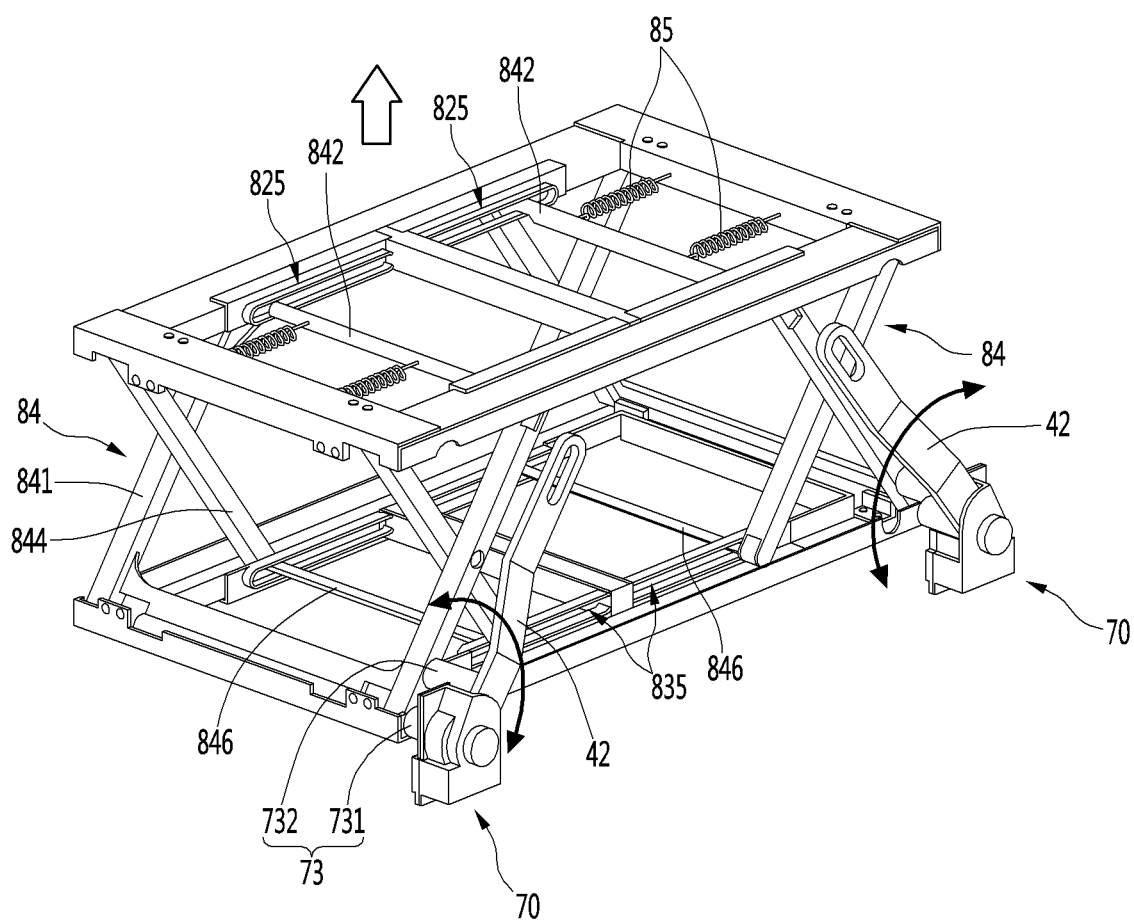
FIG. 36 is a perspective view illustrating a state of the driving device in the state in which the basket of the drawer door completely ascends.

FIG. 35 is a perspective view illustrating a state of the driving device in the state in which the basket of the drawer door completely ascends. Also, FIG. 36 is a perspective view illustrating a state of the driving device in the state in which the basket of the drawer door completely ascends.

As illustrated in the drawings, when the driving motor rotates in the normal or reverse direction by the ascending/descending signal of the elevation device 80, the operation of the driving device 40 may start.

In details of the ascending operation of the elevation device 80, the shaft 41 may rotate by the operation of the driving motor 64. The shaft gear 412 on both sides of the shaft 41 and the screw gear 53 may rotate in the state of being engaged with each other by the rotation of the shaft 41, the screw 52 may rotate.

Here, both the shaft gears 412 may be connected to both ends of the shaft 41 to rotate. Thus, the same rotation force may be transmitted to the both the screw assemblies 50. Also, in the screw assembly 50 having the same structure, the screw 52 may rotate at the same rotational speed, and the screw holder 56 may ascend by the same height at the same time.

As the screw holder 56 ascends, the lever 42 connected to the screw holder 56 may also rotate. The lever 42 may continuously rotate in the state of being axially coupled to the connecting assembly 70, and the connection member 73 connected to the lever 42 may also rotate together with the rotation of the lever 42.

The connection member 73 may be connected to the lever protrusion 425 at a position apart from the rotation shaft of the lever 42 as well as the rotation shaft of the lever 42 by the lever protrusion 425. Thus, the elevation device 80 connected to the connection member 73 and the connecting member 73 may rotate with a larger moment.

The rotation shaft 841*a* of the elevation device 80 and the scissors protrusion 841*b* may be coupled to the first connection part 731 and the second connection part 732 of the connection member 73. The rotational force may be transmitted to the first rod 841 of the scissors assembly 84 by rotation of the scissors assembly 73 so that the scissors assembly 84 is more effectively unfolded.

As the scissors assembly 84 is unfolded, the sliding shaft 842 may move toward the frame part 821 at a position adjacent to the side of the partition part 822, and the first rod 841 and the second rod 844 may rotate in the direction in which an angle gradually increases.

The sliding shaft 842 may be connected to the frame part 821 at the facing position by the scissors elastic member 85 and the restoring force of the scissors elastic member 85 may allow the sliding shaft 842 to move toward the frame 821. Thus, it is possible to assist the elevation of the elevating device 80.

As a result, the scissors assembly 84 may be unfolded so that the upper frame 82 may ascend, and the container 36 or the food placed on the support plate 81 may ascend and finally the elevation device 80 may ascend to its maximum height.

In this state, when the driving device 40 is stopped, and the user allows the elevating device 80 to move downward after storing the food, the driving motor 64 may rotate in the reverse direction and operate in the reverse order, and thus, the elevation device 80 may descend and then be in the state as illustrated in FIG. 31.

In addition to the foregoing embodiment, various embodiments may be exemplified.

Hereinafter, another embodiments will be described with reference to the accompanying drawings. In the other embodiments of the present disclosure, the same reference numerals are used for the same components as those of the above-described embodiments, and a detailed description thereof will be omitted.

Figure 37:
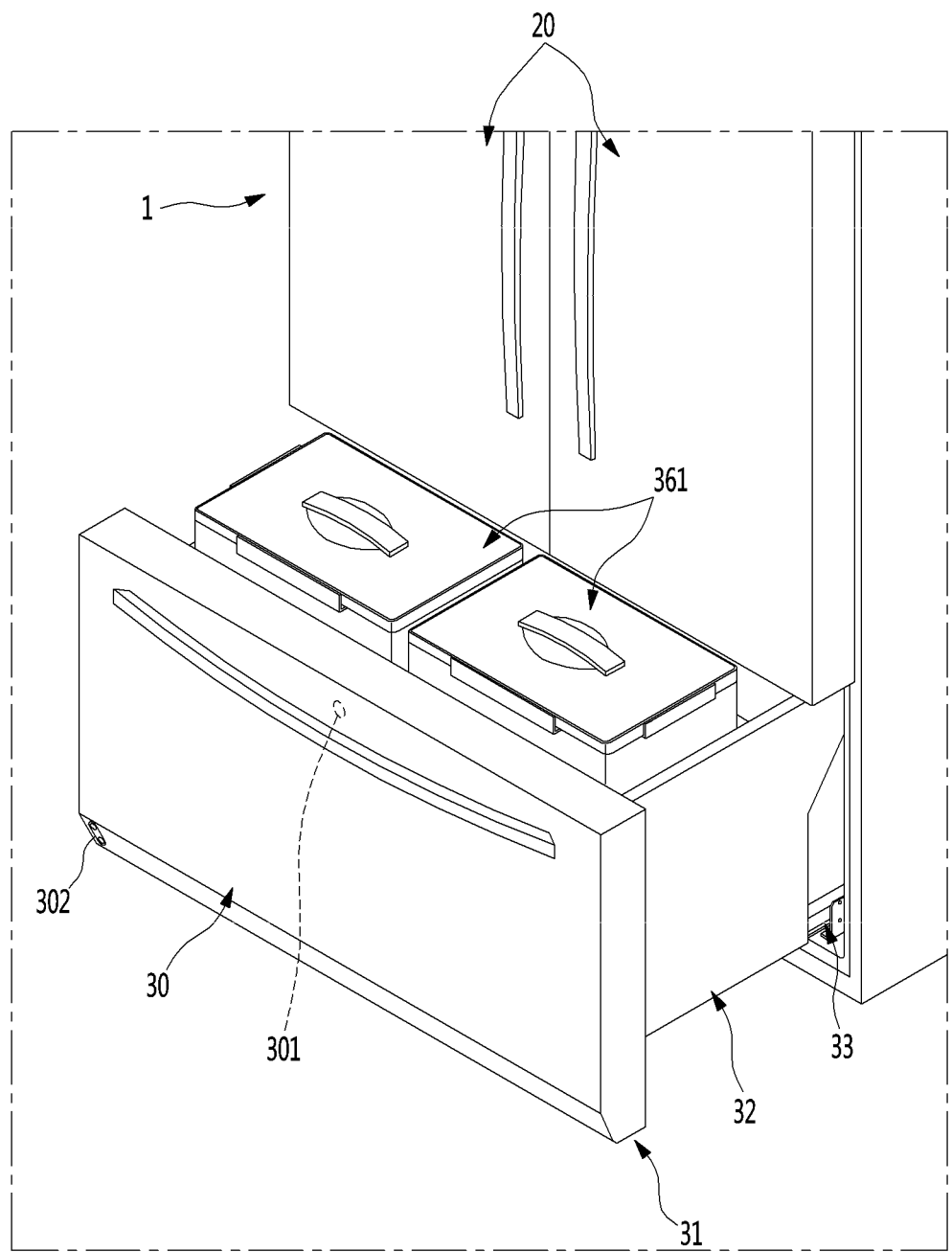
FIG. 37 is a perspective view of a refrigerator according to another embodiment.

FIG. 37 is a perspective view of a refrigerator according to another embodiment.

As illustrated in the drawing, a refrigerator 1 according to another embodiment may include a cabinet 10 having a storage space that is vertically partitioned and a door 2 opening and closing the storage space.

The door 2 may include a rotation door 20 which is provided in an upper portion of a front surface of the cabinet 10 to open and close an upper storage space and a door 30 disposed in a lower portion of the front surface of the cabinet 10 to open and close a lower storage space. The door 30 may be inserted and withdrawn forward and backward in the above embodiment, and the container and the food inside the drawer part 32 may be vertically elevated by the operation of the driving device 40 and the elevation device 80 inside the door 30.

The elevation device 80 may be provided in the region of the front space of the inside of the drawer part 32. Thus, the elevation device 80 may elevate the food in the region of the front space among the entire region of the drawer part 32.

A manipulation part 301 or a manipulation device 302 may be provided at one side of the front panel door part 31, and the driving device 40 may be installed inside the front panel door part 31. Also, the pulling-out operation of the drawer door 30 and/or the elevation of the elevation device

80 may be carried out by the manipulation of the manipulation part 301 or the manipulation device 302.

The drawer part 32 may be provided with the elevation device 80. The elevation device 80 may be elevated by a connecting assembly that connects the driving device to the elevation device. Since the constituent of the drawer door 30 and constituent of the driving device 40 and the elevation device 80 are the same as those according to the foregoing embodiment, their detailed descriptions will be omitted.

A plurality of containers 361 may be provided in the elevation device 80. The container 361 may be a sealed container such as a kimchi passage, and a plurality of the containers 361 may be seated on the elevation device 80. The container 361 may be elevated together with the support member 35 when the elevation device 35 is elevated. Thus, in the state in which the container 361 ascends, at least a portion of the drawer part 32 may protrude, and thus, the user may easily lift the container 361.

The elevation device 80 may interfere with the rotation door 20 in the rotation door 20 is opened even though the drawer door 30 is withdrawn. Thus, the support member 35 may ascend in a state in which the rotation door 20 is closed. For this, a door switch for detecting the opening/closing of the rotation door 20 may be further provided.

Figure 38:
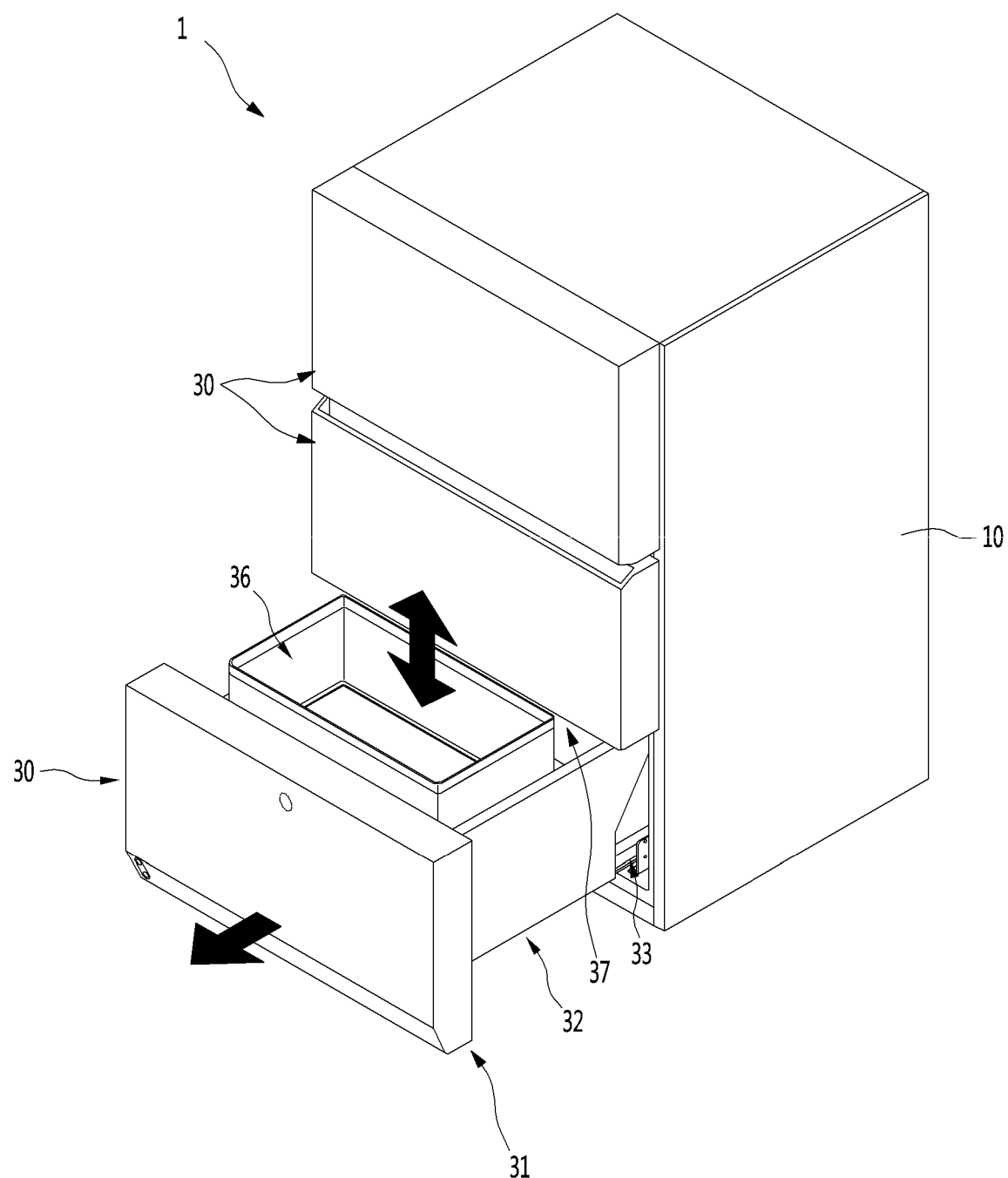
FIG. 38 is a perspective view of a refrigerator according to another embodiment.

FIG. 38 is a perspective view of a refrigerator according to another embodiment.

As illustrated in the drawings, a refrigerator 1 according to another embodiment includes a cabinet 10 defining a storage space therein and a door 2 opening and closing an opened front surface of the cabinet 10, which define an outer appearance of the refrigerator 1.

The door 2 may include a drawer door 30 that defines an entire outer appearance of the refrigerator 1 in a state in which the door 2 is closed and is withdrawn forward and backward. A plurality of the drawer doors 30 may be continuously arranged in the vertical direction. Also, the drawer doors 30 may be independently withdrawn by the user's manipulation. The drawer door 30 may be provided with the driving device 40 and the elevation device 80.

The driving device 40 may be installed in the front panel door part 31, and the elevation part 80 may be provided inside the drawer part 32. Also, the driving device 40 and the elevation device 80 may be connected to each other by the connecting assembly 70 when the front panel door part 31 and the drawer part 32 are coupled to each other. Also, the elevation device 80 may be disposed in the front space S1 of the total storage space of the drawer part 32.

The insertion and withdrawal of the drawer door 30 and the elevation of the elevation device 80 may be individually performed. After the drawer door 30 is withdrawn, the elevation device 80 may ascend. Then, after the elevation device 80 descends, the insertion of the drawer door 30 may be continuously performed.

Also, when the plurality of drawer doors 30 are vertically arranged, the elevation device 80 inside the drawer door 30, which is relatively downwardly disposed, may be prevented from ascending in a state where the drawer door 30 is relatively drawn upward. Thus, the drawer door 30 may be prevented from interfering with the drawer door 30 in which the food and container are withdrawn upward.

Also, although the elevation device 80 ascends in the state in which the drawer door 30 that is disposed at the uppermost side is withdrawn in FIG. 38, all of the drawer doors 30 disposed at the upper side may also be elevated by the elevation device 80 that is provided inside.

If a height of each of the drawer doors 30 disposed at the upper side is sufficiently high, only the drawer door 30 disposed at the lowermost position or the elevation device 35 of the of drawer doors 30 disposed relatively downward may be elevated.

Figure 39:
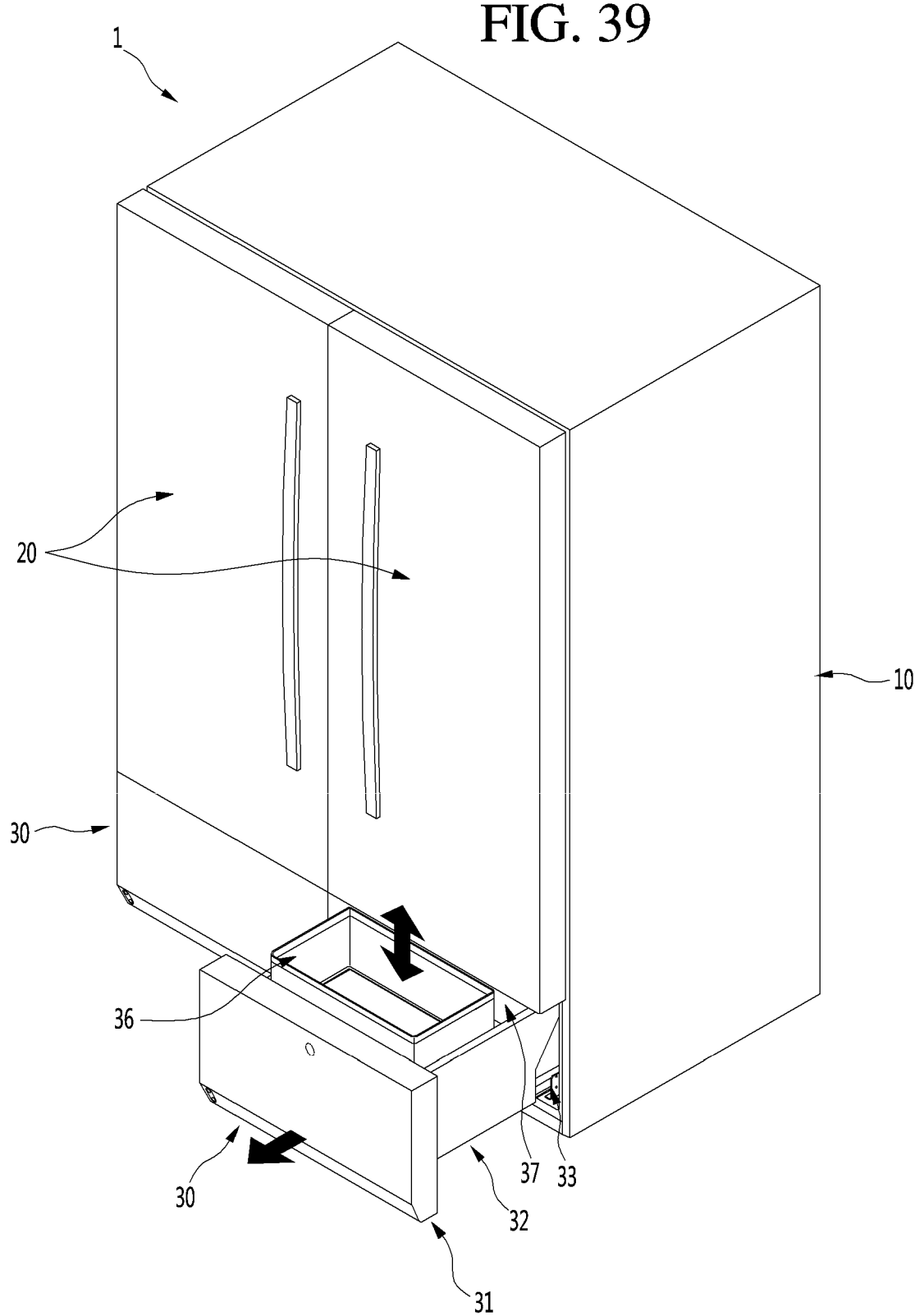
FIG. 39 is a perspective view of a refrigerator according to another embodiment.

FIG. 39 is a perspective view of a refrigerator according to another embodiment.

As illustrated in the drawings, a refrigerator 1 according to another embodiment includes a cabinet 10 defining a storage space therein and a door 2 opening and closing an opened front surface of the cabinet 10, which define an outer appearance of the refrigerator 1.

The inside of the cabinet 10 may be divided into an upper space and a lower space. If necessary, the upper and lower storage spaces may be divided again into left and right spaces.

The door 2 may include a rotation door 20 which is provided in an upper portion of the cabinet 10 to open and close the upper storage space and a drawer door 2 disposed in a lower portion of the cabinet 10 to open and close the lower storage space.

Also, the lower space of the cabinet may be divided into left and right spaces. The drawer door 30 may be provided in a pair so that the pair of drawer doors 30 respectively open and close the lower spaces. A pair of the drawer doors 30 may be arranged on both sides of the right and left sides of the drawer door 30. The drawer door 30 may include the driving device 40 and an elevation device 80.

The driving device 40 may be installed in the front panel door part 31, and the elevation part 80 may be provided inside the drawer part 32. Also, the driving device 40 and the elevation device 80 may be connected to each other by the connecting assembly 70 when the front panel door part 31 and the drawer part 32 are coupled to each other. Also, the elevation device 80 may be disposed in the front space S1 of the total storage space of the drawer part 32.

The drawer door 30 may have the same structure as the drawer door according to the foregoing embodiment. Thus, the drawer door 30 may be inserted and withdrawn by user's manipulation. In the drawer door 30 is withdrawn, the elevation member 80 may ascend so that a user more easily accesses a food or container within the drawer door 30.

The following effects may be expected in the refrigerator according to the proposed embodiments.

The refrigerator according to the embodiment, the portion of the storage space within the drawer door may be elevated in the state in which the drawer door is withdrawn. Thus, when the food is accommodated in the drawer door disposed at the lower side, the user may not excessively turn its back to improve the convenience in use.

Particularly, in order to lift the heavy-weight food or the container containing the food, the user has to lift the food or container with a lot of power. However, the elevation within the drawer door may ascend up to a convenient position by driving the driving device to prevent the user from being injured and significantly improve the convenience in use.

Also, the driving device constituted by the electric devices for providing the power may be provided inside the front panel door part, and the elevation device for the elevation may be provided inside the drawer part so that the driving device and the elevation device are not exposed to the outside to improve the outer appearance.

Particularly, the driving device constituted by the electric devices may be disposed inside the front panel door part, and it may be possible to prevent the user from accessing the door to prevent the occurrence of the safety accident.

Also, the driving device may be provided in the door to block the noise and reduce noise during the use.

Also, the driving part that occupies a large portion of the entire constituents may be disposed in the front panel door part to minimize the storage capacity loss of the drawer part. Also, the elevation device or the structure that is compactly folded and accommodated in the descending state may be provided to secure the storage capacity in the refrigerator.

Also, the driving device provided in the front panel door part and the elevation devices provided in the drawer part may be connected to each other by the connecting assembly, and the driving device and the elevation device may be connected to or separated from each other according to the user's manipulation of the connecting assembly.

Thus, there may be no need for the separate tool or the complicated process, and it may be possible to assemble and service through the simple operation of manipulating the connecting assembly and also to be easily cleaned. Particularly, it may be possible to easily replace and maintain the electric device by locating the driving device, which is a component of the electric device, which is likely to fail during the service, on the front panel door part.

Also, the drive device may be provided with the screw assemblies on both sides and provide the power to both sides of the elevation device to smoothly elevate the food or container having the high load.

Also, the screw assemblies on both sides may transmit the uniform rotation force to both sides by the shaft passing through one motor assembly to ensure the horizontal elevation of the elevation device without the separate control or constituent and without the deflection or tilting.

Also, the connection member for transmitting the power for elevating the elevation device may be transmitted from the first connection part and the second connection part to the rotation shaft and also from one side away from the rotation shaft to the rotation shaft.

Thus, the force applied at the point away from the rotation shaft may be applied as greater force by the moment. Thus, there is an advantage that when the elevation device is elevated, the greater force is provided to realize the more easy and effective elevation operation.

Also, the elevation device may be provided at a portion of the front portion of the drawer part. Thus, the elevation device may be elevated without interfering with the upper door or cabinet at the time of the elevation without being withdrawn to the extent that the drawer portion is completely exposed to the outside. Thus, it is possible to prevent the deflection and durability limitation caused by excessive withdrawal of the heavy drawer door and also to prevent the loss of the cold air caused by excessive withdrawal of the drawer.

In addition, the entire elevation structure may be compact, and the lightweight structure may be used to minimize the loss of the storage capacity and maintain the simple structure.

Also, the drive device may be disposed inside the door, and the elevation device may be disposed inside the drawer. Thus, the drive device and the elevation device may be prevented from being exposed to the outside during the use, and the safety and the outer appearance may be further improved.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
   a cabinet that defines a storage space;
   a drawer door assembly comprising (i) a front panel door part that is configured to open and close at least a portion of the storage space and (ii) a drawer part that defines an accommodation space;
   a rail that is configured to movably connect the drawer door assembly to the cabinet to thereby guide the drawer door assembly to insert into and withdraw from the storage space;
   a driving device located at the front panel door part and configured to provide power; and
   an elevation device located in the drawer part and configured to be coupled to the driving device, the elevation device being configured to elevate a portion of the drawer part relative to the front panel door part,
   wherein the driving device comprises:
      a motor assembly configured to provide a driving force,
      a screw assembly configured to perform an elevation operation based on the driving force from the motor assembly, and
      a lever that connects the screw assembly to the elevation device, the lever having (i) a first end that is rotatably connected to the drawer part and (ii) a second end that is coupled to the screw assembly,
   wherein the refrigerator further comprises a fixing shaft that is disposed at the front panel door part and extends in a front-rear direction, the fixing shaft being coupled to the first end of the lever and configured to rotate with the lever, and
   wherein the screw assembly is configured to cause the second end of the lever to rotate about the fixing shaft coupled to the first end of the lever, based on the elevation operation of the screw assembly.

2. The refrigerator according to claim 1, wherein the driving device further comprises a power transmission member that connects the motor assembly to the screw assembly and that is spaced apart from the motor assembly.

3. The refrigerator according to claim 2, wherein the screw assembly comprises:
   a housing;
   a screw that is located inside the housing, that is gear-coupled to an end of the power transmission member, and that is configured to rotate relative to the housing based on power received from the power transmission member; and
   a screw holder penetrated by the screw and configured to move longitudinally along the screw based on rotation of the screw.

4. The refrigerator according to claim 1, wherein the elevation device comprises:
   a lower frame fixed to the drawer part;
   an upper frame disposed vertically above the lower frame and configured to support one or more food items or one or more containers in the accommodation space; and
   a scissors assembly comprising a plurality of rods that connect the upper frame to the lower frame and are coupled to each other, and
   wherein the plurality of rods includes:
      a pair of first rods arranged in parallel to each other, a first rotation shaft that is connected to one end of the pair of first rods and defines an axis of rotation at a fixed position at the lower frame, a first sliding shaft connected to another end of the pair of first rods and configured to slide on the upper frame, and a rotation shaft that protrudes from one of the pair of first rods toward the front panel door part and is disposed on an extension line of the first rotation shaft.

5. The refrigerator according to claim 3, wherein the elevation device comprises:

a lower frame fixed to the drawer part;

an upper frame disposed vertically above the lower frame and configured to support one or more food items or one or more containers in the accommodation space;

a scissors assembly comprising a plurality of rods that connect the upper frame to the lower frame and are coupled to each other; and a connection member that connects the fixing shaft to a rotation shaft of each of the plurality of rods, and wherein each of the plurality of rods is configured to rotate about the rotation shaft based on movement of the screw holder longitudinally along the screw.

6. The refrigerator according to claim 4, further comprising:

a first connection part configured to connect the fixing shaft at the first end of the lever to the rotation shaft of the plurality of rods.

7. The refrigerator according to claim 6, further comprising:

a second connection part spaced apart from the first connection part and configured to connect the lever to the one of the pair of first rods at a position offset from the rotation shaft of the plurality of rods.

8. The refrigerator according to claim 1, wherein the screw assembly comprises a first screw assembly disposed at a first side of the motor assembly and a second screw assembly disposed at a second side of the motor assembly, wherein the refrigerator further comprises a power transmission member that passes through the motor assembly and that is configured to connect to the first screw assembly and to the second screw assembly, the power transmission member having a first end extending to the first screw assembly and a second end extending to the second screw assembly, and wherein the power transmission member comprises:

a shaft driving gear that is gear-coupled to the motor assembly and that is configured to be rotated by the motor assembly; and a screw gear that is disposed at each of the first end and the second end of the power transmission member and that is connected to each of the first screw assembly and the second screw assembly.

9. The refrigerator according to claim 8, wherein each of the first screw assembly and the second screw assembly extends upward, and wherein a distance between an upper end of the first screw assembly and an upper end of the second screw assembly is greater than a distance between a lower end of the first screw assembly and a lower end the second screw assembly.

10. The refrigerator according to claim 7, wherein the lever includes a lever protrusion disposed at a position spaced apart from the fixing shaft, wherein the one of the pair of first rods includes a scissors protrusion disposed at a position spaced apart from the rotation shaft, and wherein the second connection part connects the lever protrusion to the scissor protrusion.

11. The refrigerator according to claim 1, further comprising a connection assembly that is disposed between the front panel door part and the drawer part, that is configured to selectively couple the driving device to the elevation device, and that is configured to transmit power from the driving device to the elevation device, wherein the connection assembly comprises a connection member comprising a first connection part configured to couple to the first end of the lever, and wherein the elevation device is configured to receive rotation force from the first connection part.

12. The refrigerator according to claim 11, wherein the front panel door part defines a front panel door opening at a rear surface of the front panel door part, and wherein the connection assembly is exposed through the front panel door opening.

13. The refrigerator according to claim 11, wherein the connection member further comprises:

a second connection part spaced apart from the first connection part and configured to couple to a side of the lever offset from the first end of the lever; and a connection portion that is connected to the first connection part and to the second connection part.

14. The refrigerator according to claim 11, wherein the connection assembly comprises:

a case fixed in the front panel door part, wherein the first connection part disposed in the case;

an elastic member disposed in the case and configured to support the first connection part;

a cover that is configured to couple to the case and that defines an opening; and a push member that is coupled to the first connection part and that is exposed through the opening, and wherein the push member is configured to move together with the first connection part to decouple from the elevation device.

15. The refrigerator according to claim 14, wherein the first connection part defines a hollow portion configured to receive a rotation shaft that protrudes from a part of the elevation device toward the front panel door part, and wherein the first connection part is configured to couple to the rotation shaft of the elevation device based on a pressure of the elastic member.

16. The refrigerator according to claim 14, wherein the connection assembly further comprises:

a lever fixing member that is located within the case and that couples the fixing shaft and the first end of the lever rotatably to the case, the lever fixing member being configured to rotate together with the lever based on rotation of the lever about the fixing shaft of the lever, wherein the lever fixing member includes an elastic support part that extends in a radial direction from the fixing shaft and defines a surface supporting one end of the elastic member, and wherein the first connection part is configured to move in an axial direction of the fixing shaft to compress the elastic member.

17. The refrigerator according to claim 14, wherein the push member is exposed between the front panel door part and the drawer part.

18. The refrigerator according to claim 14, wherein the driving device is covered by a front surface of the drawer part in a state in which the front panel door part and the drawer part are coupled to each other.

\* \* \* \* \*